(12) United States Patent
Holmberg et al.

(10) Patent No.: US 12,078,859 B2
(45) Date of Patent: Sep. 3, 2024

(54) EQUIPMENT PANEL WITH TERMINATION REGION

(71) Applicant: COMMSCOPE TECHNOLOGIES LLC, Hickory, NC (US)

(72) Inventors: Matthew J. Holmberg, Minneapolis, MN (US); Arend J. Turner, Minnetrista, MN (US); Paul M. Lawson, Minneapolis, MN (US); Rodney C. Schoenfelder, Shakopee, MN (US); Soutsada Vongseng, Chanhassen, MN (US); James J. Solheid, Minneapolis, MN (US); Scott C. Kowalczyk, Savage, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 337 days.

(21) Appl. No.: 17/423,042

(22) PCT Filed: Jan. 9, 2020

(86) PCT No.: PCT/US2020/012943
§ 371 (c)(1),
(2) Date: Jul. 14, 2021

(87) PCT Pub. No.: WO2020/150070
PCT Pub. Date: Jul. 23, 2020

(65) Prior Publication Data
US 2022/0066116 A1 Mar. 3, 2022

Related U.S. Application Data

(60) Provisional application No. 62/913,801, filed on Oct. 11, 2019, provisional application No. 62/884,897, (Continued)

(51) Int. Cl.
*G02B 6/44* (2006.01)

(52) U.S. Cl.
CPC ................... *G02B 6/4455* (2013.01)

(58) Field of Classification Search
CPC .................................... G02B 6/4455
See application file for complete search history.

(56) References Cited

U.S. PATENT DOCUMENTS

| 4,898,448 A | 2/1990 | Cooper |
| 6,556,763 B1 | 4/2003 | Puetz et al. |
| (Continued) | | |

FOREIGN PATENT DOCUMENTS

WO WO-2014095310 A1 * 6/2014 ........... G02B 6/4454

OTHER PUBLICATIONS

Extended European Search Report for European Patent Application No. 20741319.6 mailed Apr. 29, 2022, 9 pages.
(Continued)

*Primary Examiner* — Sung H Pak
(74) *Attorney, Agent, or Firm* — Merchant & Gould P.C.

(57) ABSTRACT

An equipment panel includes one or more trays disposed within a chassis, Each tray has a two-layer termination region. Certain trays have a two-layer splice region. The splice region can be used to optically couple preterminated fibers within the tray to a trunk cable. Alternatively or in addition, the splice region can be used to fix broken fiber connections. A cable anchor and fanout arrangement mounts to the chassis as a unit.

18 Claims, 48 Drawing Sheets

Related U.S. Application Data filed on Aug. 9, 2019, provisional application No. 62/792,204, filed on Jan. 14, 2019.

(56) References Cited

U.S. PATENT DOCUMENTS

| | | |
|---|---|---|
| 6,845,207 B2 * | 1/2005 | Schray ................. G02B 6/3897 385/135 |
| 7,570,860 B2 | 8/2009 | Smrha et al. |
| 8,731,361 B2 | 5/2014 | Anderson et al. |
| 8,931,361 B2 * | 1/2015 | Fitzgerald ............. B60L 3/0023 74/335 |
| 9,285,552 B2 | 3/2016 | Marcouiller et al. |
| 9,379,501 B2 | 6/2016 | Taylor et al. |
| 9,423,570 B2 | 8/2016 | Petersen et al. |
| 9,709,765 B2 | 7/2017 | Wells et al. |
| 10,254,496 B2 | 4/2019 | Geens et al. |
| 11,022,770 B2 | 6/2021 | Campbell et al. |
| 2011/0103750 A1 | 5/2011 | Claessens et al. |
| 2013/0287357 A1 | 10/2013 | Solheid et al. |
| 2014/0079365 A1 | 3/2014 | Hill et al. |
| 2016/0246024 A1 * | 8/2016 | Timmins .............. G02B 6/4452 |
| 2017/0276893 A1 | 9/2017 | Geling et al. |
| 2020/0241228 A1 | 7/2020 | Smrha et al. |

OTHER PUBLICATIONS

International Search Report and Written Opinion of the International Searching Authority for International Patent Application No. PCT/US2020/012943 mailed May 12, 2020, 12 pages.

MFPS splice-patch shelves: Installation Instructions, CommScope, Inc., 1-15 (2017).

\* cited by examiner

EQUIPMENT PANEL WITH TERMINATION REGION

CROSS-REFERENCE TO RELATED APPLICATIONS

This application is a National Stage Application of PCT/US2020/012943, filed on Jan. 9, 2020, which claims the benefit of U.S. Patent Application Ser. No. 62/792,204, filed on Jan. 14, 2019, and claims the benefit of U.S. Patent Application Ser. No. 62/884,897, filed on Aug. 9, 2019, and claims the benefit of U.S. Patent Application Ser. No. 62/913,801, filed on Oct. 11, 2019, the disclosures of which are incorporated herein by reference in their entireties.

BACKGROUND

In bladed chassis systems, optical adapters are mounted to one or more blades that are disposable within a chassis. The blades can slide forwardly of the chassis to enhance access to the optical adapters. Cable clamps, anchors, or other fasteners can be fixed to the rear of the chassis to secure incoming cables in fixed positions relative to the chassis.

Improvements are desired.

SUMMARY

Some aspects of the disclosure are directed to an equipment panel including one or more trays movable relative to a chassis. For example, each tray may separately slide along a forward-rearward axis relative to the chassis to move between an extended position and a retracted position.

In certain implementations, each tray includes a termination region. Forward-facing ports are carried by the tray at the termination region. In certain implementations, each tray includes a splice region. In certain implementations, each tray includes both a termination region and a splice region.

In certain examples, the forward-facing ports are defined by optical adapters mounted to the tray at the termination region. In certain examples, the optical adapters include one or more adapter blocks each defining a plurality of the forward-facing ports. In certain examples, the forward-facing ports are arranged in two or more rows. In an example, the forward-facing ports in an upper of the rows vertically align with the forward-facing ports in a lower of the rows. In certain examples, each forward-facing port is configured to receive a multi-fiber plug connector (e.g., an MPO connector).

In certain implementations, the upper row of forward-facing ports is disposed at a fixed orientation relative to the lower row of forward-facing ports. In certain examples, the lower row defines horizontal fiber insertion axes. In certain examples, the lower row defines fiber insertion axes angled downwardly while the upper row defines fiber insertion axes angled upwardly relative to a horizontal axis.

In certain implementations, the upper row of forward-facing ports is movable (e.g., pivotal) relative to the bottom row of forward-facing ports. For example, a top piece of an adapter bulkhead may be movable relative to a bottom piece.

In certain implementations, the termination region also includes a middle row of forward-facing ports. In certain examples, the middle row is disposed at a fixed axial position relative to the upper and lower rows. In some such implementations, a tool can be used to insert and/or remove plug connectors from the forward-facing ports of the termination region. In certain examples, the middle row is axially movable relative to the upper and lower rows. For example, plugs received at the middle row are accessible when the middle row is disposed in a forward axial position and plugs received at the upper and lower rows are accessible when the middle row is disposed in a rearward axial position.

One or more splice holders are disposed at the splice region to retain optical splices (e.g., optical fusion splices). In certain examples, the splice holders include splice cassettes. In certain examples, the splice holders are arranged in multiple layers. For example, a first layer of splice holders may be mounted to the tray while a second layer of splice holders are mounted above the first layer. In certain examples, the splice region includes a first splice region disposed at a first side of the tray and a second splice region disposed at a second side of the tray. In an example, each of the first and second splice regions includes first and second layers of splice holders.

In some implementations, the splice holders at the splice region are configured to hold fewer splices than fibers routed to the termination region. For example, the splice region may not be filled to capacity with splice cassettes. In an example, no splice cassettes (or other splice holders) are mounted within the splice region initially. The splice holder may be incrementally added as splices are needed.

In some implementations, one or more trunk cables are routed into the chassis. Slack length of the fibers of the trunk cable(s) may be taken up at cable management structures on the respective tray. In some examples, the trunk cable fibers have first ends terminated at optical connectors that are optically accessible at the termination region. In such implementations, the splice region of each tray can be used in fixing broken connections by splicing a terminated stub to a broken trunk cable fiber. In other examples, the trunk cable fibers have unterminated first ends that are routed to the splice region. At the splice region, the unterminated first ends are spliced to unterminated second ends of intermediate fibers. First ends of the intermediate fibers are pre-cabled to the termination region. The splice region also can be used in fixing broken connections (e.g., by splicing a replacement intermediate fiber to a trunk cable fiber).

In other implementations, the equipment panel can be pre-terminated with a stub cable that extends out of the chassis. In such implementations, each tray is pre-cabled at the factory with a plurality of intermediate fibers that each extend from a first end to a second end. Before shipping the equipment panel to the field, the first ends of the intermediate fibers are arranged at the factory to be optically accessible at the termination region. Slack length of the intermediate fibers may be taken up at cable management structures on the respective tray. The second ends of the stub cable may remain unterminated in preparation for splicing to a trunk cable external of the chassis. Alternatively, the second ends of the stub cable may be terminated at one or more multi-fiber connectors for connection to a trunk cable external of the chassis. In such implementations, the splice region of each tray can be used in fixing broken connections as described herein.

Accordingly, a tray may include a plurality of trunk cable fibers optically coupled to forward-facing ports at the termination region where at least one trunk cable fiber, but fewer than all of the trunk cable fibers, includes an optical splice disposed at the tray.

In certain implementations, each tray includes a cable anchor arrangement that can be mounted at the chassis as a unit. In certain examples, the cable anchor arrangement can be removed from the chassis as a unit. The cable anchor arrangement includes a base, at least one cable anchor, and at least one cable fanout. In certain examples, multiple cable anchors and/or multiple cable fanouts are mounted to the base. Accordingly, an optical cable can be anchored to the base and fanned out into multiple cable sub-units before being routed to the chassis.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an equipment panel 100, 200, 300 including one or more trays 104, 304 movable relative to a chassis 102, 202, 302. Each tray 104, 304 has a width W2 that extends substantially along a width W1 of the chassis 102, 202, 302. Each tray 104, 304 has a height H2 of about 1 standard rack unit (RU).

Figure 1:
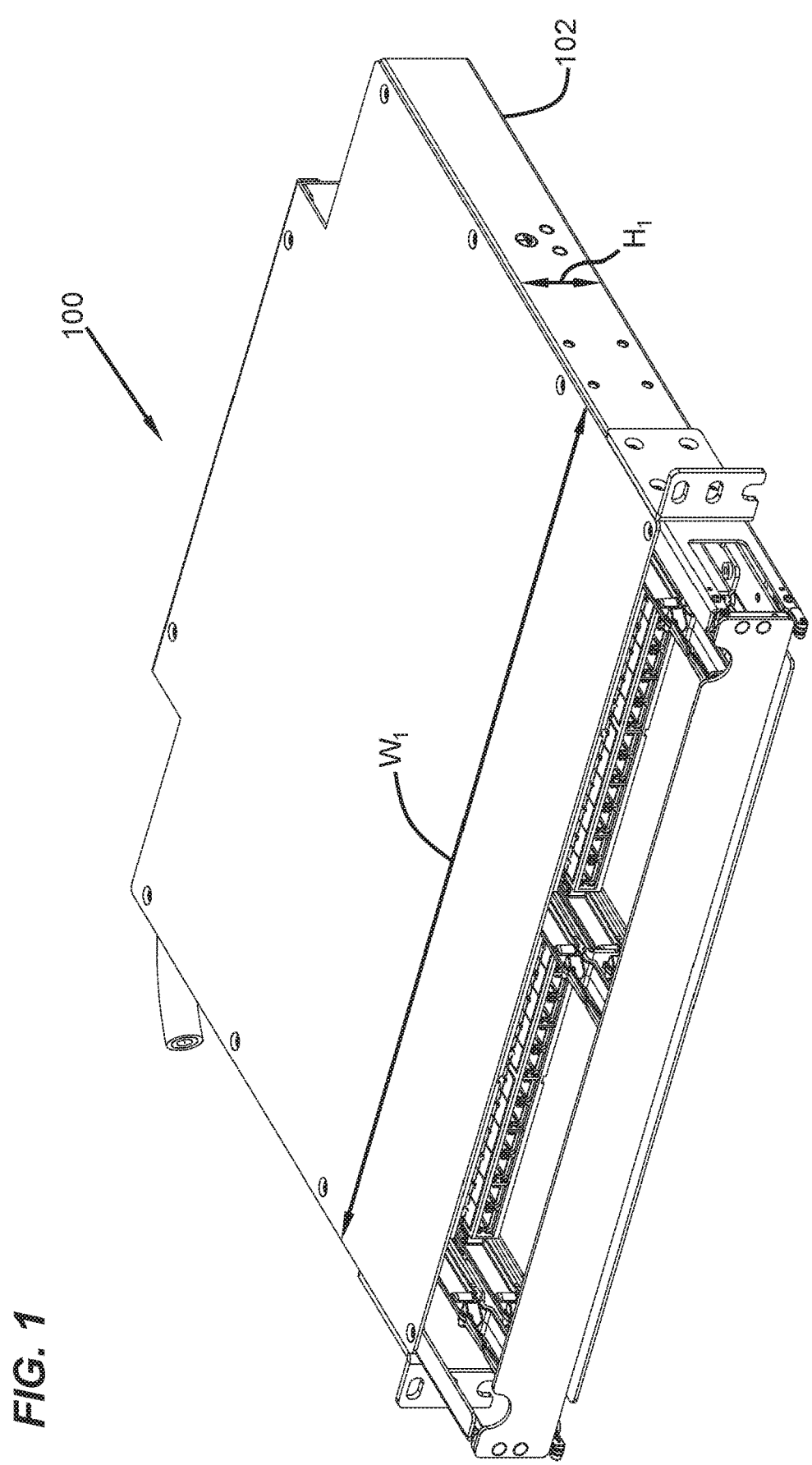
FIG. 1 is a perspective view of an example equipment panel configured in accordance with the principles of the present disclosure, the equipment panel including a chassis and a tray and having a size of 1 RU and a density of at least 576 fibers.
Figure 2:
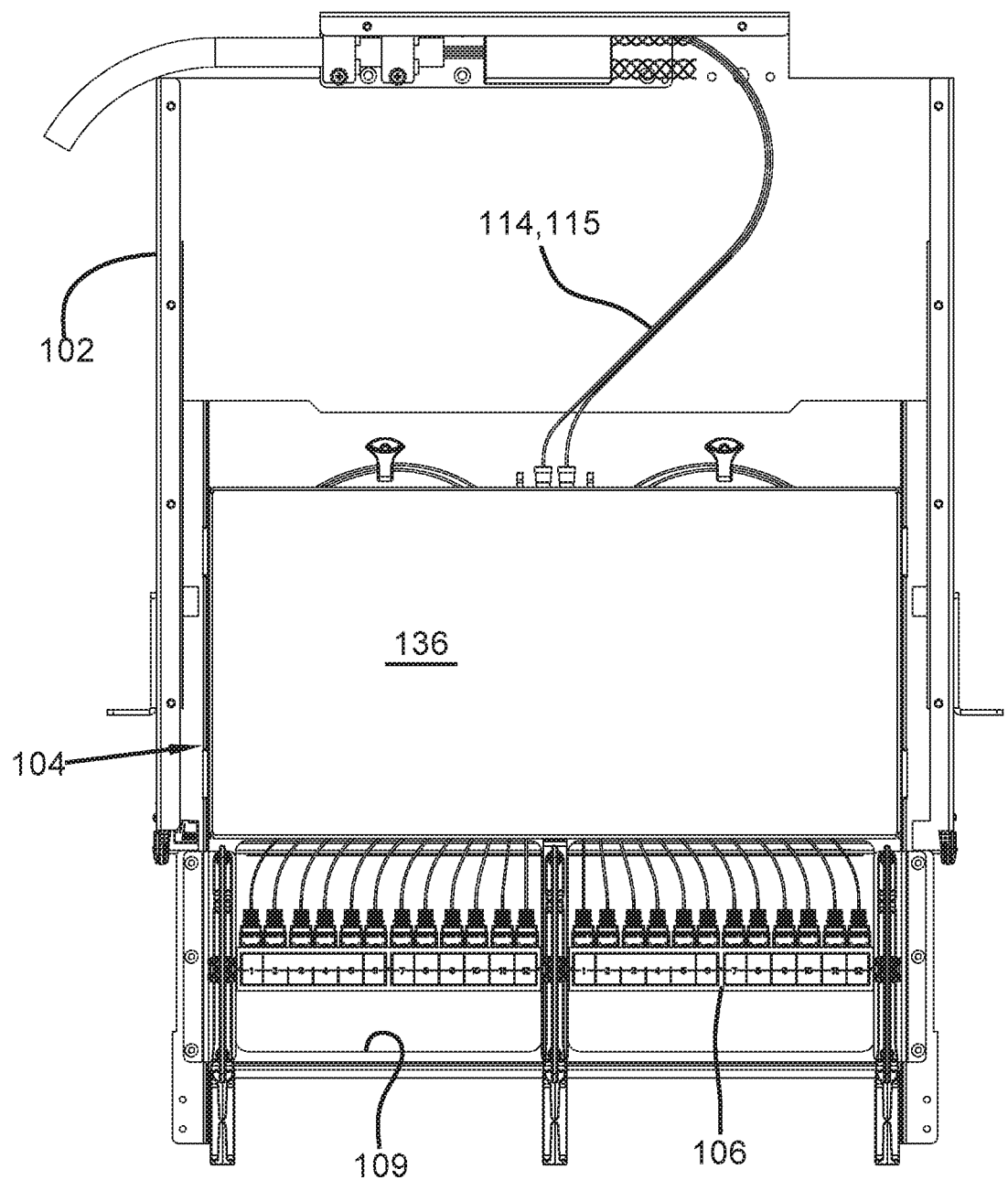
FIG. 2 is a top plan view of the equipment panel of FIG. 1 with a top of the chassis removed so that the tray is visible, the tray being disposed in an extended position.
Figure 3:
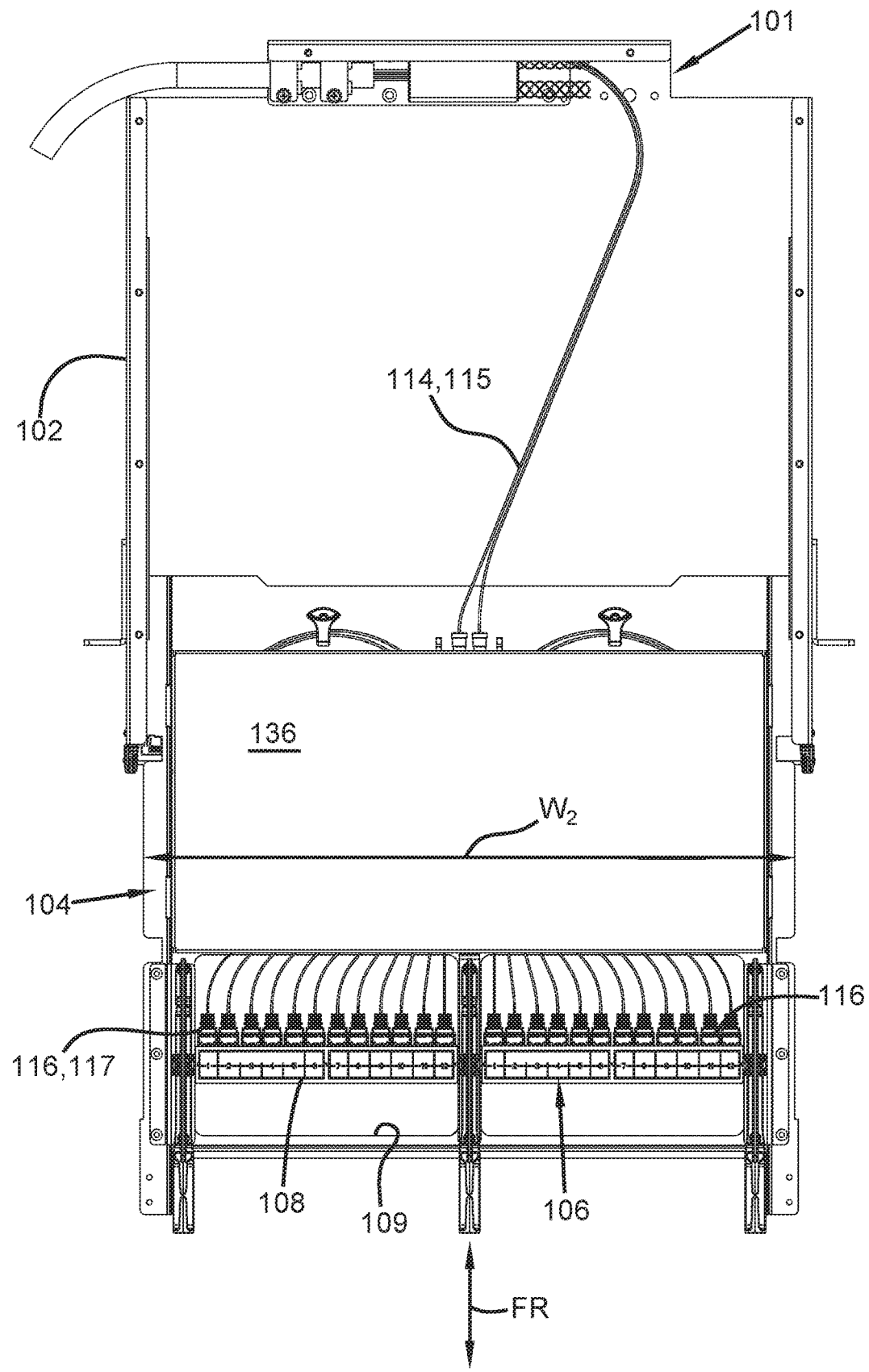
FIG. 3 is a top plan view of the equipment panel of FIG. 2 with the tray being disposed in a second extended position.

In some implementations, each tray 104, 304 may separately slide along a forward-rearward axis FR relative to the chassis 102, 202, 302 to move between a retracted position (FIG. 1) and an extended position (FIG. 2). In certain examples, the tray 104, 304 may have a second extended position (FIG. 3) that is farther forward than the extended position. In other implementations, each tray 104, 304 may pivot or rotate out of the chassis 102, 202, 302. In certain examples, each tray 104, 304 may releasably lock in the extended position and/or in the retracted position. In certain examples, each tray 104, 304 may include a handle to facilitate moving the tray 104, 304 between the extended and retracted positions.

In certain implementations, each tray 104, 304 includes a termination region 106, 306. Forward-facing ports 108, 308 are carried by the tray 104, 304 at the termination region 106, 306. In some examples, the forward-facing ports 108, 308 are configured to receive multi-fiber plug connectors (e.g., MPO plug connectors). In other examples, the forward-facing ports 108, 308 are configured to receive single-fiber plug connectors (e.g., LC connectors, SC connectors, LX.5 connectors, etc.). In certain implementations, each tray 104, 304 includes a splice region 110. In certain implementations, each tray 104, 304 includes both a termination region 106 and a splice region 110. One or more splice holders 112 are carried by the tray 104, 304 at the splice region 110.

In some implementations, one or more trunk cables 130 may be routed to the chassis 102, 202, 302. The trunk cable includes a plurality of optical fibers 114 (e.g., fiber ribbons). Slack length of the fibers 114 may be taken up at cable management structures on the respective tray 104, 304.

In some such implementations, the optical fibers 114 have first ends terminated at optical connectors 116 that are optically accessible through the forward-facing ports 108, 308. For example, the optical connectors 116 may be plugged into rear ports 118 of optical adapters defining the forward-facing ports 108, 308. In some examples, the rear ports 118 are configured to receive multi-fiber plug connectors (e.g., MPO plug connectors). In other examples, the rear ports 118 are configured to receive single-fiber plug connectors (e.g., LC connectors, SC connectors, LX.5 connectors, etc.). In such implementations, the splice region 110 of each tray 104, 304 can be used in fixing broken connections (e.g., to re-terminate an optical connector 116 to a fiber ribbon 114) by splicing a terminated stub fiber 115a (or stub fiber ribbon) to the broken fiber 114a (or broken fiber ribbon) (e.g., see FIG. 7).

In other such implementations, the optical fibers 114 have unterminated first ends that are routed to the splice region 110. At the splice region 110, the unterminated first ends of the fiber 114 are spliced to unterminated second ends of intermediate fibers (e.g., fiber ribbons) 115. First ends of the intermediate fibers 115 are terminated at optical plug connectors 117 and pre-cabled at the rear ports 118 at the termination region 106, 306. In such implementations, the splice region 110 also can be used in fixing broken connections (e.g., to re-terminate an optical connector 117 to a fiber ribbon 115) by splicing a terminated stub to the broken ribbon 115.

In other implementations, the equipment panel 100, 200, 300 can be pre-terminated with a stub cable 132. In such implementations, each tray 104, 304 is pre-cabled at the factory with a plurality of intermediate fibers 115 (e.g., fiber ribbons) that each extend from a first end to a second end. Plug connectors 117 terminating the first ends of the fibers 115 are plugged into the rear ports 118 of the optical adapters defining the forward-facing ports 108 or are otherwise arranged to be optically accessible through the forward-facing ports 108 at the factory before shipping the equipment panel 100, 200 to the field. Slack length of the optical fibers 115 may be taken up at cable management structures 120 on the respective tray 104. The second ends of the stub cable 132 may remain unterminated in preparation for splicing to a trunk cable external of the chassis 102, 202. Alternatively, the second ends of the stub cable 132 may be terminated at one or more multi-fiber connectors for connection to a trunk cable external of the chassis 102, 202. In such implementations, the splice region 110 of each tray 104 can be used in fixing broken connections (e.g., to re-terminate an optical connector 117 to a fiber ribbon 115 by splicing a pre-terminated stub ribbon to the broken ribbon 115).

As will be discussed herein, the optical fibers 114, 115 are grouped into cable sub-units 134 within the chassis 102, 202, 302. Each cable sub-unit may be routed to a different section of the splice region 110 and/or termination region 106, 306. In certain examples, the optical fibers 114, 115 may be configured as two or more fiber ribbons. Each cable sub-unit 134 may include one or more fiber ribbons. Each fiber ribbon may be terminated by one or more multi-fiber connectors (e.g., MPO connectors) that plug into the rear ports 118 of the tray 104, 304.

Figure 14:
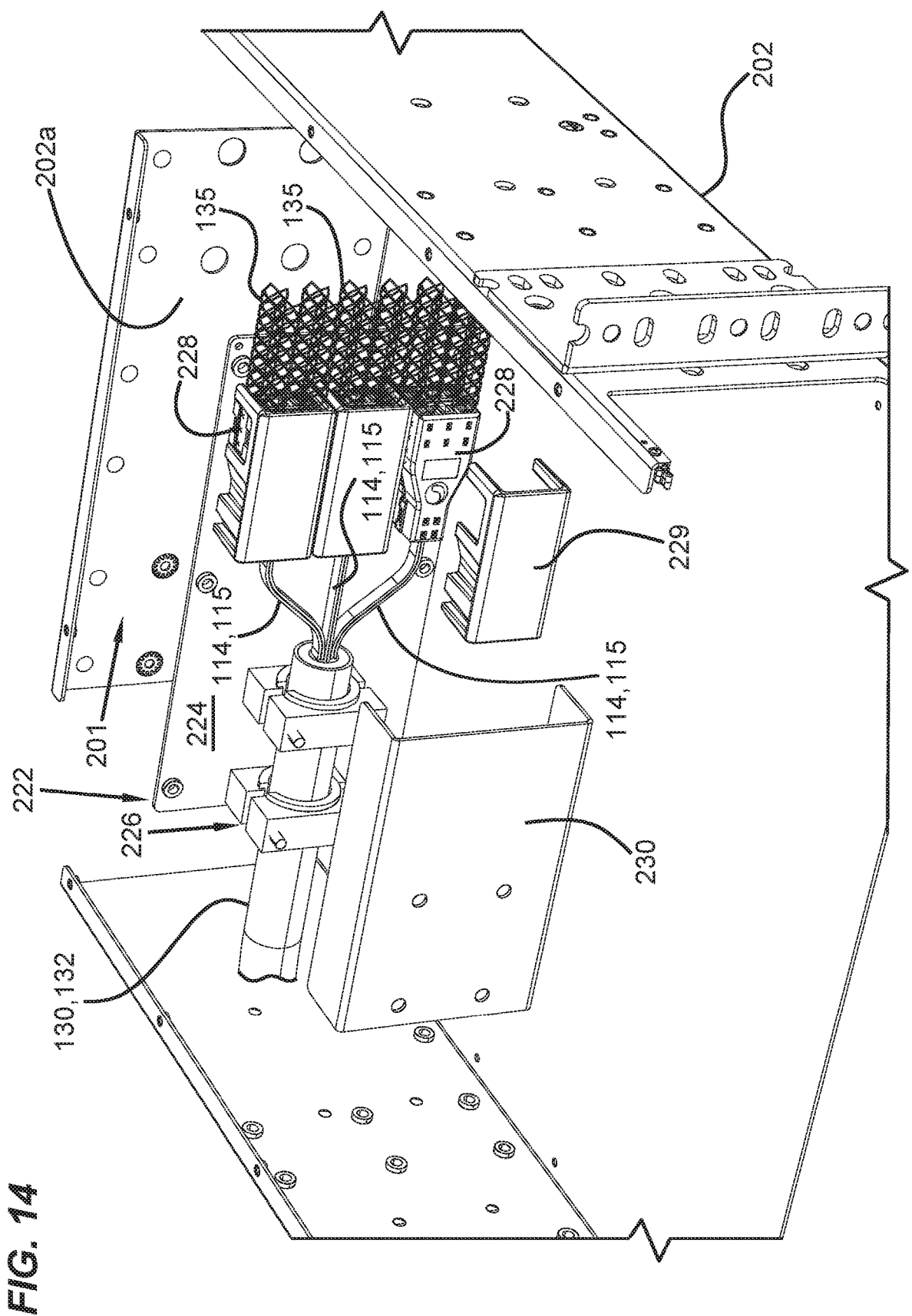
FIG. 14 is an enlarged view of a rear of the equipment panel of FIG. 13 with components of the cable anchor arrangement exploded away from each other for ease in viewing.
Figure 15:
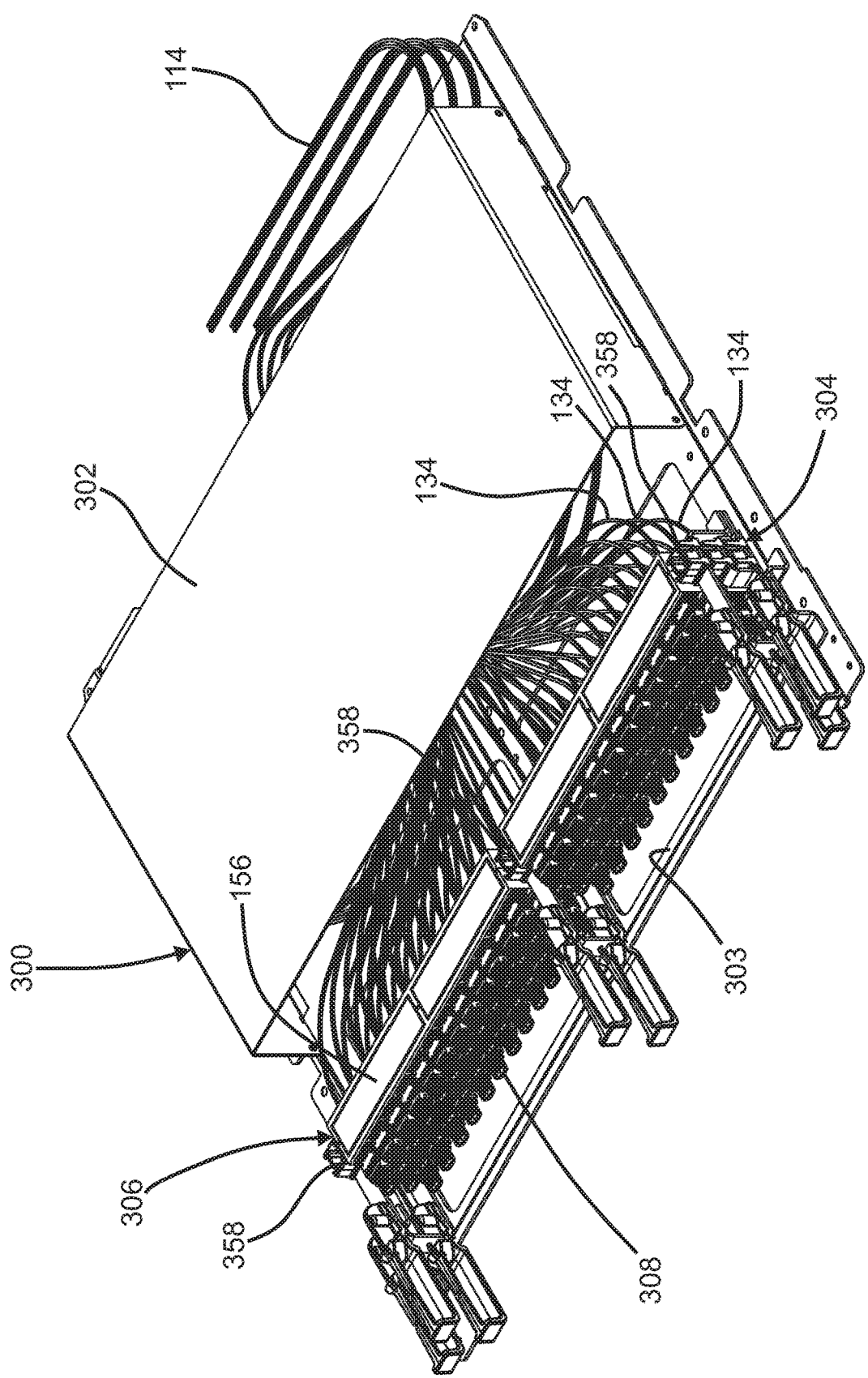
FIG. 15 is a perspective view of an example equipment panel configured in accordance with the principles of the present disclosure, the equipment panel including a chassis and a tray and having a size of 1 RU and a density of at least 864 fibers.
Figure 16:
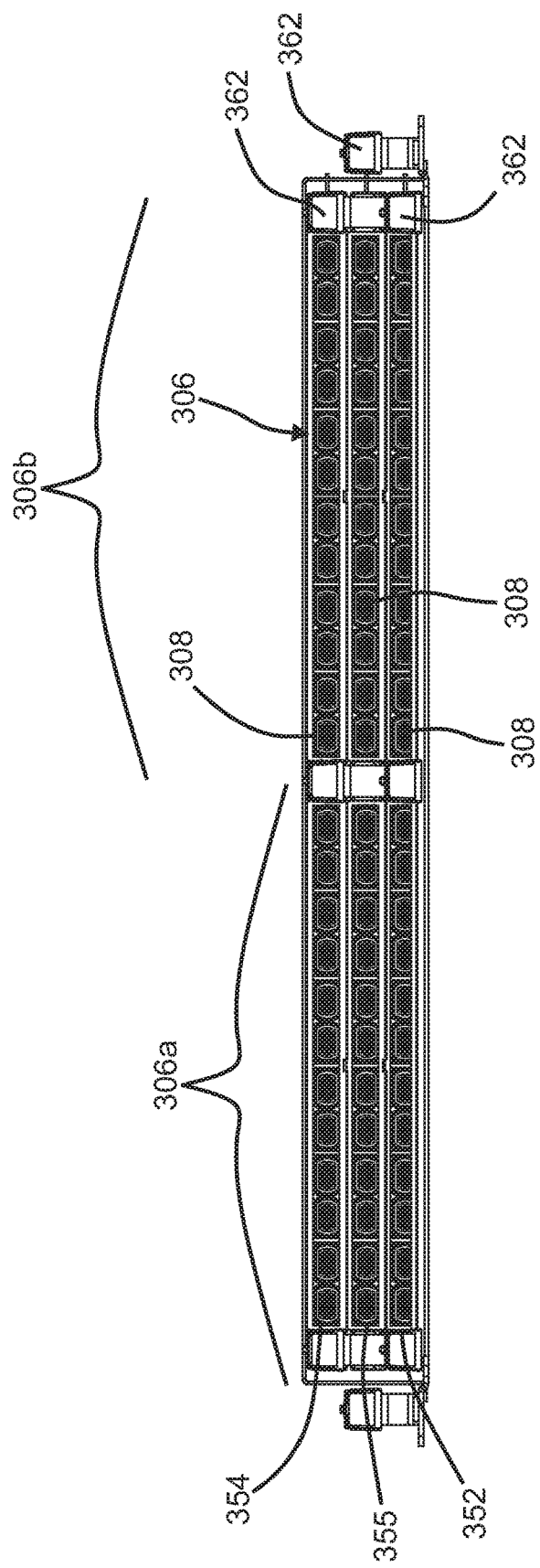
FIG. 16 is a front elevational view of the equipment panel of FIG. 15.

A cable anchor arrangement 122, 222 is configured to retain either the trunk cable(s) 130 or the stub cables(s) 132 at the panel 100, 200, 300. In certain implementations, the optical fibers 114, 115 of the trunk or stub cable(s) 130, 132 are fanned out into multiple cable sub-units 134 at the cable anchor arrangement 122, 222 (see FIGS. 6 and 14). In certain examples, each cable sub-unit 134 also is secured to the cable anchor arrangement 122, 222.

Figure 4:
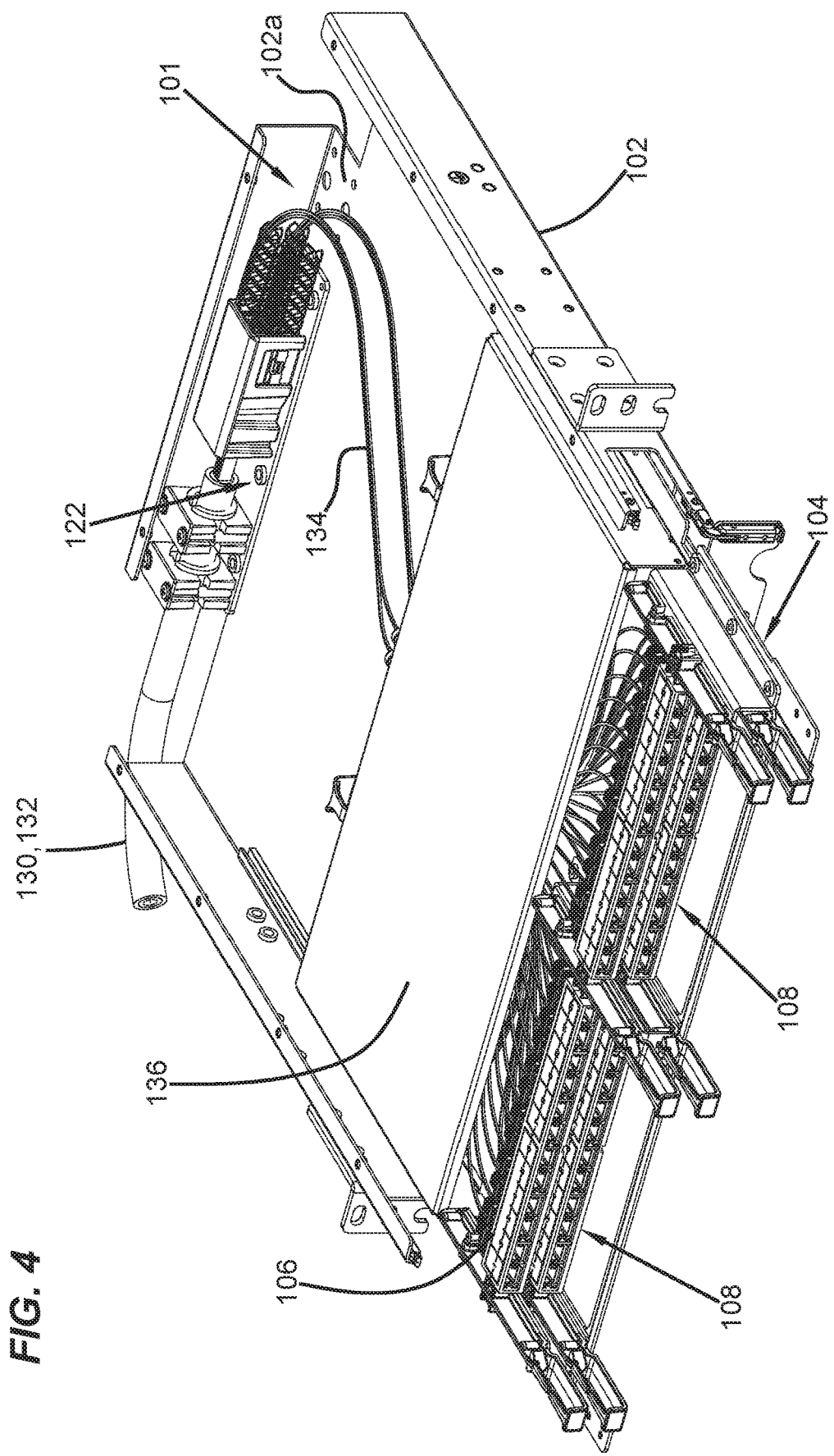
FIG. 4 is a perspective view of the equipment panel of FIG. 2 in which a cable anchor arrangement is visible at a rear of the chassis.
Figure 5:
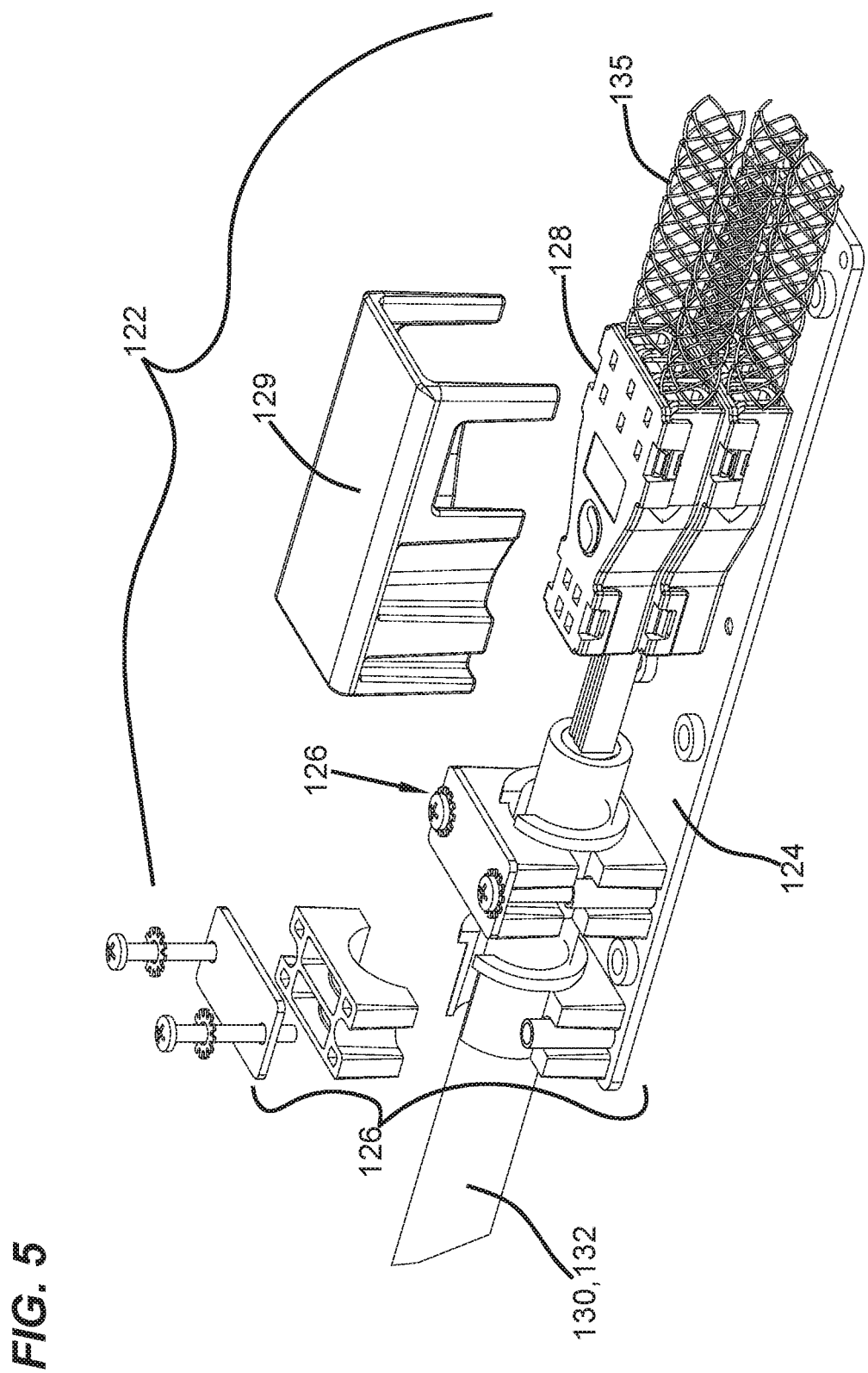
FIG. 5 is an enlarged view of the cable anchor arrangement of FIG. 4 with some components exploded outward for clarity.
Figure 11:
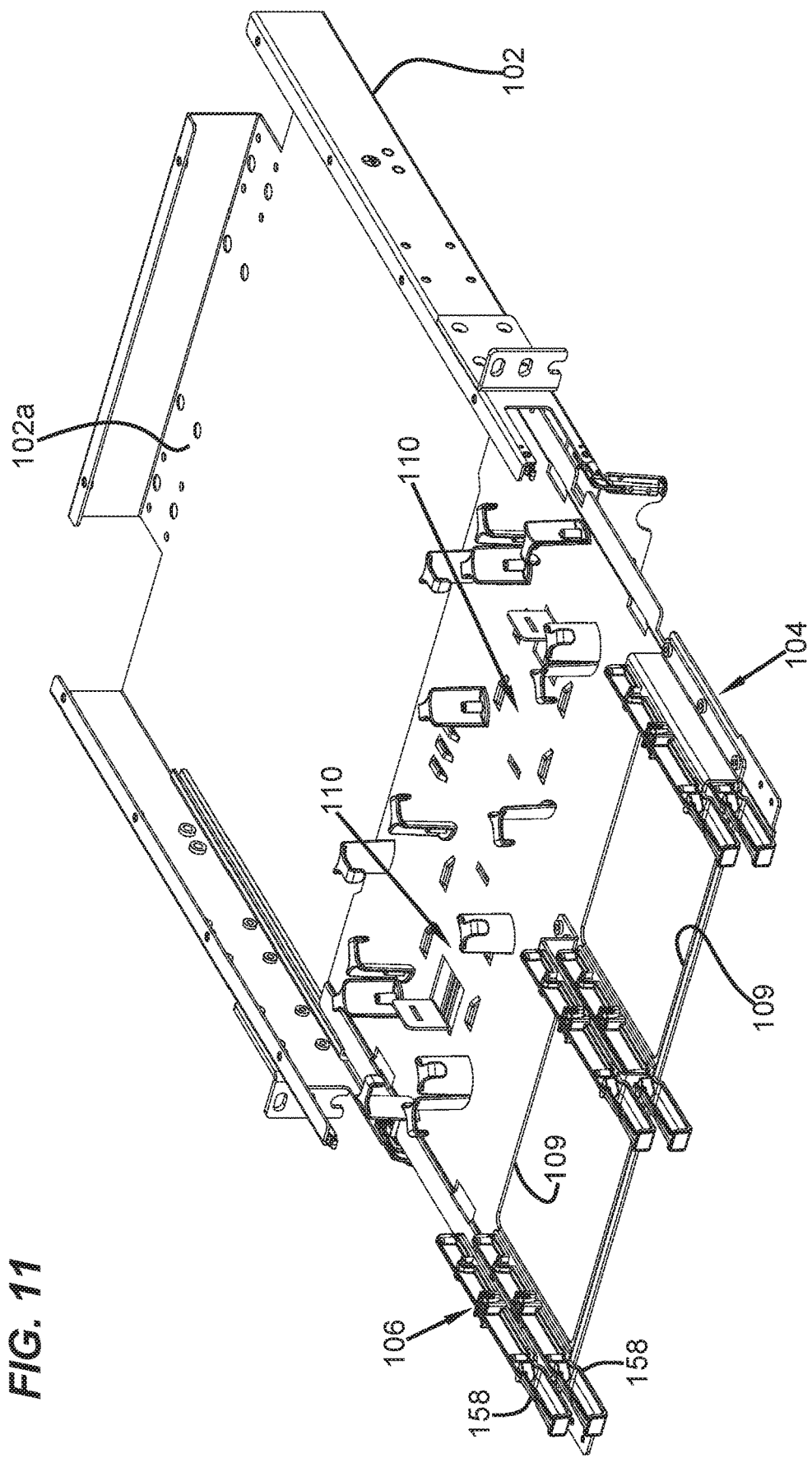
FIG. 11 is a perspective view of the equipment panel of FIG. 3 with splice components, termination components, and the cable anchor arrangement removed for ease in viewing.

In certain implementations, the cable anchor arrangement 122, 222 can be mounted within the chassis 102, 202, 302. In some examples, the cable anchor arrangement 122, 222 is mounted to a bottom 102*a* (FIG. 11) of the chassis 102, 302 in a horizontal orientation (see FIG. 4). In other examples, the cable anchor arrangement 222 is mounted to a rear 202*a* of the chassis 202, 302 in a vertical orientation (see FIG. 14).

In certain implementations, the chassis 102, 202, 302 defines an anchoring section 101, 201 at the rear of the chassis 102, 202, 302. The anchoring section 101, 201 defines the bottom 102*a* or rear 202*a* to which the cable anchor arrangement 122, 222 is mounted. In certain examples, the anchoring section 101, 201 has a bottom portion that extends rearwardly from a bottom of the chassis 102, 202, 302 and extends along less than a full width of the chassis. The anchoring section 101, 201 also may have a rear wall extending upwardly from the bottom portion. In certain examples, the anchoring section 101, 201 is open at opposite sides to enable the trunk cable 130 or stub cable 132 to be routed into the chassis 102, 202 (e.g., see FIGS. 2 and 3). The anchoring section 101, 201 may provide sufficient space to accommodate the cable sub-units 134 when the tray(s) 104 are disposed in the retracted position within the chassis 102, 202, 302.

In certain examples, the cable anchor arrangement 122, 222 that can be mounted at the chassis 102, 202, 302 as a unit. In certain examples, the cable anchor arrangement 122, 222 can be removed from the chassis 102, 202, 302 as a unit. Accordingly, an optical cable 130, 132 can be secured to the cable anchor arrangement 122, 222 and/or fanned out into multiple cable sub-units 134 before being routed to the chassis 102, 202, 302. Further, the cable 130, 132 and cable sub-units 134 can all be secured to the chassis 102, 202, 302 by merely attaching the cable anchor arrangement 122, 222 as a whole to the chassis 102, 202, 302.

The cable anchor arrangement 122, 222 includes a base 124, 224, at least one cable anchor 126, 226, and at least one cable fanout 128, 228. In certain examples, multiple cable anchors 126, 226 and/or multiple cable fanouts 128, 228 are mounted to the base 124, 224. In certain examples, the cable anchor(s) 126, 226 are disposed at a first end of the base 124, 224 and the cable fanout(s) 128, 228 are disposed at an opposite, second end of the base 124, 224. A jacket of the cable 130, 132 may be terminated between the cable anchors 126, 226 and the fanouts 128, 228.

In certain examples, multiple cable anchors 126, 226 are axially aligned in a row along the base 124, 224. In certain examples, each cable anchor 126, 226 includes a grommet sized to surround the jacket of the cable 130, 132. A yoke surrounds the grommet to inhibit axial movement of the grommet. Fasteners tighten the yoke around the grommet and secure the yoke and grommet to the base 124, 224. In certain examples, a cover 230 may be mounted to the base 224 to extend over the cable anchors 226, the terminated end of the jacket, and/or optical fibers extending from the terminated end of the jacket to the fanouts 228.

In certain examples, two or more fanouts 128, 228 may be stacked on the base 124, 224. A cover 129, 229 may be mounted over each fanout 128, 228 or fanout stack. In certain examples, the cable anchor arrangement 222 may include two or more stacks of fanouts 228. In an example, each stack of fanouts 228 services a respective one of the trays 104, 304.

The cable sub-units 134 are routed to the tray(s) 104, 304. In certain implementations, the cable sub-units 134 may be secured to the respective trays 104, 304 at a rear of the trays 104, 304. For example, securement members 137 are coupled to intermediate sections of the cable sub-units 137. The securement members 137 may be coupled to the tray 104 using cable ties or other attachment options.

In certain examples, the sections of the cable sub-units 134 extending between the fanouts 128, 228 and the securement members 137 are protected by a mesh sleeve 135, furcation tube, or other such conduit. The mesh sleeve 135 or other conduit inhibits interference between the various cable sub-units 134 as the trays 104, 304 are being moved relative to each other and relative to the chassis 102, 202, 302.

In certain implementations, the tray 104, 304 includes a cover 136 to protect the fibers 114, 115 routed to the termination region 106, 306. In certain examples, the cover 136 extends across the width W2 of the tray 104, 304. In certain examples, the height H2 of the tray 104, 304 is defined between a base 103 (FIG. 6) of the tray 104, 304 and the cover 136. In certain examples, the cover 136 extends over the splice region 110. In certain examples, the cover 136 extends over the cable management structures 120. In some examples, the cover 136 does not extend over the termination region 106, 306 (e.g., see FIG. 2). In other examples, the cover 136 extends over at least part of the termination region 106, 306 (e.g., blocks access to the rear ports 118 of the termination region 106, 306).

In the example shown, the cover 136 includes a planar surface 136*a* extending between side flanges 136*b*. Each side flange 136*b* includes a tab 136*c* at an opposite end of the side flange from the planar surface 136*a*. The tabs 136*c* are sized to fit into apertures 103*a* defined in the base 103 of the tray 104, 304. The planar surface 136*a* and/or the side flanges 136*b* may be sufficiently flexible to enable the tabs 136*c* to snap into the apertures 103*a* to hold the cover 136 to the tray 104. In other examples, the cover 136 may be otherwise mounted to the tray 104, 304 (e.g., using fasteners).

In some implementations, the base 103 of the tray 104, 340 defines one or more apertures 109 providing finger access to the forward-facing ports 108, 308 and/or to the rear ports 118. In some examples, the base 103 defines one or more apertures 109 disposed side-by-side and the termination region 106, 306 extends across the aperture(s) 109 (e.g., see FIG. 11). In other examples, the base 103 defines forward and rearward apertures at each side of the termination region 106, 306.

Figure 6:
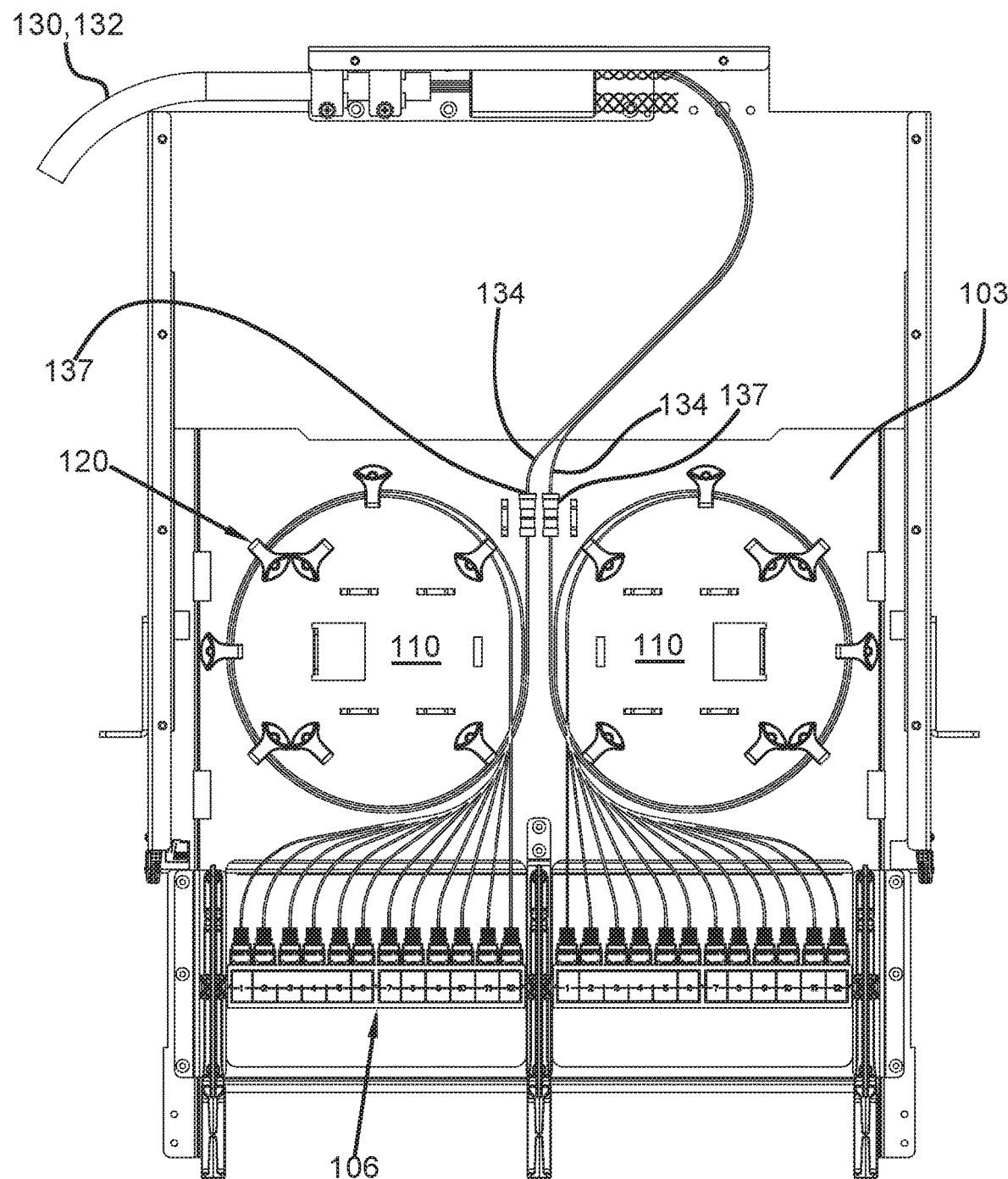
FIG. 6 is a top plan view of the equipment panel of FIG. 2 with a cover removed from the tray for ease in viewing a splice region of the tray.
Figure 7:
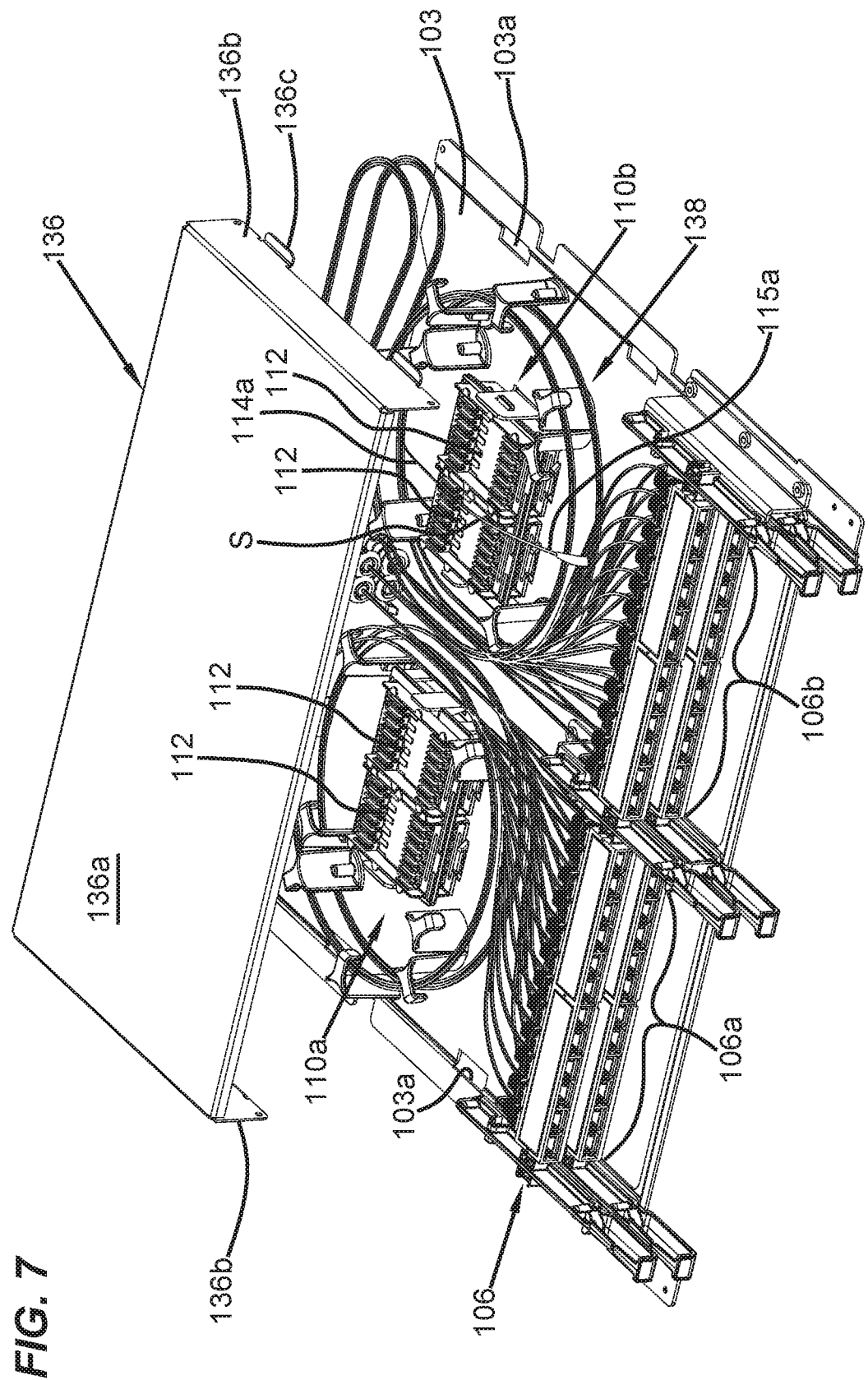
FIG. 7 is a perspective view of an example tray suitable for use with the equipment panel of FIGS. 1-6, the tray having a cover exploded away from a remainder of the tray for ease in viewing the splice region of the tray.

As shown in FIGS. 6 and 7, the termination region 106, 306 is disposed towards a front of the tray 104, 304. The splice region 110 is disposed at an intermediate region of the tray 104, 304 between the termination region 106, 306 and a rear of the tray 104, 304. Cable management structures 120 (e.g., bend radius limiters) are disposed on the tray 104, 304 to form slack length storage 138 around the splice region 110.

In certain implementations, the splice region 110 includes a first splice region 110a disposed towards the first side of the tray 104, 304 and a second splice region 110b disposed towards the second side of the tray 104, 304. The fibers 114, 115 routed onto the tray 104, 304 may be initially routed between the first and second splice regions 110a, 110b. A respective slack length storage path 138 may be formed around each of the first and second splice regions 110a, 110b.

In accordance with some aspects of the disclosure, the splice region 110 has a first (e.g., lower) layer of splice holders and a second (e.g., upper) layer of splice holders. In certain examples, the second layer is disposed over the first layer. In certain examples, each splice region 110a, 110b has separate first and second layers of splice holders. Each layer of the splice region 110, 110a, 110b is configured to receive one or more splice cassettes 112 or other splice holders.

In some implementations, the splice holders at the splice region 110 are configured to hold fewer splices than there are fibers routed to the termination region 106, 306. For example, the splice region 110 may not be filled to capacity with splice cassettes 112. In an example, no splice cassettes 112 (or other splice holders) are mounted within the splice region 110 initially. Splice holders 112 may be incrementally added as optical splices are needed (e.g., to terminate trunk cables and/or to repair broken connections).

Figure 8:
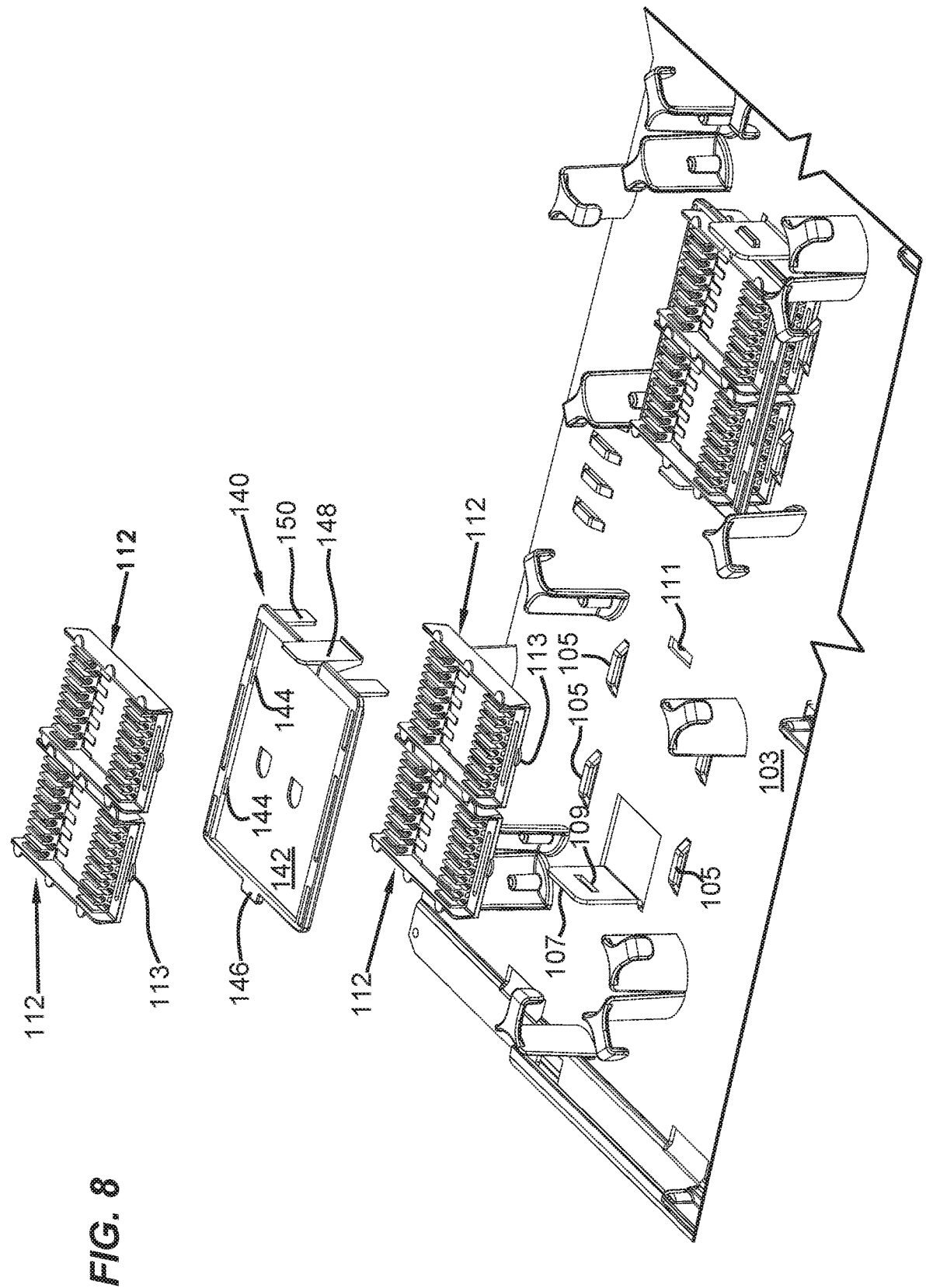
FIG. 8 is an enlarged view of the splice region of the tray with components at the splice region exploded away from each other for ease in viewing.

As shown in FIG. 8, a splice cassette 112 includes tabs 113 that fit with retaining members 105 on the base 103 of the tray 104, 304 to hold the splice cassette 112 to the tray 104, 304 to form the first layer of splice holders. In certain examples, multiple splice cassettes 112 can be mounted to the base 103 using the retaining members 105 to form the first layer. A second layer of splice holders can be mounted to a platform 140 disposed over the first layer. The platform 140 can be mounted to the tray 104, 304 and additional splice cassettes 112 can be mounted to a support surface 142 of the platform 140 (e.g., by inserting tabs 113 of the additional cassettes 112 into apertures 144 defined by the platform 140) to form the second layer.

In certain implementations, the tray 104, 304 includes a retention flange 107 extending upwardly from the base 103 and defining an aperture 109. The platform 140 includes a retention tab 146 sized to fit within the aperture 109 of the retention flange 107. The tray 104, 304 also has a locking aperture 111 defined in the base 103. The platform 140 may include a latch arm 148 at an opposite side of the support surface 142 from the retention tab 146. The latching arm 148 has a distal end sized and shaped to extend through the locking aperture 111 and latch to the tray 104, 304. Support members 150 also can extend downwardly from the support surface 142 of the platform 140 at the latching arm 148 end to support the platform 140.

In accordance with some aspects of the disclosure, the termination region 106, 306 also has a first layer 152 and a second layer 154. For example, the forward-facing ports 108, 308 may include a first (e.g., lower) row of ports and a second (e.g., upper) row of ports. In embodiments in which the optical fibers 115 are routed between the termination region 106, 306 and the splice region 110, optical fibers 115 from the first layer 152 extend to the first layer of splice holders and optical fibers 115 from the second layer 154 extend to the second layer of splice holders.

In certain implementations, the termination region 106, 306 also is separated into a first termination region 106a, 306a disposed closer to the first side of the tray 104, 304 and a second termination region 106b, 306b disposed closer to the second side of the tray 104, 304 (see FIG. 7). In such implementations, optical fibers 115 extending from the first termination region 106a, 306a may be routed to the first splice region 110a while optical fibers 115 extending from the second termination region 106b, 306b may be routed to the second splice region 110b.

Accordingly, in certain implementations, a trunk cable 130 or stub cable 132 may be fanned out into four cable sub-units 134 per tray 104, 304. A first cable sub-unit 134 is routed to the lower row of ports at the first termination region 106a, a second cable sub-unit 134 is routed to the upper row of ports at the first termination region 106a, a third cable sub-unit 134 is routed to the lower row of ports at the second termination region 106b, and a fourth cable sub-unit 134 is routed to the upper row of ports at the second termination region 106b. In certain implementations, each cable sub-unit 134 also may be routed to a respective layer of a respective splice region 110a, 110b.

Figure 9:
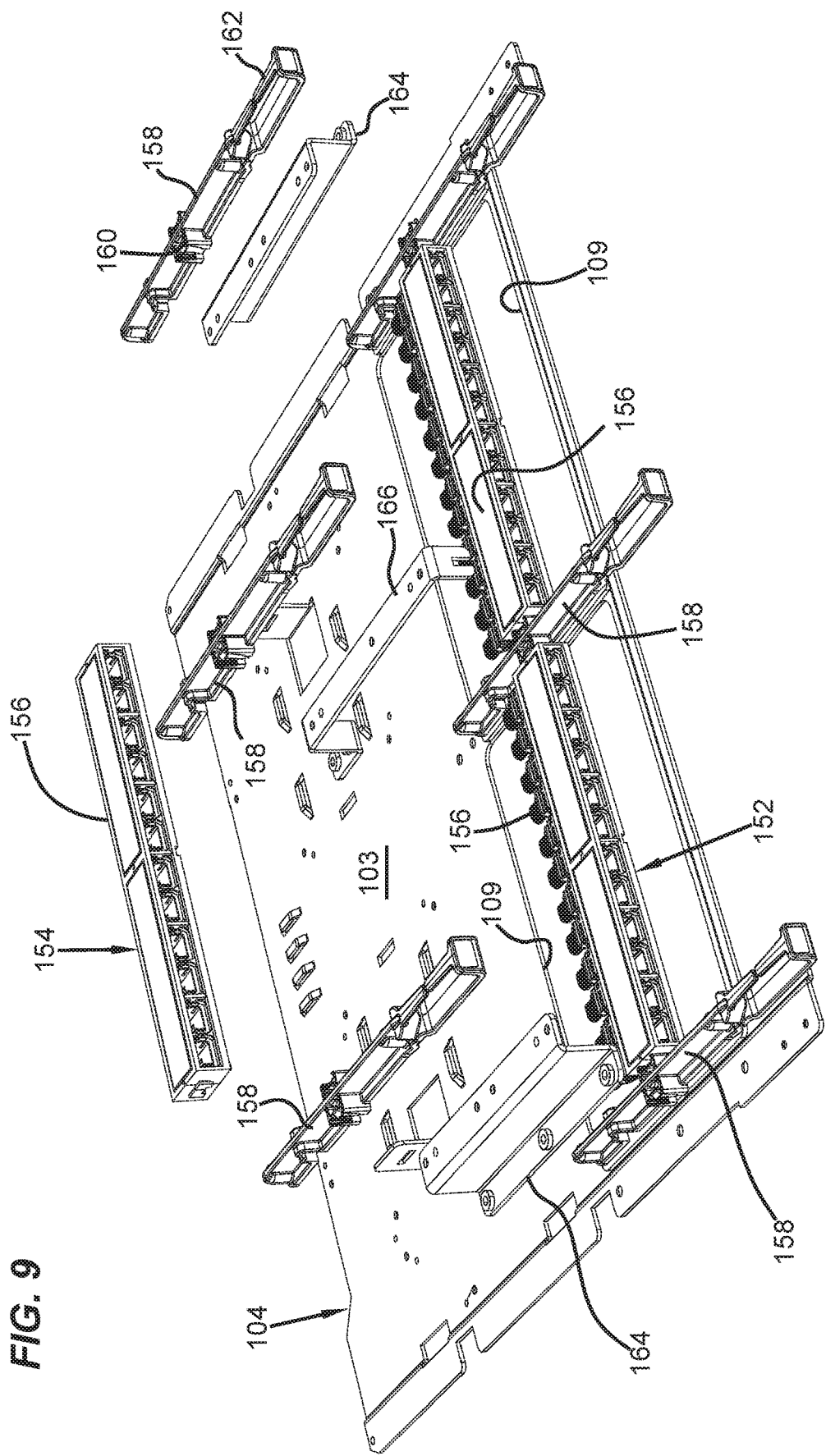
FIG. 9 is a perspective view of an example tray suitable for use with the equipment panel of FIGS. 1-6, where splice components have been removed and components of the termination region are exploded away from each other for ease in viewing.
Figure 10:
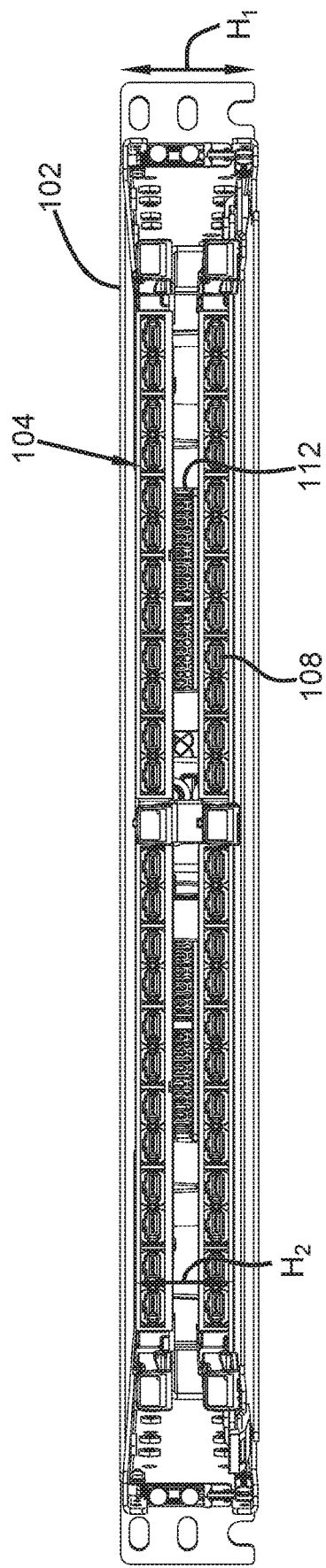
FIG. 10 is a front elevational view of the equipment panel of FIG. 1.

As shown in FIG. 9, each row of each termination region 106a, 106b may be defined by an adapter block 156. Each adapter block 156 defines a plurality of the forwardly-facing ports 108, 308 and a like plurality of rearward ports 118. Examples of suitable adapter blocks 156 are described and shown in U.S. Pat. Nos. 9,423,570, 9,285,552, and 9,379,501, the disclosures of which are hereby incorporated herein by reference in their entirety.

The adapter blocks 156 can be mounted to the tray 104, 304 using a mounting arrangement disposed towards the front of the tray 104, 304. In certain examples, the mounting arrangement includes a plurality of mounting members 158 that cooperate to retain the adapter blocks 156 at the tray 104, 304. For example, each adapter block 156 may extend between retention sections 160 of two adjacent mounting members 158.

In certain implementations, the mounting arrangement may include a second layer of mounting members 158 disposed above a first layer of the mounting members 158. Additional adapter blocks 156 are coupled to the additional mounting members 158. In FIG. 9, one of the adapter blocks 156 of the upper row is removed for ease in viewing. For example, support members 164, 166 may be disposed over the mounting members 158 of the first layer. Additional mounting members 158 may be disposed on the support members 164, 166 (see FIG. 9). In some examples, the support member 164 is mounted to the tray 104. In other examples, the support member is mounted to a respective mounting member 158 of the first layer. In still other examples, the support member 166 is mounted to both the tray 104, 304 and to a respective mounting member 158 of the first layer.

In certain implementations, each mounting member 158 has a cable retention section 162 defining a loop or other guiding/retaining structure for optical fibers. In certain examples, the cable retention sections 162 of the mounting members 158 extend forwardly of the base 103 of the tray 104, 304. Examples of suitable mounting member 158 are described and shown in U.S. Pat. No. 9,709,765, the disclosure of which is incorporated herein by reference in its entirety.

Figure 12:
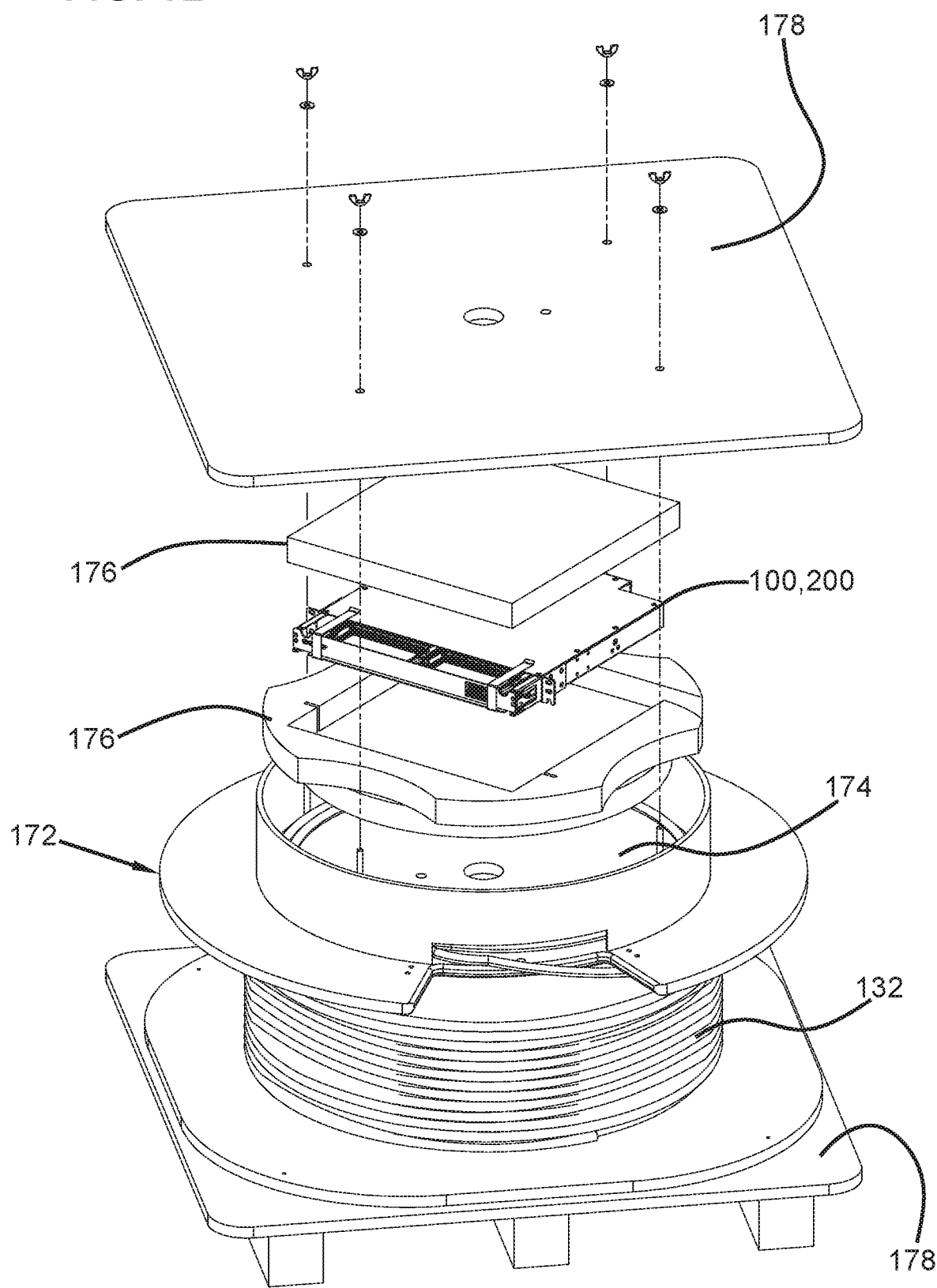
FIG. 12 is a perspective view of the equipment panel of FIG. 1 packaged with a cable spool for shipment.
Figure 13:
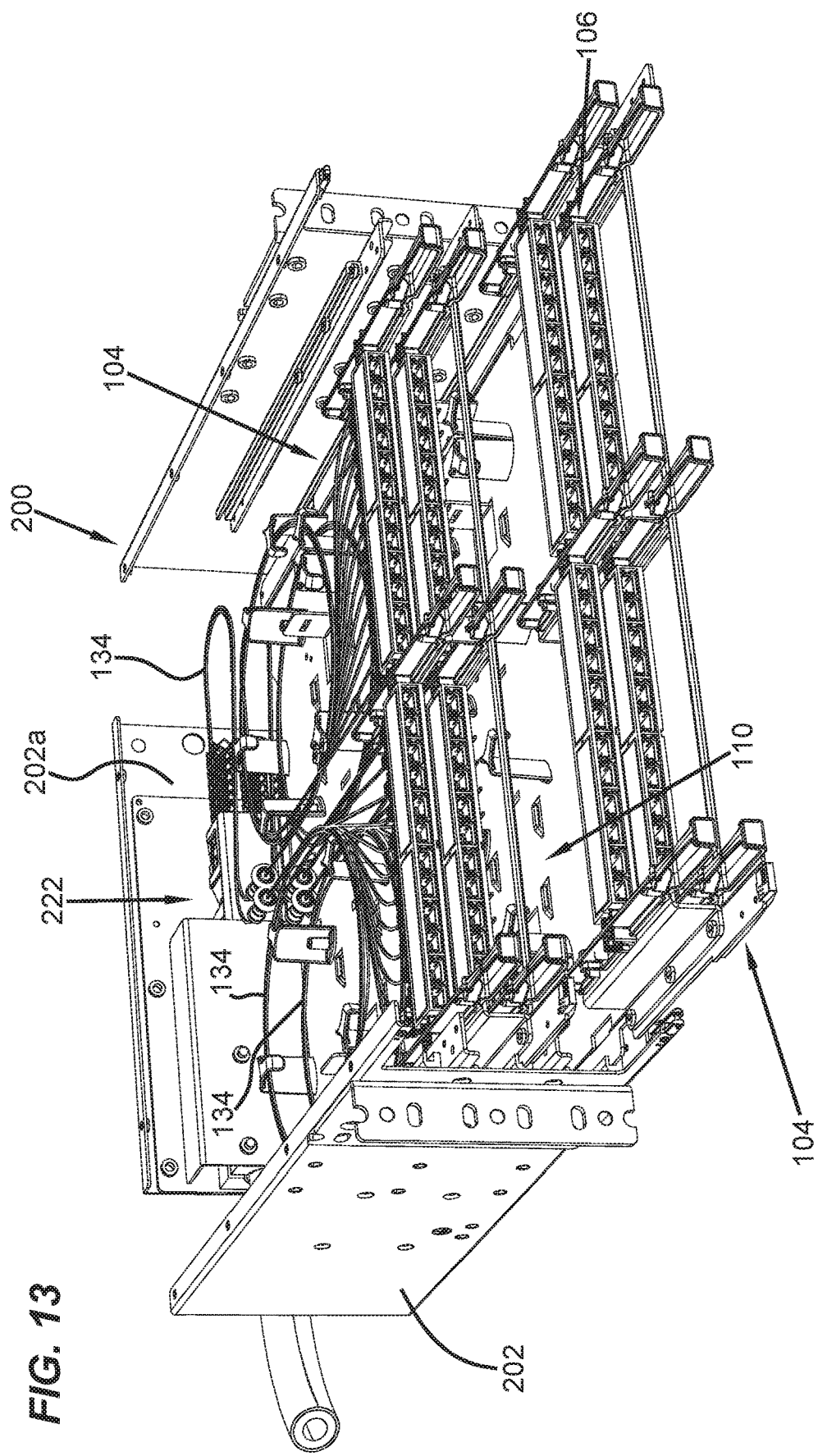
FIG. 13 is a perspective view of another example equipment panel configured in accordance with the principles of the present disclosure, the equipment panel including a chassis and three trays and having a size of 3 RU, wherein a top of the chassis and a top one of the trays have been removed for ease in viewing.

As discussed above, the equipment panel 100, 200, 300 can be pre-terminated with fibers forming a stub cable 132. As shown in FIG. 12, the equipment panel 100, 200, 300 and stub cable 132 can be packaged for shipment using a cable spool arrangement 170. The cable spool arrangement 170 includes a cable spool 172 about which the stub cable 132 is wound for ease in deployment. The cable spool 172 includes a section 174 in which the equipment panel 100, 200 may be disposed with packing material 176. A platform and cover 178 may be constructed about the spool 172 for ease in shipping.

FIGS. 15-18 illustrate an equipment panel 300 that is substantially similar to the equipment panel 100, except that the termination region 306 includes three layers 352, 354, 355 of ports. For example, the forward-facing ports 308 may include a first (e.g., lower) row 352 of ports, a second (e.g., upper) row 354 of ports, and a third (e.g., middle) row 355 of ports. In certain examples, the termination region 306 has a size of 1 rack unit (RU). In certain examples, the termination region 306 includes three layers 352, 354, 355 of ports within 1 RU.

In an example, the termination region 306 includes three rows 352, 354, 355 of twenty-four multi-fiber ports within 1 RU. In other examples, each row 352, 354, 355 may include a greater or lesser number of multi-fiber ports (e.g., six, twelve, sixteen, thirty-two, etc.) within 1 RU. In an example, the termination region 306 accommodates 864 fibers within 1 RU. In other examples, the termination region 306 accommodates a greater or lesser number of fibers (e.g., 576 fibers, 1728 fibers, 1440 fibers, etc.) within 1 RU. For example, the termination region 306 could accommodate 1728 fibers if twenty-four fiber multi-fiber plug connectors were received at the ports of the three rows.

In certain implementations, each splice region 110 of the equipment panel 300 also includes three layers that correspond to the three layers 352, 354, 355 of the termination region. For example, for optical fibers 115 routed between the termination region 306 and the splice region 110, the optical fibers 115 from the first layer 352 extend to the first (e.g., bottom) layer of splice holders, the optical fibers 115 from the second layer 354 extend to the second (e.g., top) layer of splice holders, and the optical fibers 115 from the third layer 355 extend to the third (e.g., middle) layer of splice holders.

Accordingly, in certain implementations, a trunk cable 130 or stub cable 132 may be fanned out into six cable sub-units per tray 104, 304. A first cable sub-unit 134 is routed to the lower row 352 of ports at the first termination region 306a, a second cable sub-unit 134 is routed to the upper row 354 of ports at the first termination region 306a, a third cable sub-unit 134 is routed to the middle row 355 of ports at the first termination region 306a, a fourth cable sub-unit 134 is routed to the lower row 352 of ports at the second termination region 306b, a fifth cable sub-unit 134 is routed to the upper row 352 of ports at the second termination region 306b, and a sixth cable sub-unit 134 is routed to the middle row 355 of ports at the second termination region 306b. In certain implementations, each cable sub-unit 134 also may be routed to a respective layer of a respective splice region 110a, 110b.

Each row 352, 354, 355 of each termination region 306a, 306b includes an adapter block 156 defining a plurality of the forwardly-facing ports 308 and a like plurality of rearward ports. The adapter blocks 156 can be mounted to the tray 304 using a mounting arrangement disposed towards the front of the tray 304. In certain examples, the mounting arrangement includes a plurality of mounting members 358 that cooperate to retain the adapter blocks 156 at the tray 304. For example, each adapter block 156 may extend between retention sections 360 of two adjacent mounting members 358.

In certain implementations, the mounting arrangement may include multiple layers of mounting members 358. For example, each layer or row 352, 354, 358 of adapter blocks corresponds to one of the layers of mounting members 358. In the example shown in FIG. 17, the mounting arrangement includes three layers of mounting members 358 stacked above each other. In other implementations, the mounting members 358 may be laterally offset from each other along a width or depth of the equipment panel 300.

Figure 18:
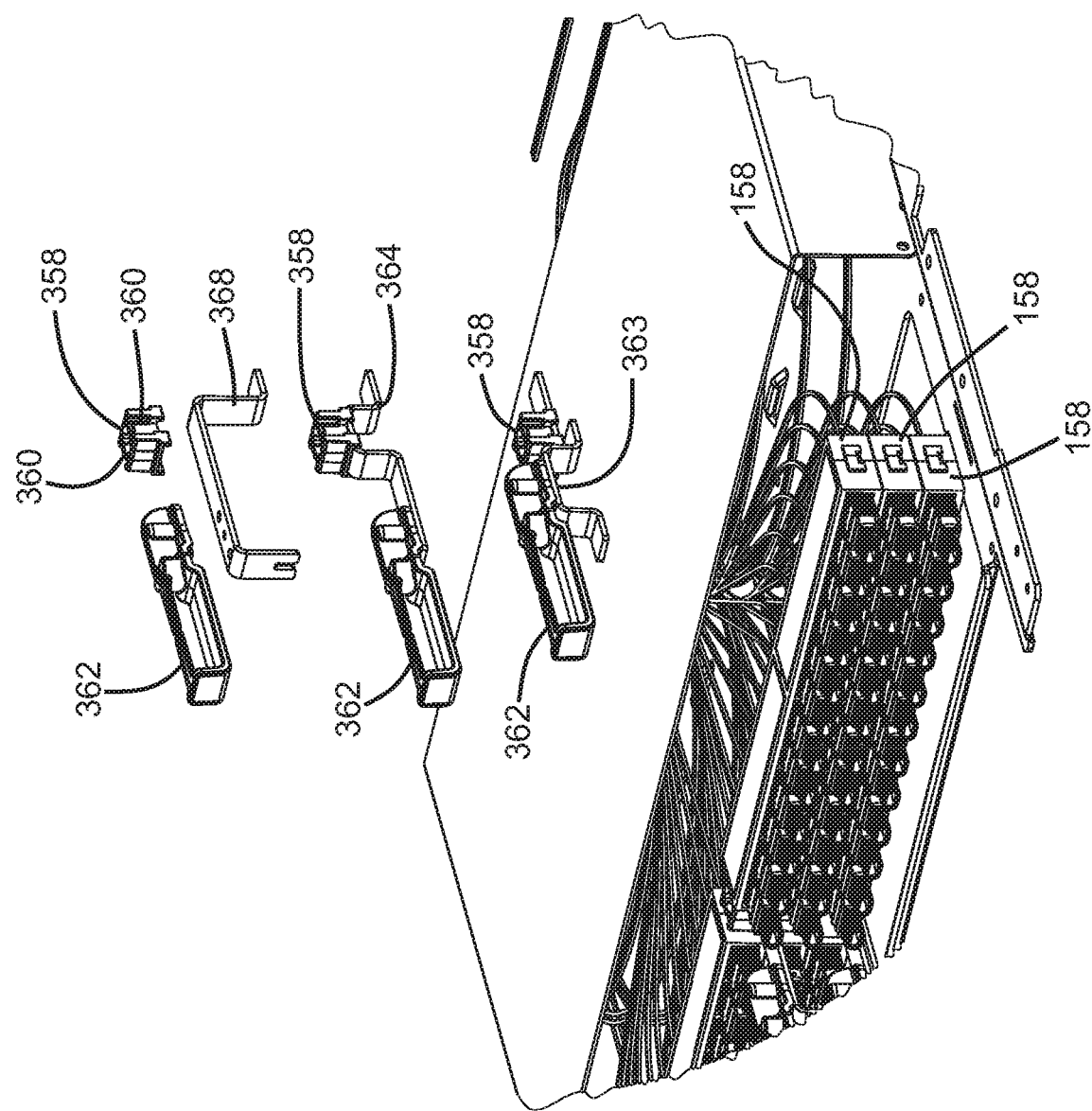
FIG. 18 shows the mounting arrangement and guiding/retaining structures of the equipment panel of FIG. 17 exploded from a tray of the equipment panel.

In certain implementations, one or more of the mounting members 358 may be mounted to support members 366, 368. As shown in FIG. 18, mounting members 358 of the bottom layer 352 are disposed on the tray 304 or mounting base thereon. Mounting members 358 of the middle layer 355 are disposed on a first support member 366 that raises the corresponding mounting member 358 above the bottom layer 352. Mounting members 358 of the top layer 354 are disposed on a second support member 368 that raises the corresponding mounting members 358 above the middle layer 355.

In certain implementations, the tray 304 may carry one or more loop or other guiding/retaining structures 362 to manage the optical fibers. In certain examples, the guiding/retaining structures 362 extend forwardly of a base 303 of the tray 304. In certain examples, one or more guiding/retaining structures 362 is provided for each layer 352, 354, 355 of the termination region 306. In certain examples, the guiding/retaining structures 362 for the middle and top rows 355, 354 are mounted to support members. In the example shown, the guiding/retaining structures 362 for the top row 354 is mounted to the second support member 368 and the guiding/retaining structures 362 for the middle row 355 is mounted to a third support member 363.

In certain examples, some of the guiding/retaining structures 362 are stacked above each other. In certain examples, one or more of the guiding/retaining structures 362 are offset from others of the guiding/retaining structures 362 along the width of the equipment panel 300. In the example shown in FIG. 16, the guiding/retaining structures 362 for the middle row 355 are offset laterally outward relative to the guiding/retaining structures 362 for the bottom and top rows 352, 354. In certain examples, the third support members 363 holding the guiding/retaining structures 362 of the middle row 355 also are laterally offset from the other support members 364, 368.

Figure 17:
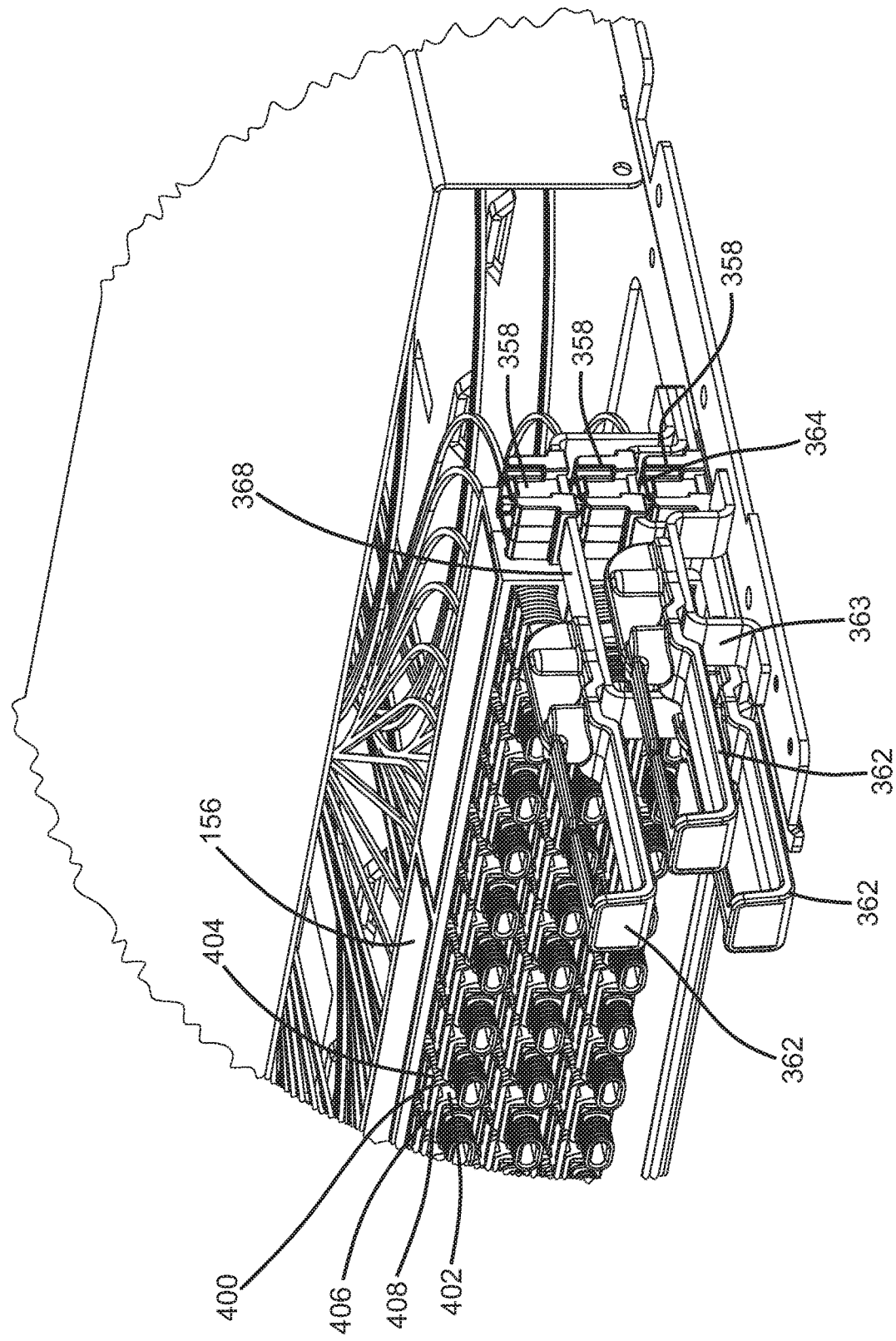
FIG. 17 is an enlarged view of a portion of the equipment panel of FIG. 15.

As seen in FIG. 17, one example type plug connector suitable for insertion into the front ports 308 includes a multi-fiber connector 400. The connector 400 includes a connector body 402 and a release sleeve 404 that slides over the connector body 402. When finger access is available, the release sleeve 404 is pulled relative to the connector body 402 by hand to remove the plug 400 from a port 308. The plug 400 is pushed by hand into the port 308 to install the plug.

In accordance with some aspects of the disclosure, disposing the front ports 308 of the termination region 306 into three rows 352, 354, 355 results in a plug density that inhibits insertion and removal of the corresponding plugs. For example, the plugs received at the middle row 355 of front ports 308 would interfere with the finger access needed to insert and/or remove plugs from the bottom or top rows 352, 354. When finger access is not available, however, such as when the front ports 308 are layered in three rows within 1 RU, a tool can be used to insert and/or remove the plug 400 from the port 308.

FIGS. 19-24 illustrate various tools 410, 430, 450 suitable for use in inserting and/or removing plug connectors from the multi-layer termination regions 306. Each tool 410, 430, 450 extends between a first end 412, 432, 452 and an opposite second end 414, 434, 454. Each tool 410, 430, 450 includes two arms 416, 436, 456 coupled together at the second end 414, 434, 454 by a biasing section 418, 438, 458. Free ends of the arms 416, 436, 456 at the first end 412, 432, 452 of the tool 410, 430, 450 include catch members 420, 440, 460 that extend inwardly towards each other. The biasing section 418, 438, 458 biases the catch members 420, 440, 460 apart. A user can squeeze the arms 416, 436, 456 to bring the catch members 420, 440, 460 together.

In use, the user inserts a plug 400 by pressing the catch members 420, 440, 460 about the connector body 402 or boot rearward of the release sleeve 404. For example, the user may push the tool 410, 430, 450 against the plug 400 including pressing the catch members 420, 440, 460 against an outer edge 408 of the connector body 402 to move the plug 400 into the port 308. To remove the plug 400, the user positions the catch members 420, 440, 460 forward of a rear flange 406 of the release sleeve 404. While engaging the catch members 420, 440, 460 with the rear flange 406 (e.g., by squeezing the arms 416, 436, 456), the user pulls back on the tool 410, 430, 450, thereby entraining the release sleeve 404 to move the release sleeve 404 to the release position. Continued rearward movement of the tool 410, 430, 450 pulls the plug 400 out of the port 308.

Figure 19:
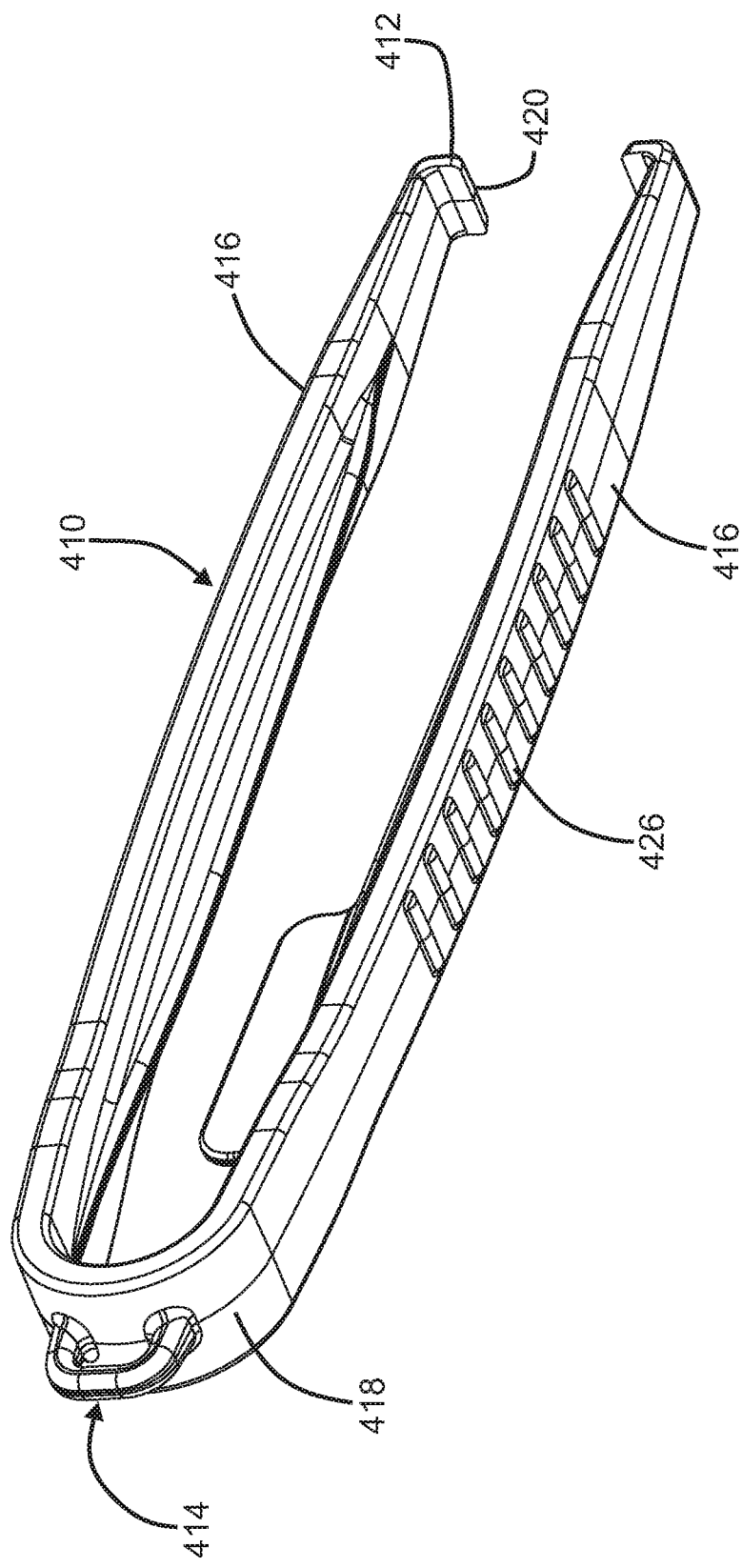
FIG. 19 is a perspective view of a first example tool for inserting and/or removing plug connectors at the equipment panel of FIG. 15.
Figure 20:
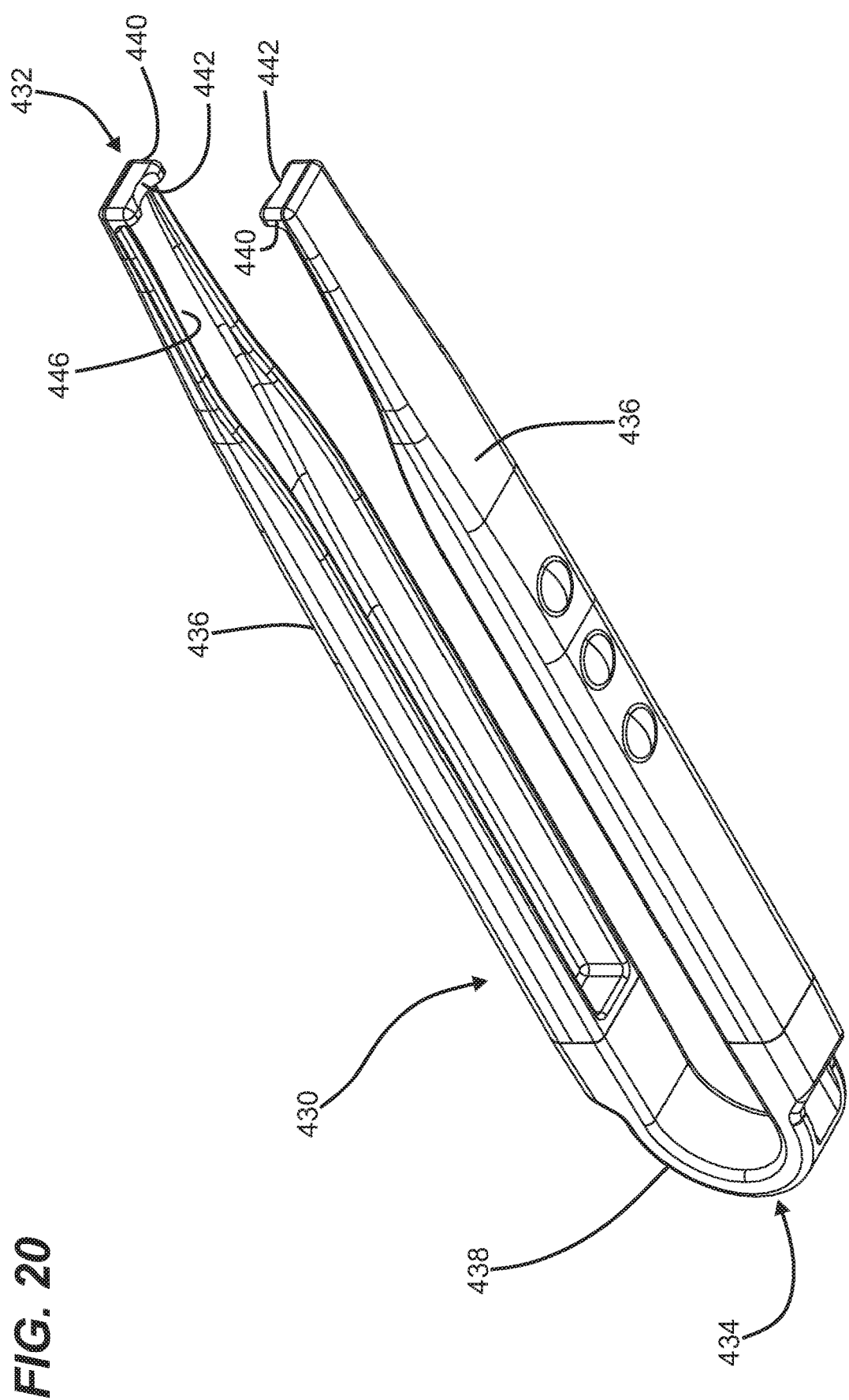
FIG. 20 is a perspective view of a second example tool for inserting and/or removing plug connectors at the equipment panel of FIG. 15, the second tool being assembled from multiple pieces.
Figure 21:
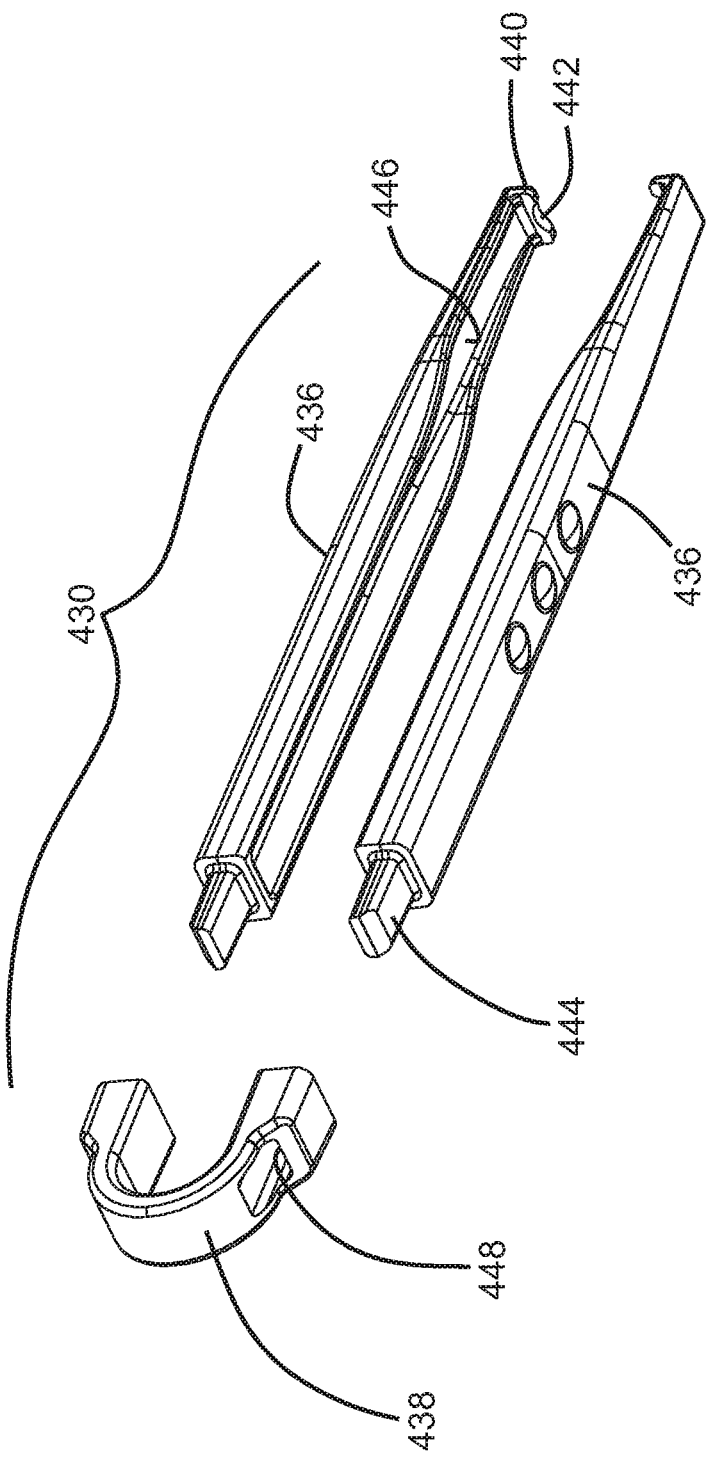
FIG. 21 shows the multiple pieces of the second tool of FIG. 20 exploded away from each other.
Figure 22:
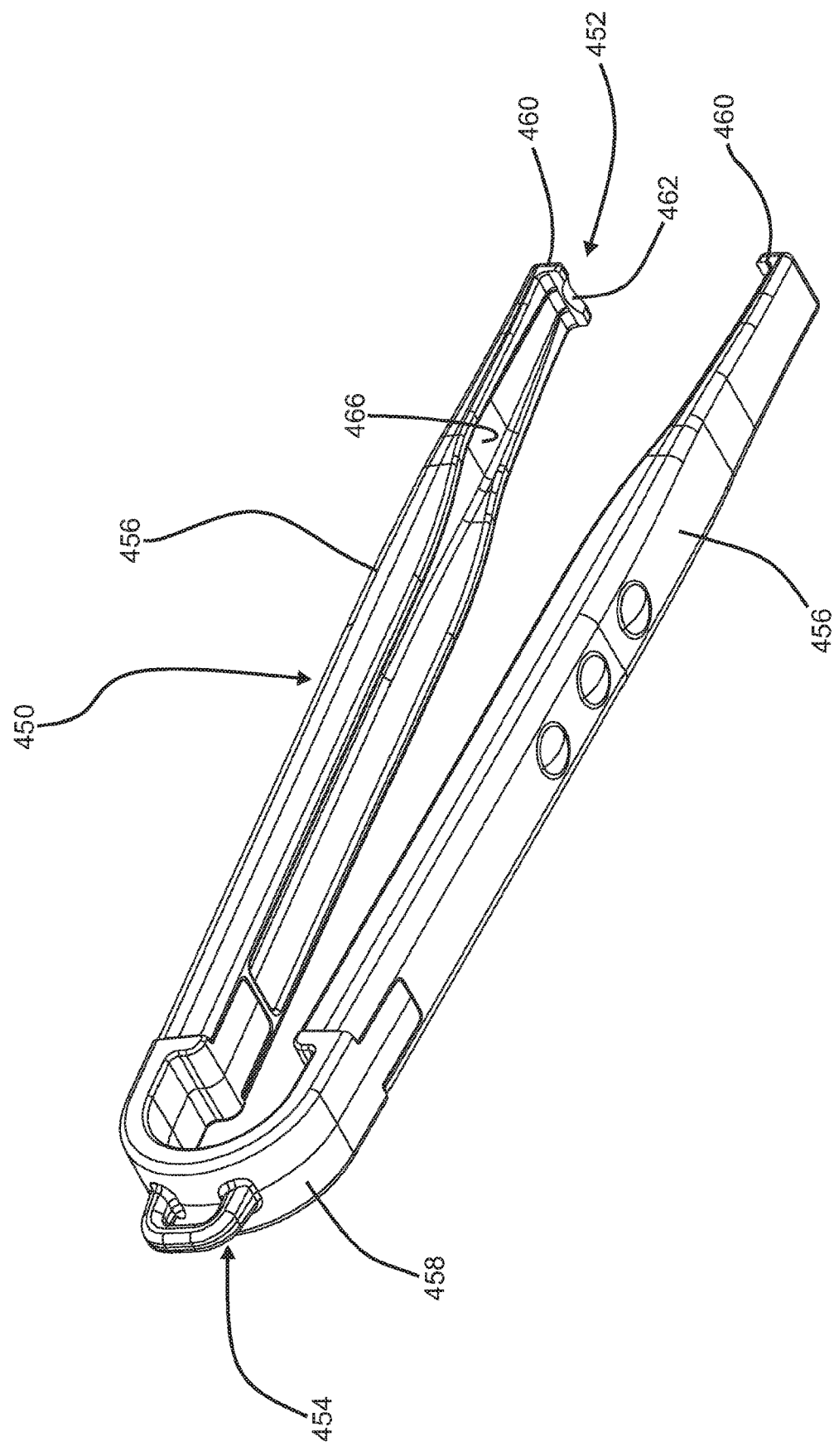
FIG. 22 is a perspective view of a third example tool for inserting and/or removing plug connectors at the equipment panel of FIG. 15, the third tool being assembled from multiple pieces.
Figure 23:
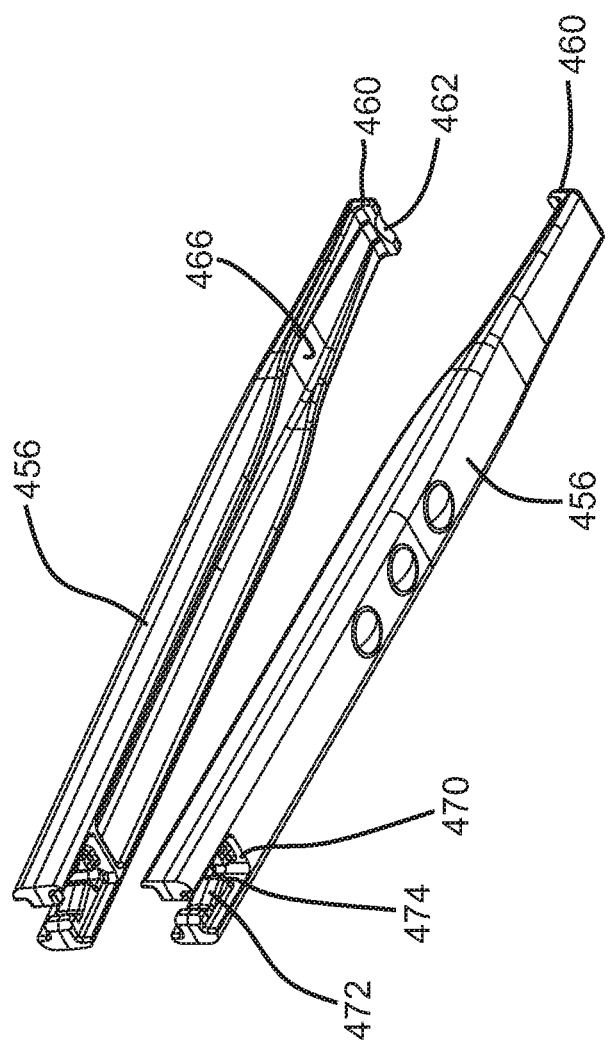
FIG. 23 is a first perspective view showing the multiple pieces of the third tool of FIG. 22 exploded away from each other.
Figure 23:
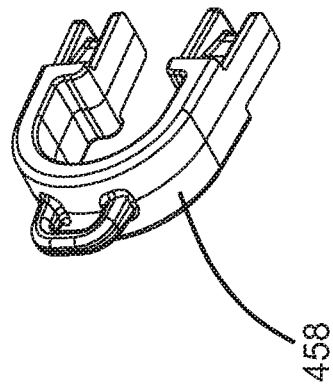
Figure 24:
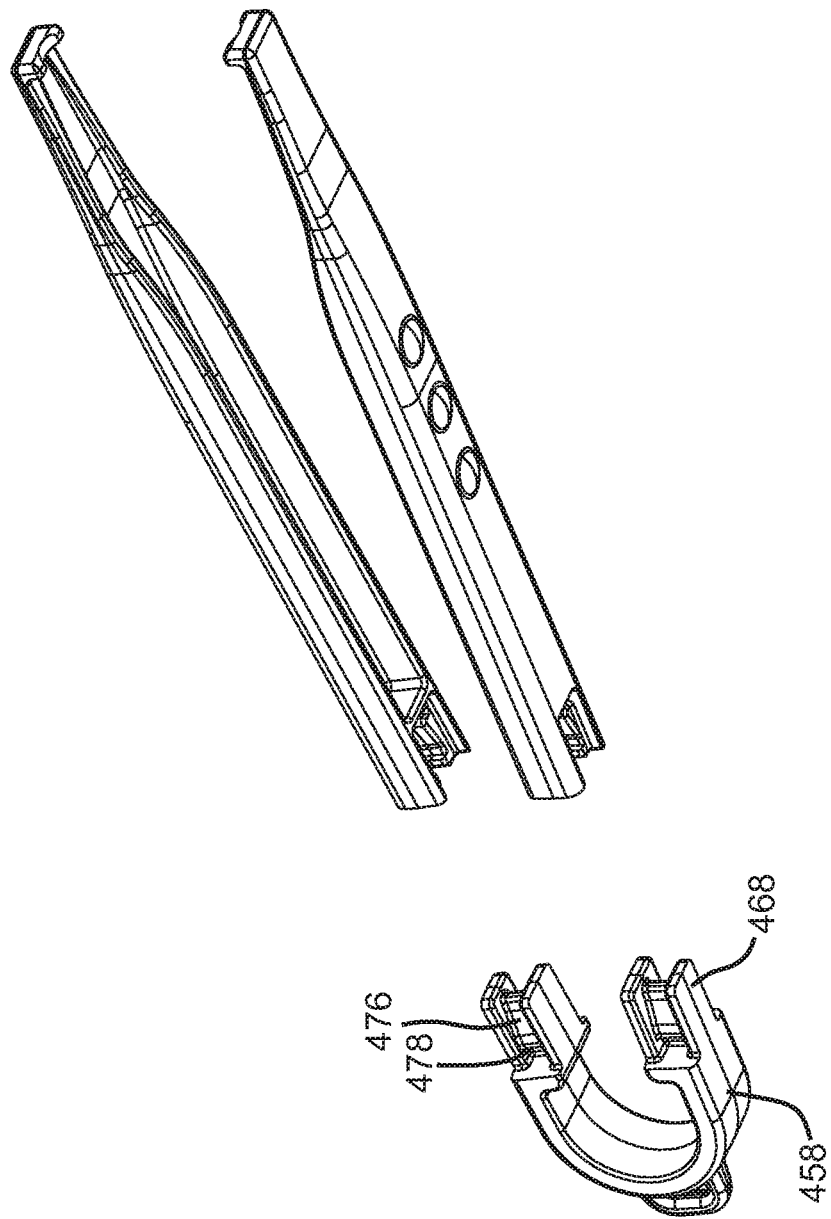
FIG. 24 is a second perspective view showing the multiple pieces of the third tool of FIG. 22 exploded away from each other.
Figure 25:
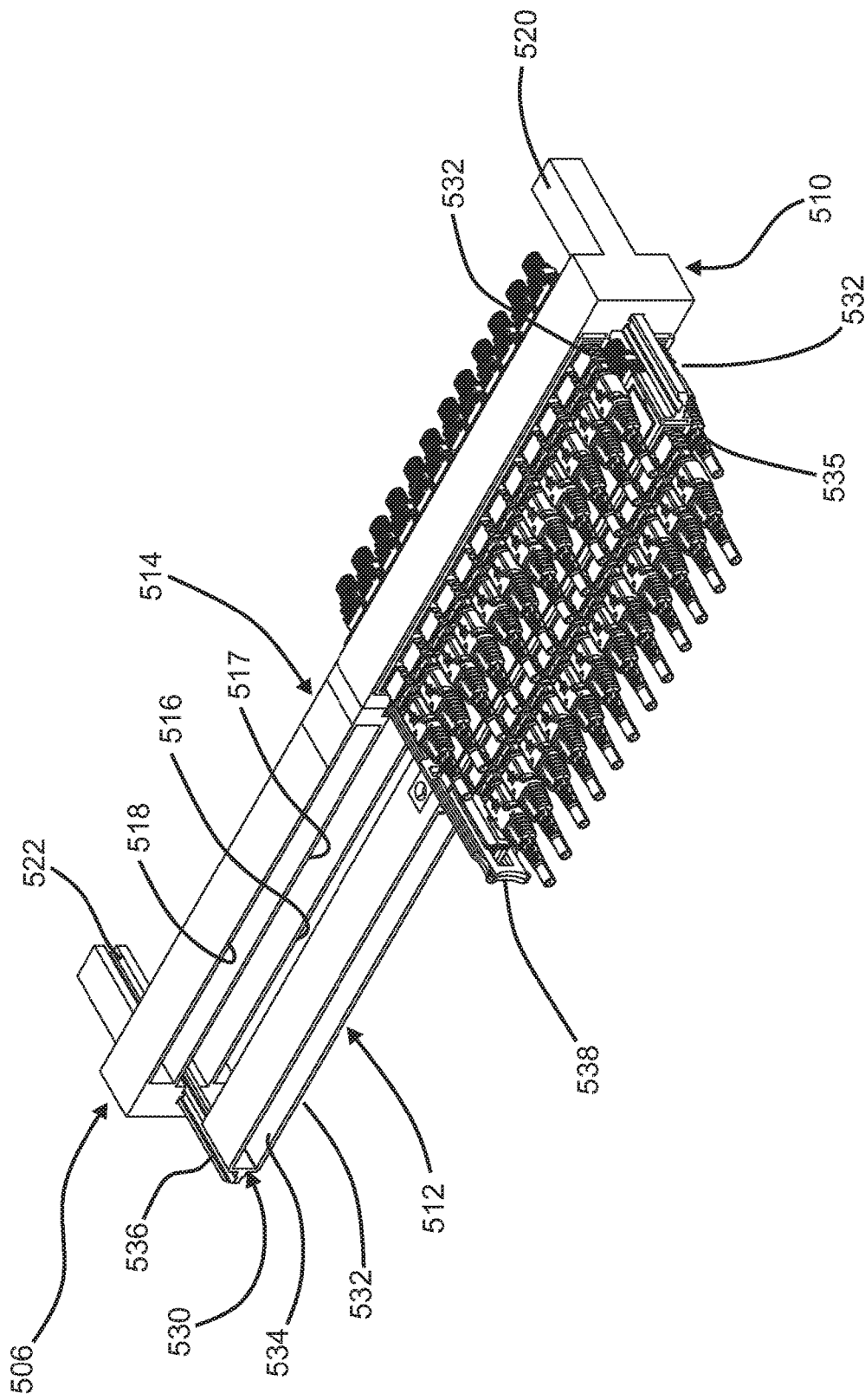
FIG. 25 is a perspective view of an example termination region suitable for mounting to the tray of any of the equipment panels disclosed herein, the termination region including a first layer, a second layer, and a third layer that shown in a forward axial position relative to the first and second layers.
Figure 26:
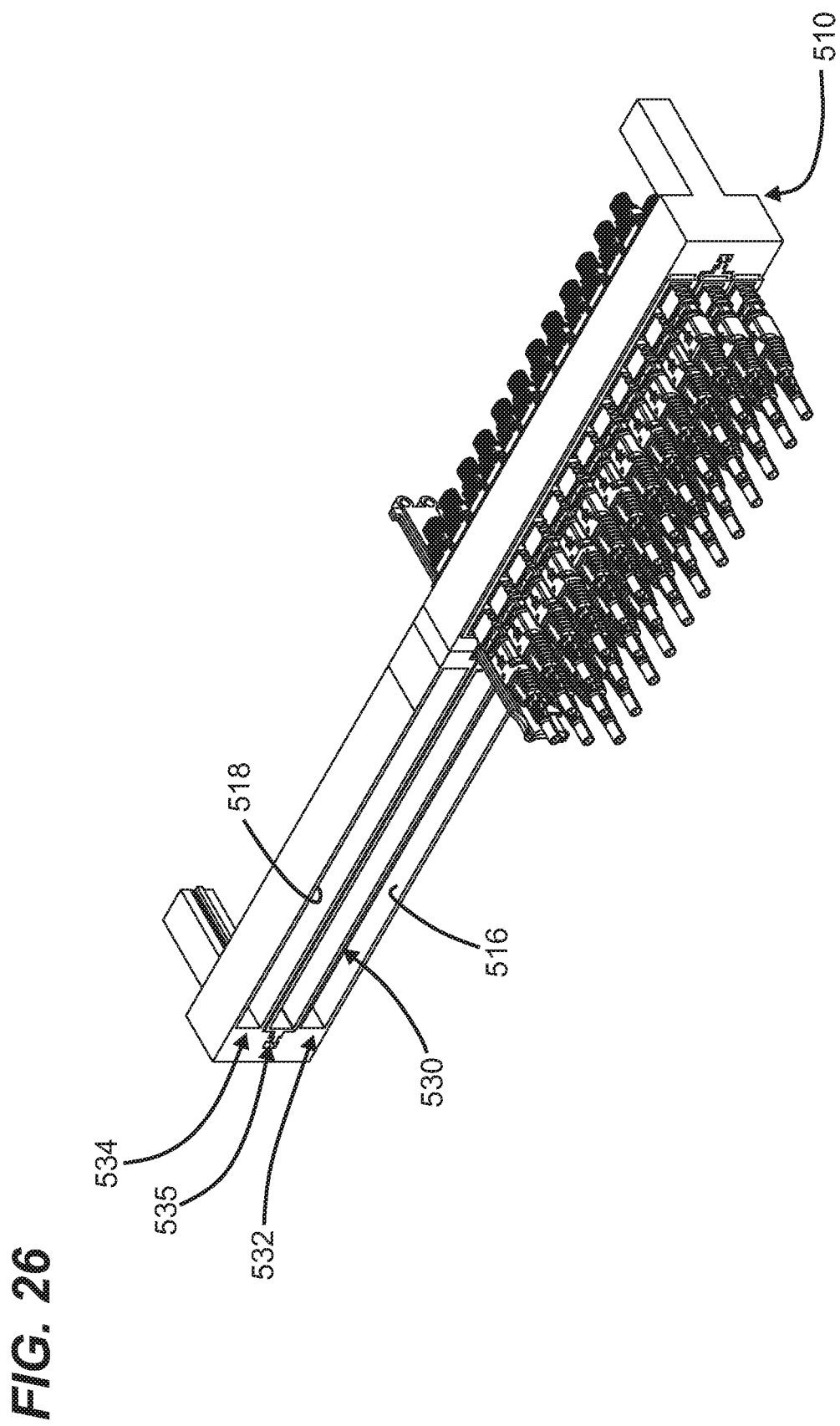
FIG. 26 shows the third layer of the termination region of FIG. 25 in a common axial position with the first and second layers.

A first example tool 410 shown in FIG. 19 is integrally formed. Second and third example tools 430, 450 includes separate arms 436 that are coupled to the biasing section 438. In the second tool 430 shown in FIGS. 20 and 21, each arm 436 may include an insert 448 sized and shaped to fit within a mounting aperture 448 defined by the biasing section 438. In the third tool 450 shown in FIGS. 22-24, each arm 456 includes a notch 470 in which two ramped members 472 extend inwardly to define a shoulder 474 facing the first end 452 of the tool 450. The biasing section 458 includes inserts 468 that each include a tapered portion 476 that defines shoulders 478 facing the second end 454 of the tool 450. Each insert 468 is configured to be received within one of the notches 470 until the shoulders 478 of the insert 468 engage the shoulders 474 of the notch 470.

In some implementations, the catch members 420 have flat edges that move towards each other when the arms 416 are squeezed. In other implementations, the catch members 440, 460 define contoured surfaces 442, 462 shaped to conform to the shape of the connector body 402 and/or the boot extending from the plug connector 400. In the example shown, the contoured surface 442, 462 defines a concave notch.

In certain implementations, the arms 436, 456 are contoured to better accommodate the shape of the plug connector 400 and/or the cables extending therefrom. For example, the arms 436, 456 may define an inwardly-facing groove or channel 446 sized and shaped to fit around the boot and/or cable extending from the plug connector 400.

Referring now to FIGS. 25-30, another example termination region 506 suitable for use with the trays 104, 304 is shown. The termination region 506 has a front 512 and a rear 514. The termination region 506 also includes three layers (e.g., rows) 532, 534, 535 of front ports. In an example, the termination region 306 may include three rows 532, 534, 535 of twenty-four multi-fiber ports (e.g., adapters). In other examples, each row 532, 534, 535 may include a greater or lesser number of multi-fiber ports (e.g., six, twelve, sixteen, thirty-two, etc.).

In certain examples, the termination region 506 has a size of 1 RU. In certain examples, the termination region 506 includes three layers 532, 534, 535 of ports within 1 RU. In some examples, the ports are defined by optical adapters oriented to extend further laterally than up-and-down. In an example, the termination region 506 accommodates 864 fibers within 1 RU. In other examples, the termination region 506 accommodates a greater or lesser number of fibers (e.g., 576 fibers, 1728 fibers, 1440 fibers, etc.) within 1 RU. For example, the termination region 506 could accommodate 1728 fibers if twenty-four fiber multi-fiber plug connectors were received at the ports of the three rows.

In accordance with certain aspects of the disclosure, the middle row 535 of the termination region 506 is movable relative to the bottom and top rows 532, 534 to provide finger access when needed. For example, the middle row 535 may be disposed forwardly of the bottom and top rows 532, 534 to provide finger access to plugs received in the middle row 535 of front ports. The middle row 535 may be disposed rearwardly of the bottom and top rows 532, 534 to provide finger access to plugs received in the bottom and/or top rows 532, 534 of front ports.

In some implementations, the middle row 535 slides forwardly and rearwardly relative to the bottom and top rows 532, 534. In certain implementations, the termination region 506 includes a bulkhead 510 defining one or more bottom openings 516, one or more middle openings 517, and one or more top openings 518. Optical adapters (e.g., multi-fiber adapters) or adapter packs can be mounted within the bottom and top openings 516, 518. The adapters or adapter packs within the bottom and top openings 516, 518 remain stationary relative to the bulkhead 510. A frame 530 movably mounts within the middle opening 517. One or more adapters or adapter packs mounted to the frame 530. For example, the frame 530 includes a body 532 defining one or more openings 534 within which the adapters or adapter packs mount.

The bulkhead 510 includes a rearward extension 520 that aligns with the middle opening 517. The bulkhead 510 defines a groove 522 that extends through the middle opening 517 and along the rearward extension 520. In certain examples, the bulkhead 510 includes a respective rearward extension 520 at each of the opposite ends of the bulkhead 510. The frame 530 includes one or more rearwardly extending rails 536 each configured to slide within the groove 522 of a respective rearward extension 520.

Figure 27:
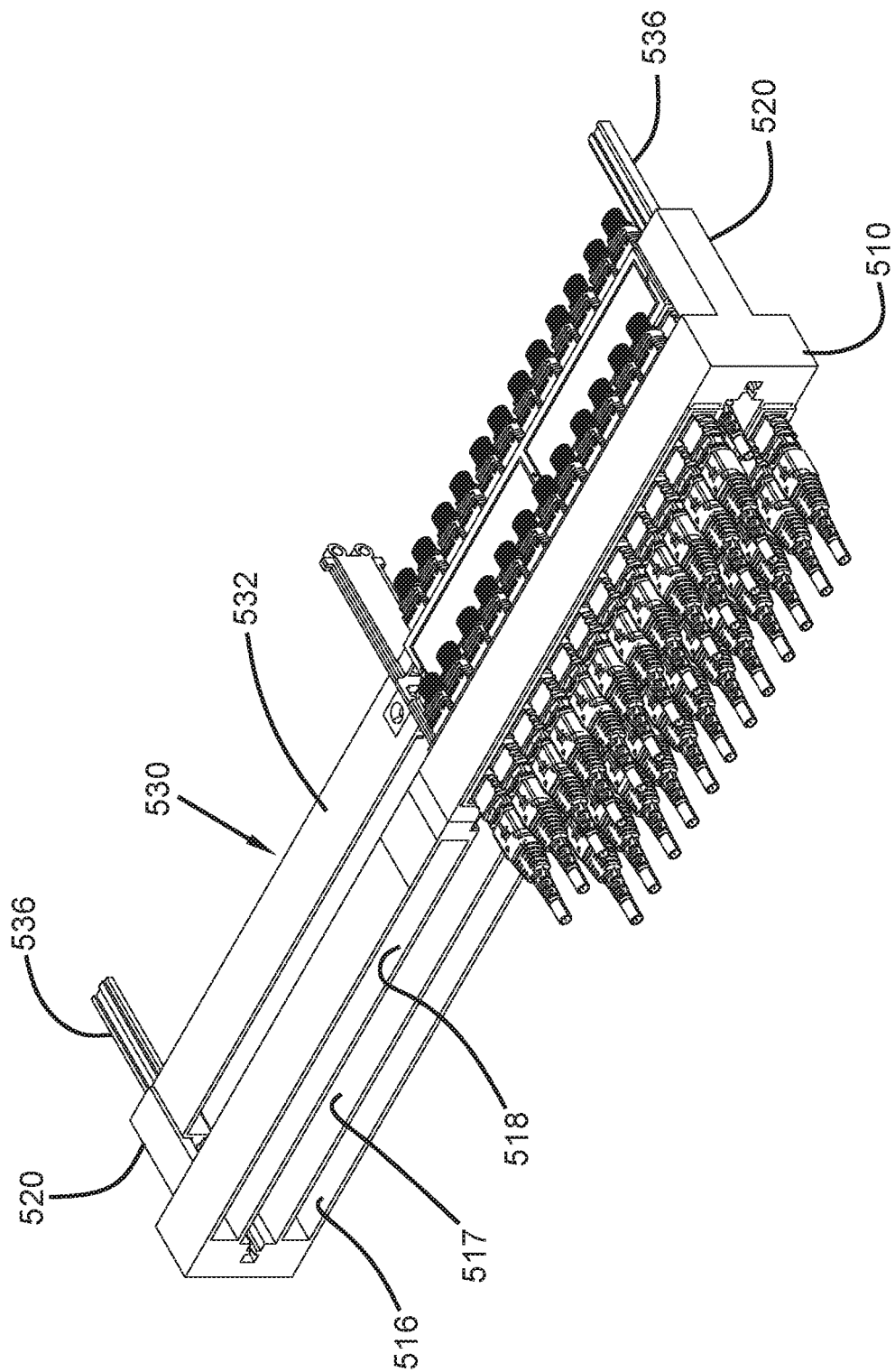
FIG. 27 shows the third layer of the termination region of FIG. 25 in a rearward axial position relative to the first and second layers.

The frame 530 slides along the groove(s) 522 between at least two positions—a first position in which the body 532 is forward of the bulkhead 510 (e.g., see FIG. 25) and a second position in which the body 532 is rearward of the bulkhead 510 (e.g., see FIG. 27). In certain examples, the frame 530 can also be moved to a third position in which the body 532 of the frame 530 is disposed within the middle opening 517 (e.g., see FIG. 26). In an example, the forward-facing ports carried by the frame 530 are flush with the forward-facing ports of the bottom and top rows 532, 534 when the frame 530 is disposed in the third position.

In certain implementations, the first position is about ¾ inches forward of the third position and the second position is about ¾ inches rearward of the third position. In other implementations, the first and second positions can be other distances from the third position. In certain examples, the first and second positions are a common distance from the third position.

In certain implementations, the frame 530 can be locked to the bulkhead 510 in at least one of the three positions. For example, the frame 530 may be locked to the bulkhead 510 in the third position. In some example, the frame 530 also may be locked to the bulkhead 510 in one or both of the first and second positions. In other examples, the frame 530 only locks to the bulkhead 510 in the third (e.g., flush) position.

Figure 28:
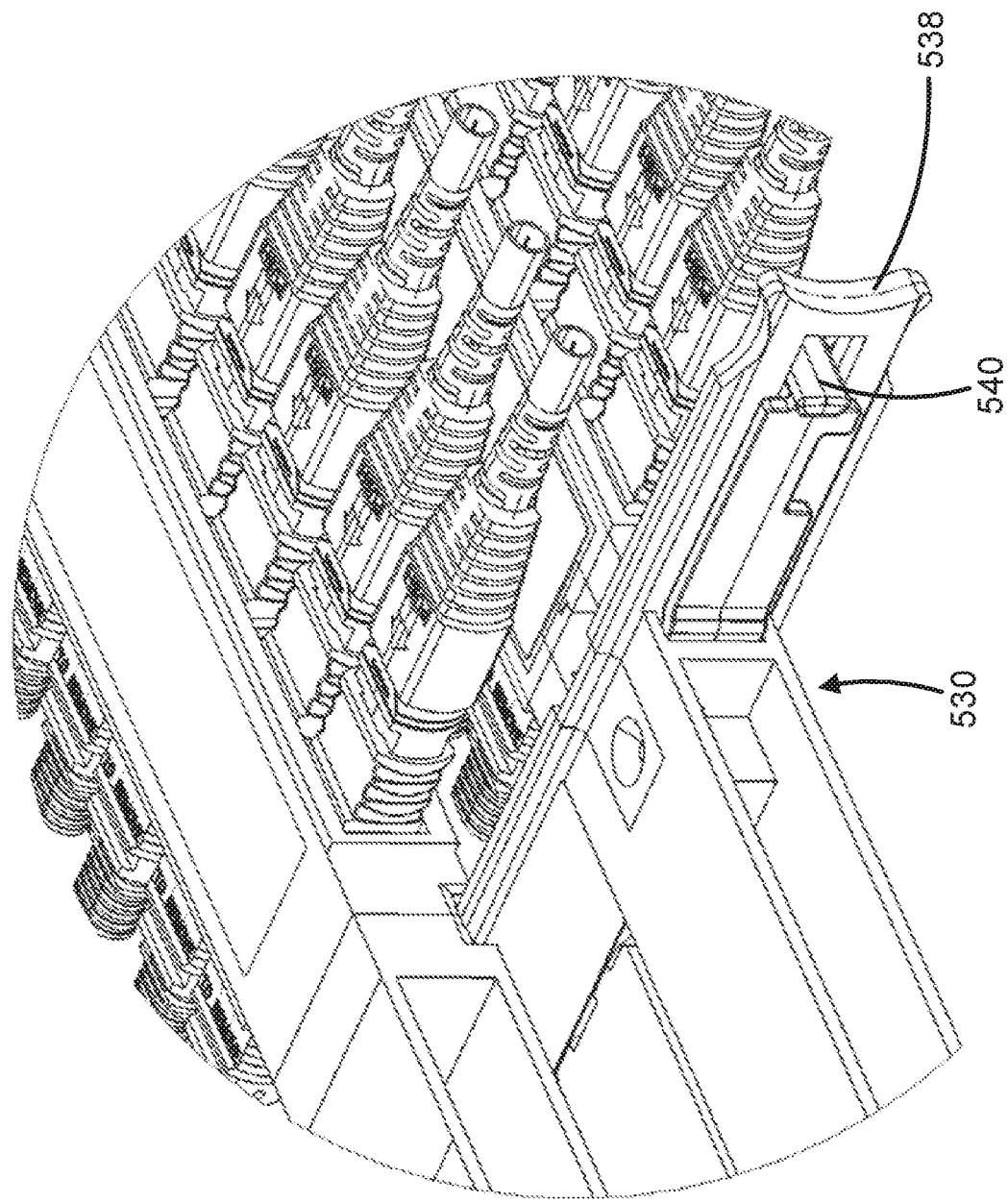
FIG. 28 is a perspective view of a portion of the middle layer of the termination region of FIG. 25, the portion including a handle and actuator.
Figure 29:
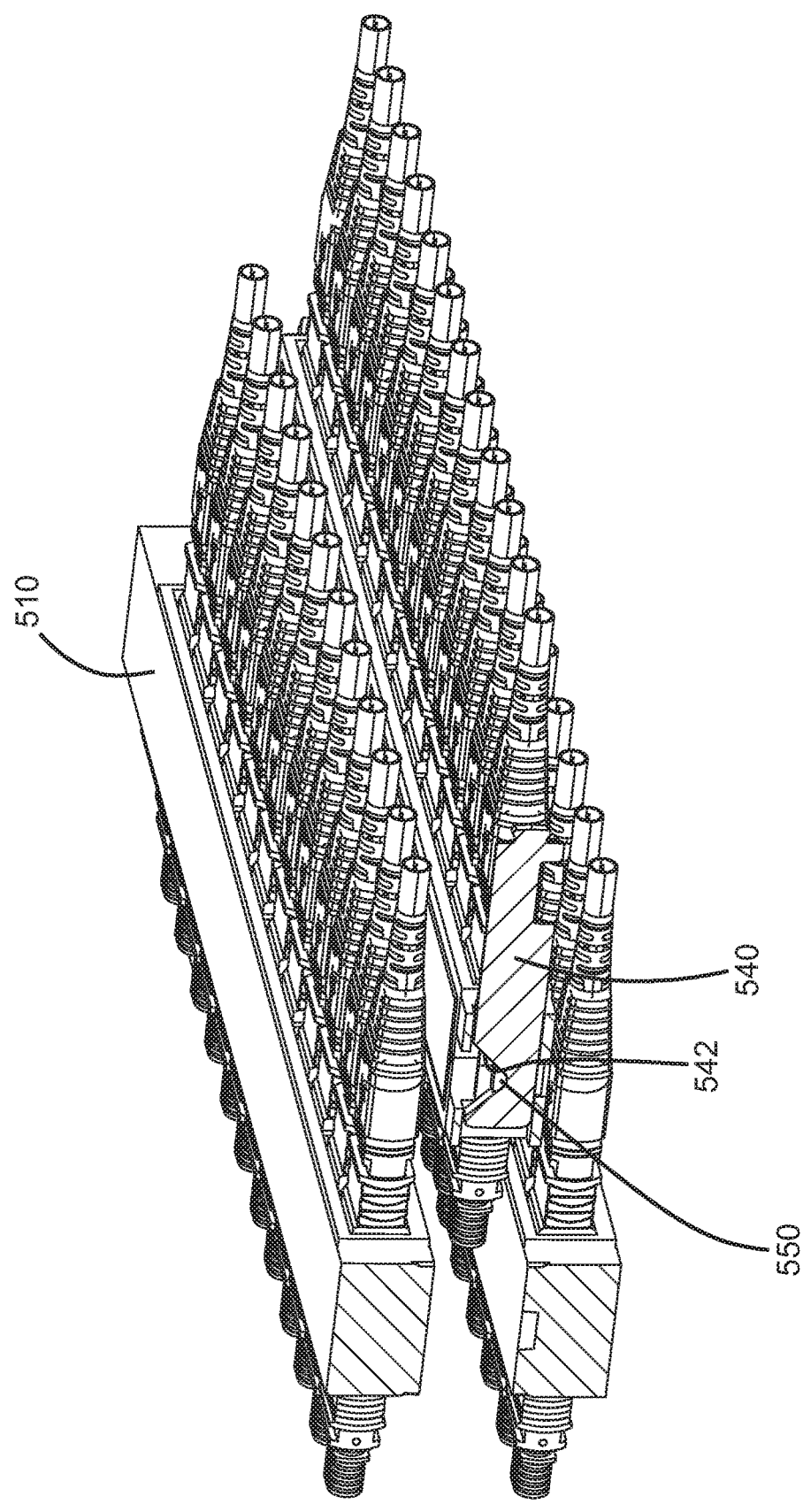
FIG. 29 is a transverse cross-section of the termination region of FIG. 25 cut through the handle so that a body of the actuator is visible.
Figure 30:
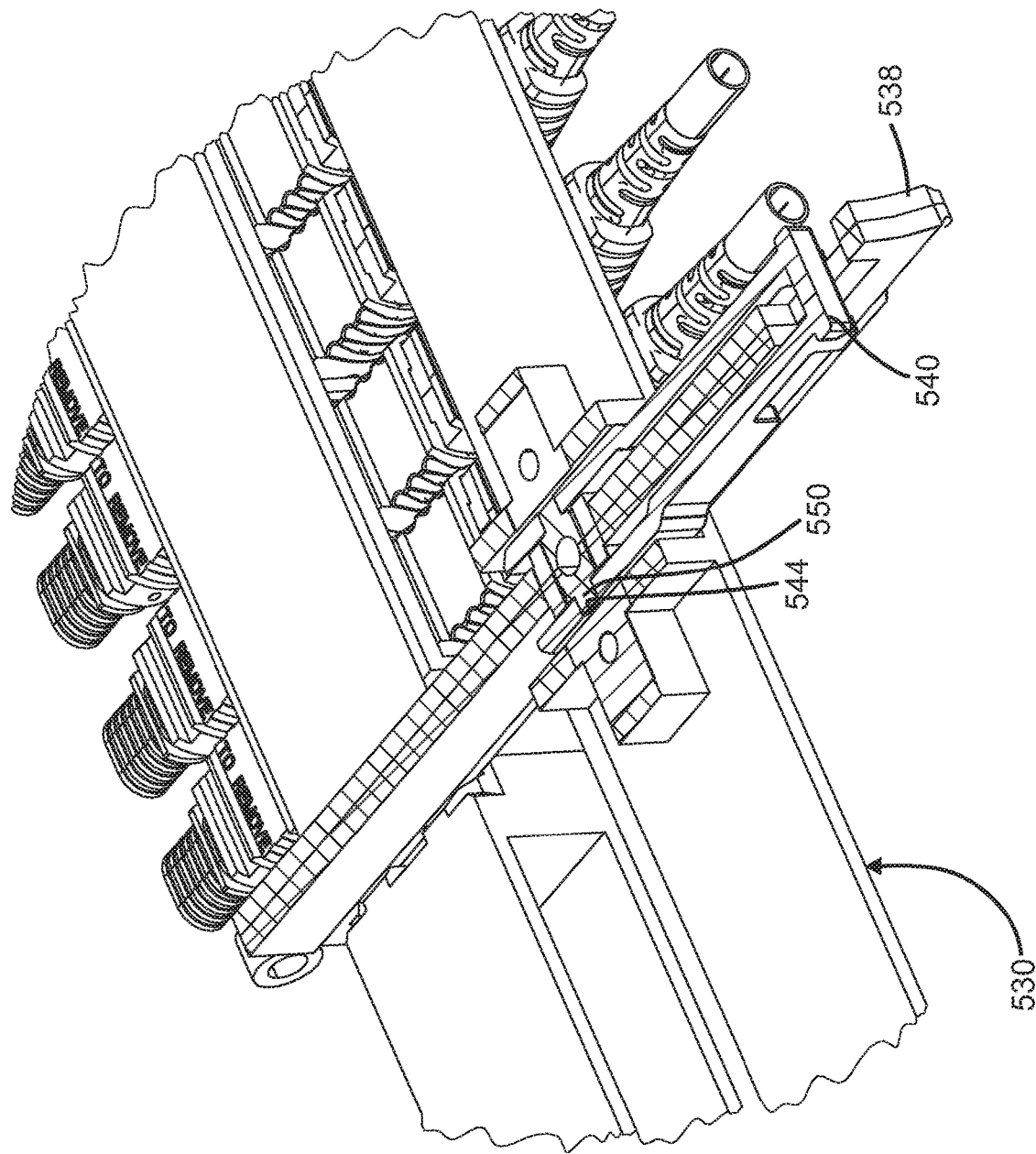
FIG. 30 is another transverse cross-section of the termination region of FIG. 25 cut through the handle at a 90 degree angle from the cross-section of FIG. 29.

As shown in FIGS. 28-30, the frame 530 includes a handle 538 that facilitates moving the frame 530 relative to the bulkhead 510. In certain implementations, the handle 538 carries an actuator 540 for releasing the frame from its locked position relative to the bulkhead 510. For example, the actuator 540 may move (e.g., slide) relative to the handle 538 to release the lock. Accordingly, moving the actuator 540 relative to the handle 538 releases the frame 530 for movement relative to the bulkhead 510.

In the example shown, the lock includes a notch 544 defined by the frame body 532 and a pin 550 movable relative to the frame in and out of the notch 544. The actuator 540 defines a cam surface 542 along which the pin 550 rides in and out of a notch 544. In certain examples, the pin 550 is movable up and down relative to the bulkhead 510, but cannot move along a plug insertion axis relative to the bulkhead 510. Accordingly, moving the actuator 540 relative to the handle 538 causes the pin 550 to raise and lower relative to the frame 530. When the pin 550 enters the notch 544 (e.g., lowers), the frame 530 is locked relative to the bulkhead 510. When the pin 550 leaves the notch 544 (e.g., raises), the frame 530 is free to move along the groove 522 of the bulkhead 510.

Referring now to FIGS. 31-37, alternative termination regions 606, 636, 706 may include two rows of multi-fiber ports. To increase density relative to the two layer termination region 106, the multi-fiber adapters defining the ports are rotated 90 degrees so that more multi-fiber ports are accommodated in each row.

Figure 31:
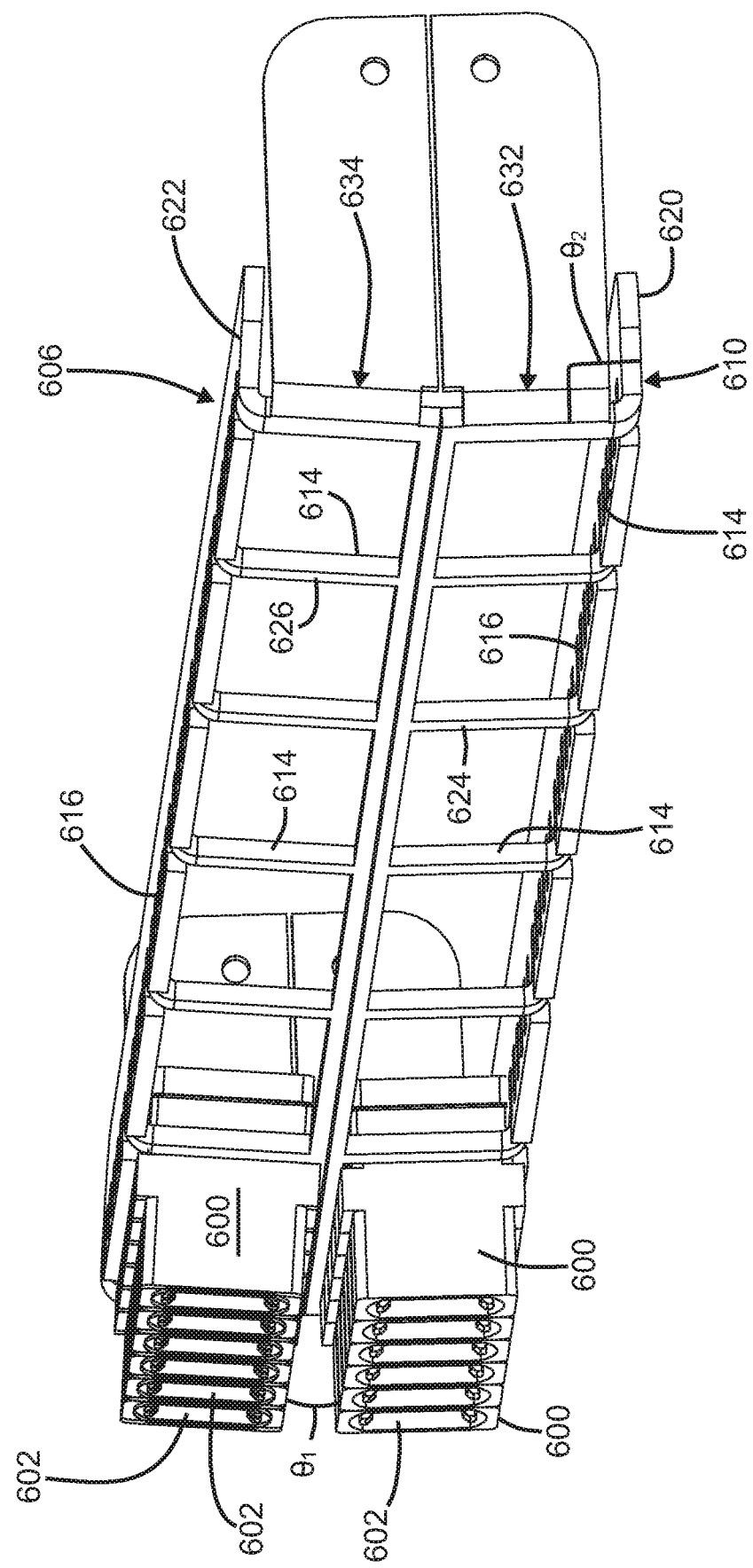
FIG. 31 is a perspective view of another example termination region suitable for mounting to the tray of any of the equipment panels disclosed herein, the termination region including a fixed bulkhead holding two rows of adapters that are rotated 90 degrees relative to the adapters shown in the termination regions discussed with respect to FIGS. 1-30.
Figure 32:
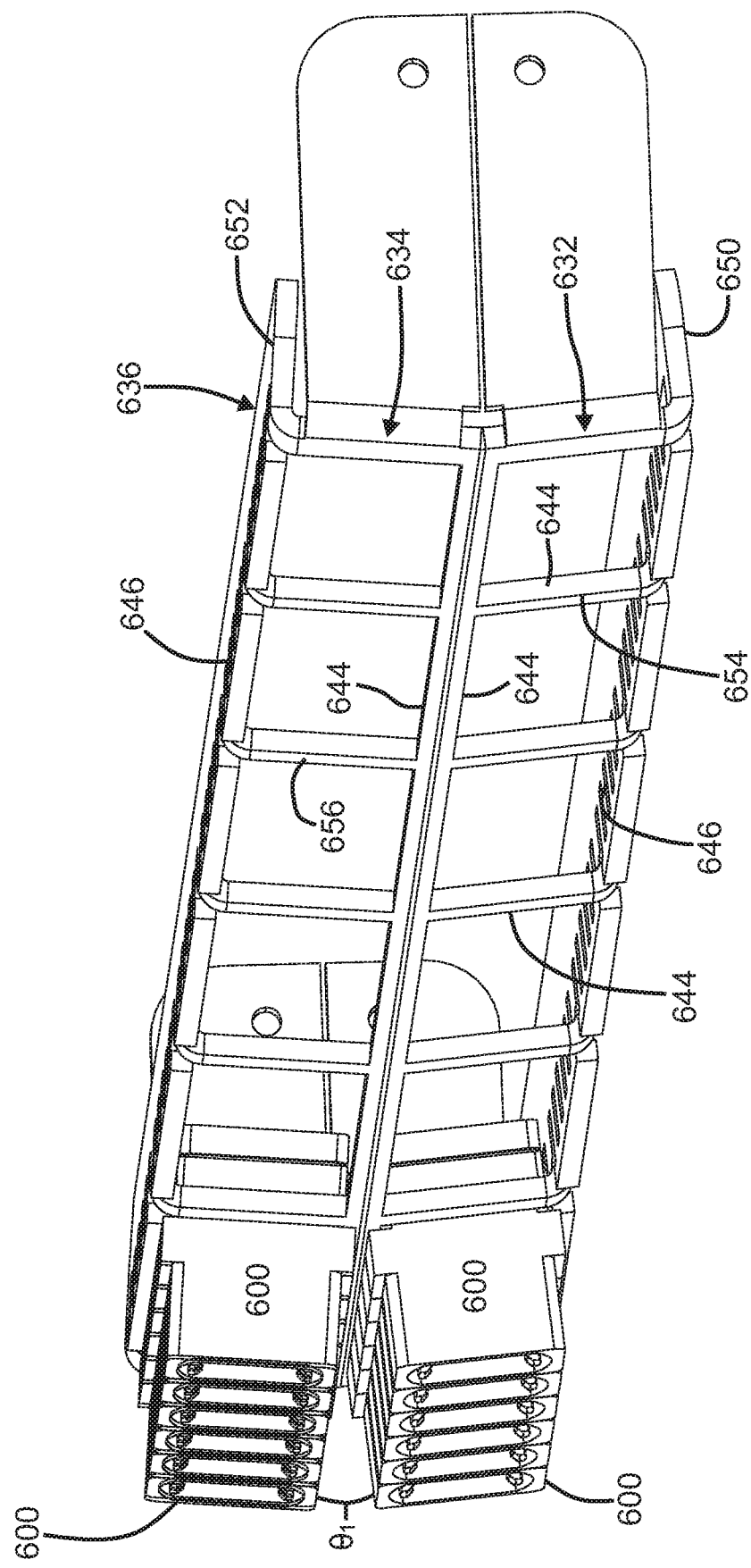
FIG. 32 is a perspective view of another example termination region suitable for mounting to the tray of any of the equipment panels disclosed herein, the termination region including a fixed bulkhead similar to the bulkhead of FIG. 31 except that the angle between the top and bottom rows is increased.
Figure 33:
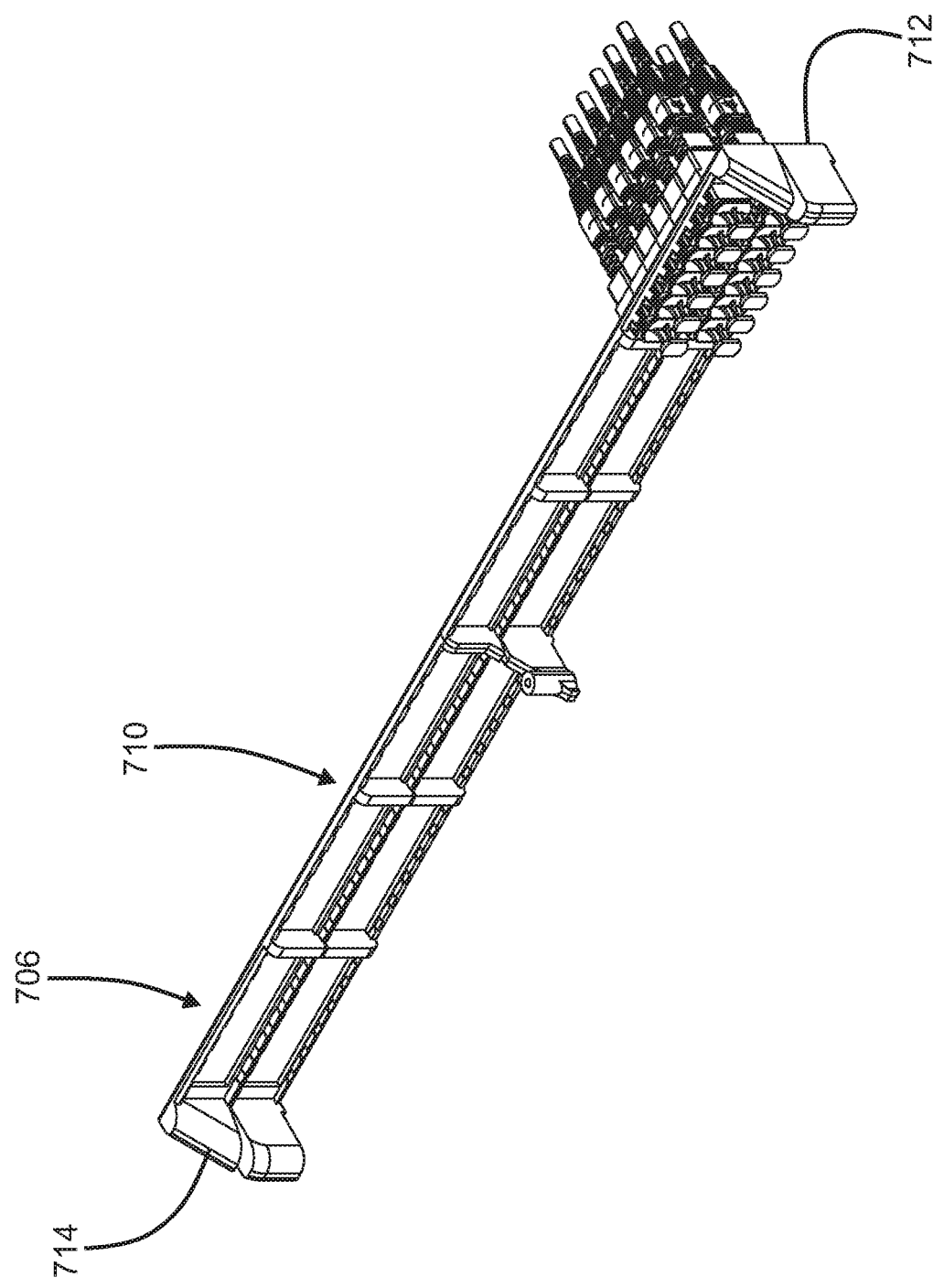
FIG. 33 is a perspective view of another example termination region suitable for mounting to the tray of any of the equipment panels disclosed herein, the termination region including a bulkhead holding first and second rows of adapters, the second row being movable relative to the first row.
Figure 34:
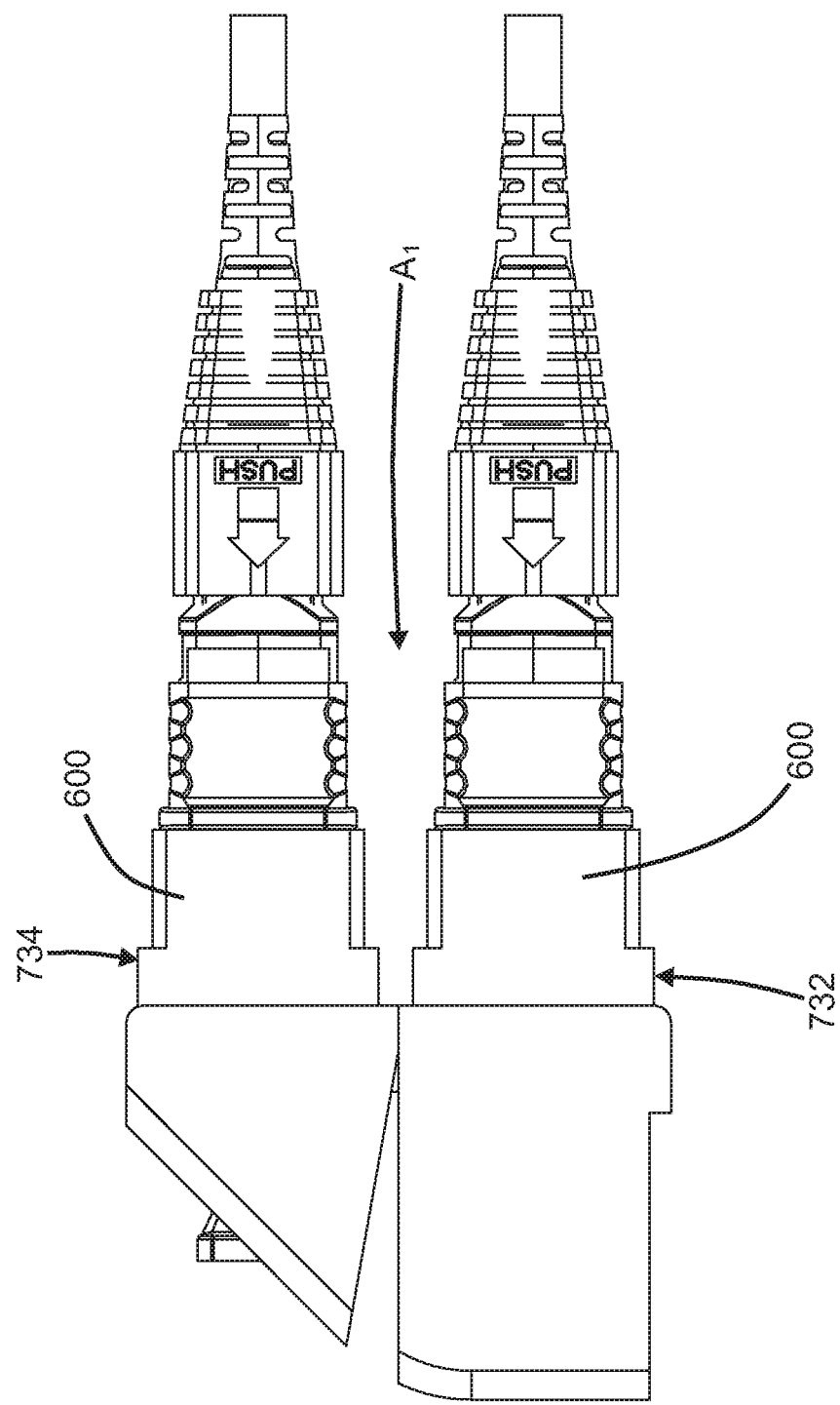
FIG. 34 is an end view of the bulkhead of FIG. 33 with the second row in a first position.
Figure 35:
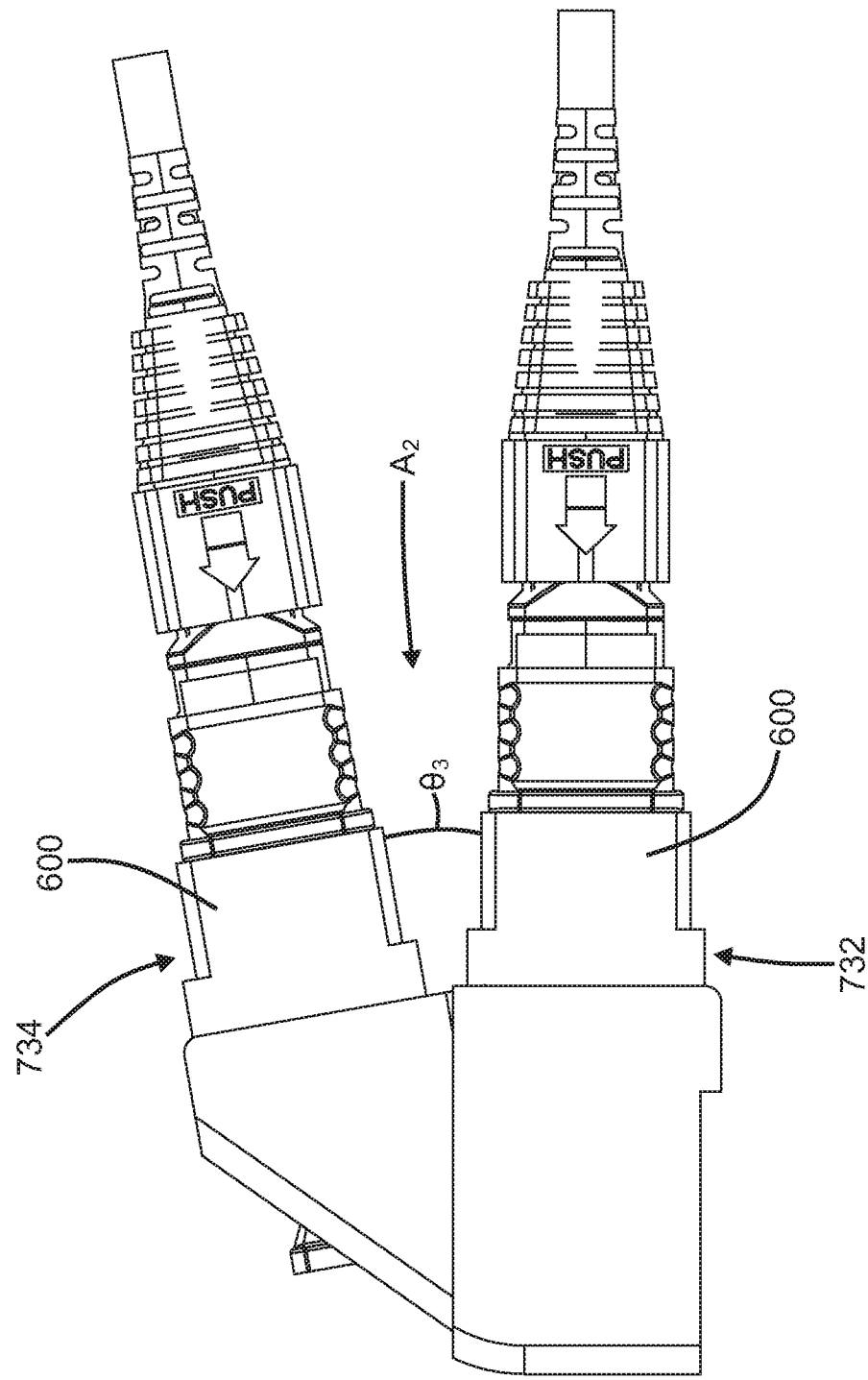
FIG. 35 is an end view of the bulkhead of FIG. 33 with the second row in a second position that is different from the first position.
Figure 36:
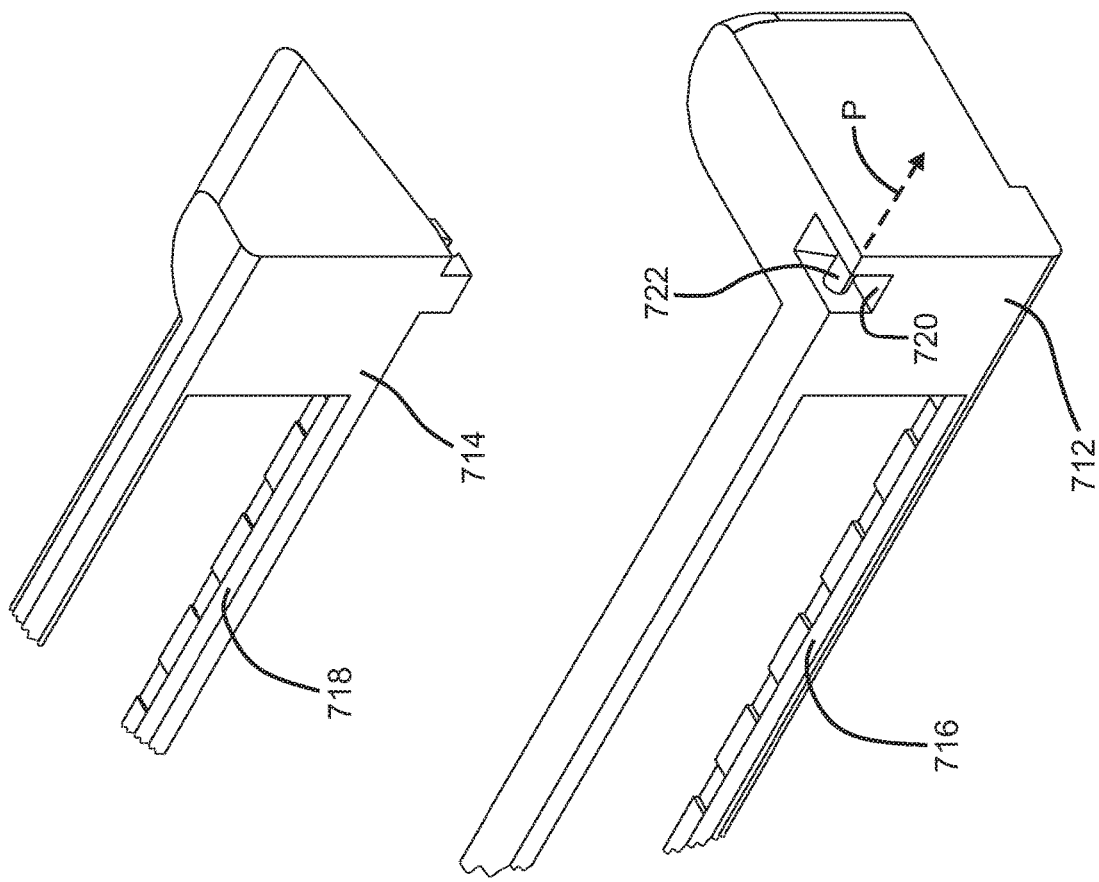
FIGS. 36 and 37 are top and bottom perspective views of a portion of the bulkhead for which the separate pieces are exploded outward for ease in viewing the orientation adjustment arrangement of the bulkhead.
Figure 37:
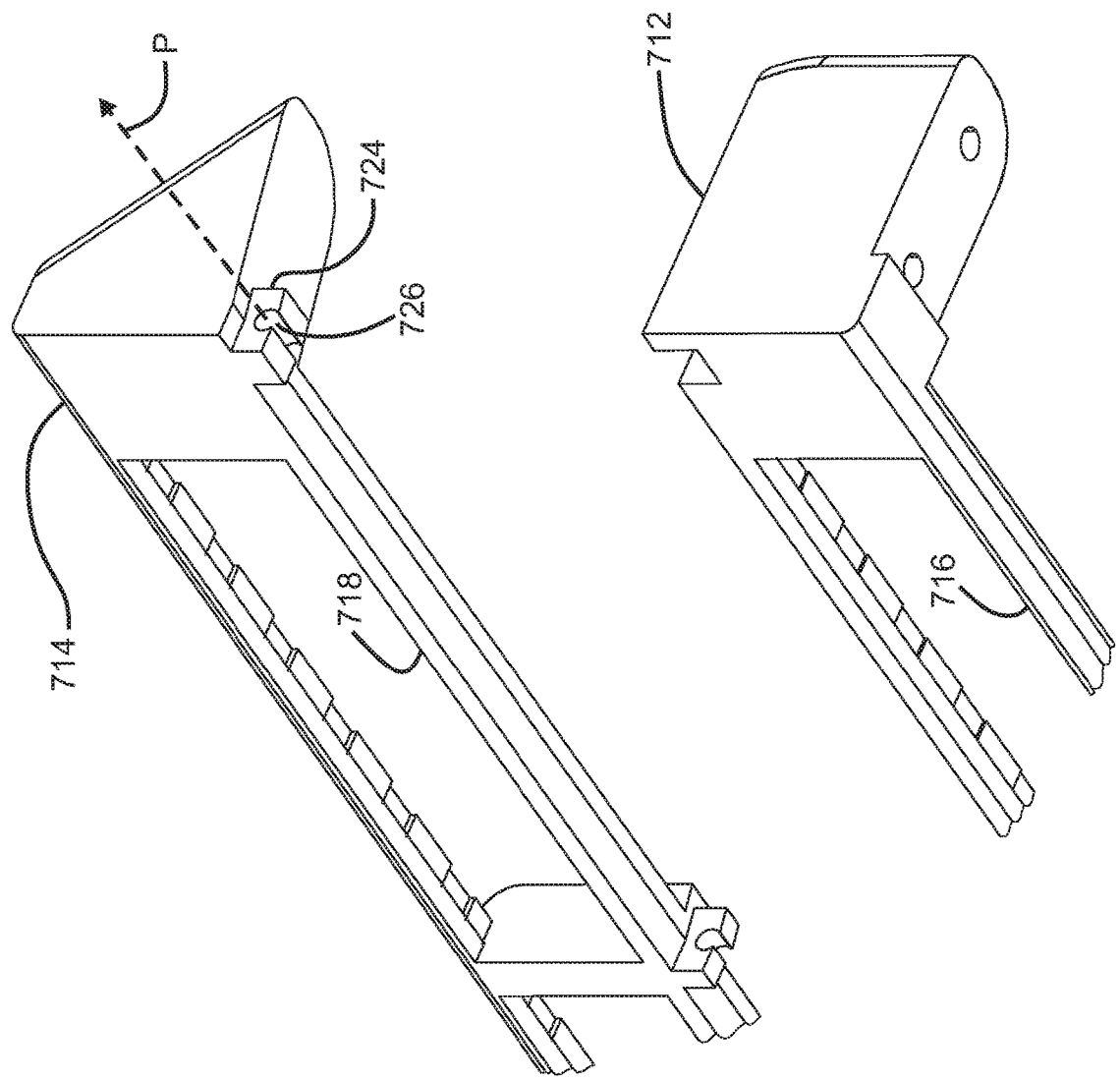

FIGS. 31 and 32 show example termination regions 606, 636 each including a bulkhead 610, 640 that fixedly mounts to the tray 104, 304 of the equipment panel 100, 200, 300. The bulkhead 610, 640 includes a body 612, 642 defining one or more openings 614, 644 within which one or more multi-fiber adapters 600 or adapter packs can be mounted. In certain examples, multiple adapters 600 are mounted within each opening 614, 644. For example, mounting structure 616, 646 within each opening 614, 644 can be configured to receive multiple adapters 600. In other implementations, the mounting structures 616, 646 are disposed on the adapters Each of the bulkheads 610, 640 includes a bottom row 632 and a top row 634. For example, each bulkhead 610, 640 may include a bottom front face 624, 654 that defines the bottom row 632 of openings 614, 644 and a top front face 626, 656 that defines the top row 634 of openings 614, 654. In certain implementations, the bottom and top front faces 624, 644, 626, 646 are stationary relative to each other. In certain implementations, each bulkhead 610, 640 also includes mounting flanges 620, 650, 622, 652 extending from the bottom and top front faces 624, 654, 626, 656.

In certain examples, the termination region 606, 636 has a size of 1 RU. In certain examples, the termination region 606, 636 includes two layers of ports within 1 RU. In certain implementations, the adapters 600 are oriented so that the adapter ports 602 are elongate in an up-down direction as opposed to laterally. Accordingly, each row 632, 634 may hold at least twenty-four adapters 600. In certain examples, each row 632, 634 may hold thirty-six adapters 600. In an example, the termination region 606, 636 accommodates 864 fibers within 1 RU. In other examples, the termination region 606, 636 accommodates a greater or lesser number of fibers (e.g., 576 fibers, 1728 fibers, 1440 fibers, etc.) within 1 RU. For example, the termination region 606, 636 could accommodate 1728 fibers if twenty-four fiber multi-fiber plug connectors were received at the ports of the two rows.

The bottom and top front faces 624, 654, 626, 656 are oriented relative to each other at an angle $\theta 1$. Accordingly, angle $\theta 1$ also characterizes the angle between the plug insertion axes for adapters 600 held at the top row 632 and the plug insertion axes for adapters 600 held at the bottom row 634. In certain examples, the angle $\theta 1$ ranges between about 1 degree and about 20 degrees. In certain examples, the angle $\theta 1$ ranges between about 2 degree and about 15 degrees. In certain examples, the angle $\theta 1$ ranges between about 5 degree and about 10 degrees. In certain examples, the angle $\theta 1$ ranges between about 2 degree and about 10 degrees. In certain examples, the angle $\theta 1$ ranges between about 5 degree and about 15 degrees. The greater the angle $\theta 1$, the more finger access is provided between the rows. Accordingly, a user will have additional finger access to insert and/or remove plugs at the termination filed 636 of FIG. 32 compared to the termination filed 606 of FIG. 31.

The bottom front face 624, 654 is oriented relative to the bottom mounting flange 620, 650 at an angle $\theta 2$. In the bulkhead 610 of FIG. 31, the bottom front face 624 is oriented so that the adapter ports 602 face generally 90 degrees relative to the tray base 103, 303 when the termination region 606 is carried by the tray 104, 304. For example, the bottom front face 624 may be oriented at a generally 90 degree angle $\theta 2$ relative to the mounting flange 620. In certain examples, the bottom front face 624 holds the adapters 600 so that plug insertion axes of the adapters 600 extend horizontally. In certain examples, the bottom front face 624 holds the adapters 600 so that plug insertion axes of the adapters 600 extend parallel with the tray 104, 304 to which the termination region 606 is mounted.

In the bulkhead 640 of FIG. 32, the bottom front face 654 is oriented so that the adapter ports 602 are not horizontal. For example, the bottom face 654 may orient the adapters 600 to face at least partially towards the tray 104, 304 when the termination region 636 is carried by the tray 104, 304. For example, the angle $\theta 2$ may range between about 80 degrees and about 100 degrees. In certain examples, the angle $\theta 2$ ranges between about 85 degree and about 95 degrees. In certain examples, the angle $\theta 2$ ranges between about 85 degree and about 90 degrees. In certain examples, the angle $\theta 2$ ranges between about 90 degree and about 95 degrees.

In certain examples, the termination region 606 of FIG. 31 orients the adapters 600 so that plug insertion axes for the bottom row 632 extend along a horizontal axis and fiber insertion axes for the top row are angled above the horizontal axis. In certain examples, the termination region 636 of FIG. 32 orients the adapters 600 so that plug insertion axes for the bottom row 632 are angled below the horizontal axis and fiber insertion axes for the top row are angled above the horizontal axis.

In FIGS. 33-37, a termination region 706 includes a bulkhead 710 defining a lower row 732 of adapters 600 and an upper row 734 of adapters 600. The bulkhead 710 is adjustable to modify the orientation of the upper row 734 of adapters 600 relative to the lower row 732. For example, the upper row 734 of adapters 600 can be moved between a use position (e.g., see FIG. 34) and an access position (e.g., see FIG. 35). In the use position, the adapter ports (e.g., adapter insertion axes) are parallel to each other. In the access position, the upper row 734 of adapters 600 is moved to orient the adapter ports (e.g., adapter insertion axes) of the top row 734 at an angle θ3 relative to the bottom row 732.

Angling the top row 734 relative to the bottom row 732 provides finger access between the plug connectors received at the top and bottom rows. For example, compare the smaller finger access space A1 between the plug connectors shown in FIG. 34 and the larger finger access space A2 between the plug connectors shown in FIG. 35.

In certain examples, the termination region 706 has a size of 1 RU. In certain examples, the termination region 706 includes two layers of ports within 1 RU. In certain implementations, the adapters are oriented so that the adapter ports are elongate in an up-down direction as opposed to laterally. Accordingly, each row 732, 734 may hold at least twenty-four adapters. In certain examples, each row 732, 734 may hold thirty-six adapters. In an example, the termination region 706 accommodates 864 fibers within 1 RU. In other examples, the termination region 706 accommodates a greater or lesser number of fibers (e.g., 576 fibers, 1728 fibers, 1440 fibers, etc.) within 1 RU. For example, the termination region 706 could accommodate 1728 fibers if twenty-four fiber multi-fiber plug connectors were received at the ports of the two rows.

In certain implementations, the bulkhead 710 includes a first body 712 that defines the lower row 732 and a second body 714 that defines the upper row 734. The second body 714 is movable relative to the first body 712. For example, the second body 714 may pivot relative to the first body 712. In certain examples, the second body 714 is separate from the first body 712.

An orientation adjustment arrangement facilitates movement between the first and second bodes 712, 714. In certain examples, the orientation adjustment arrangement defines a pivot axis P about which the second body 714 pivots relative to the first body 712. In certain implementations, the first and second bodies 712, 714 cooperate to define the orientation adjustment arrangement. In certain examples, one of the bodies 712, 714 defines one or more pockets 720 in each of which a hinge pin 722 is disposed. The other of the bodies 712, 714 includes an insert 724 defines a pivot notch 726 that fits over the hinge pin 722. In the example shown, the first body 712 defines the hinge pin 722 and the second body 714 defines the pivot notch 726.

FIGS. 38-43 illustrate other example termination fields suitable for use on the trays 104, 304 of any of any of the equipment panels 100, 200, 300 discussed above. The example termination fields includes two or more pivoting rows of forward-facing ports. One or more of the rows pivots between a use position and an access position. In the example shown, the termination field includes three rows of forward-facing ports where at least the top and middle row move between respective use and access positions. In some examples, the top row can be pivoted independent of the middle row. In certain implementations, each pivoting row can include one or more kickstands or other locking feature to hold the row in the access position until released.

Figure 38:
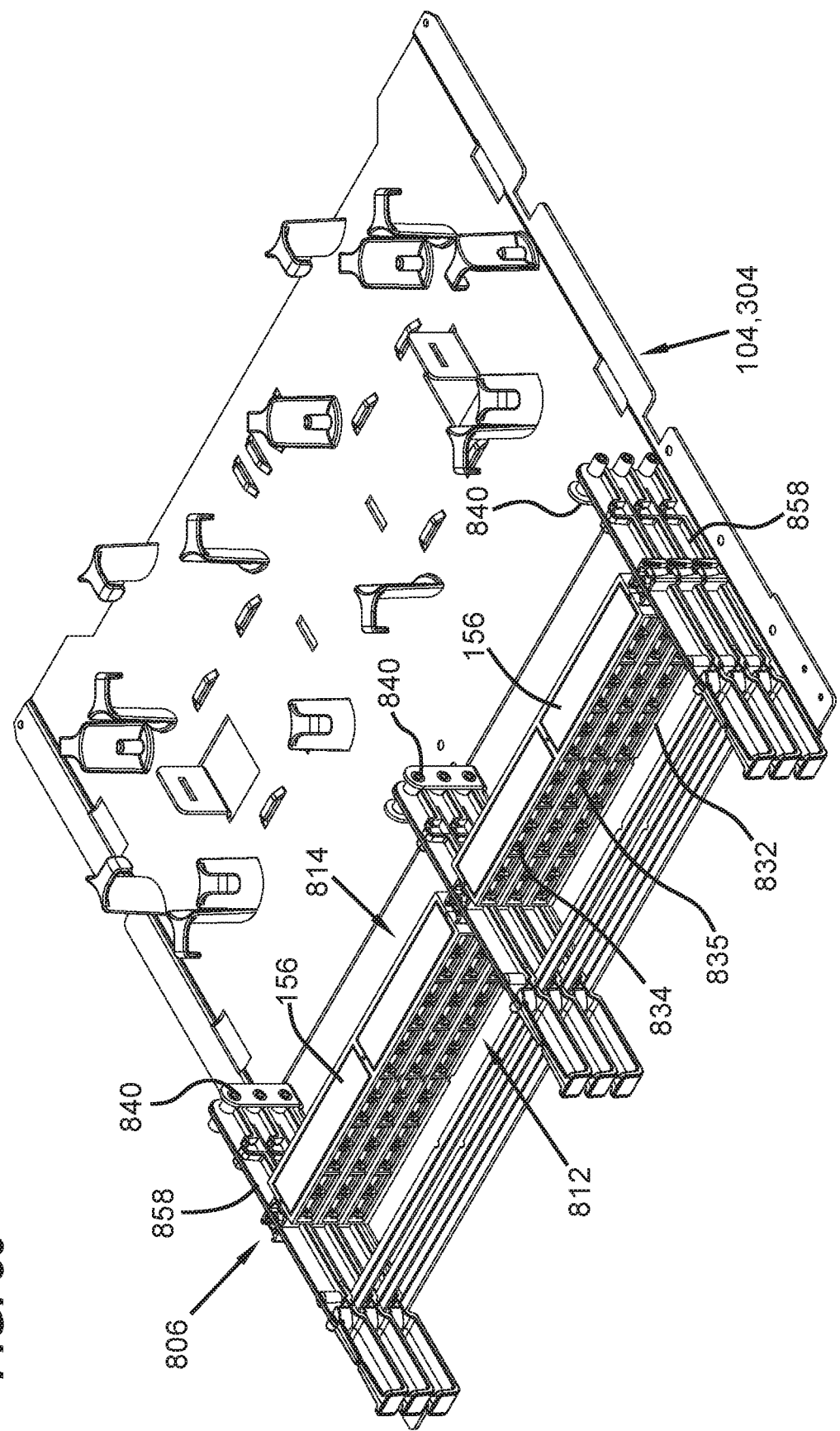
FIG. 38 is a perspective view of another example termination field suitable for use on the trays 104, 304 of any of any of the equipment panels discussed above, the termination field being pivotal between a use position and an access position, the termination field being shown in the use position.
Figure 39:
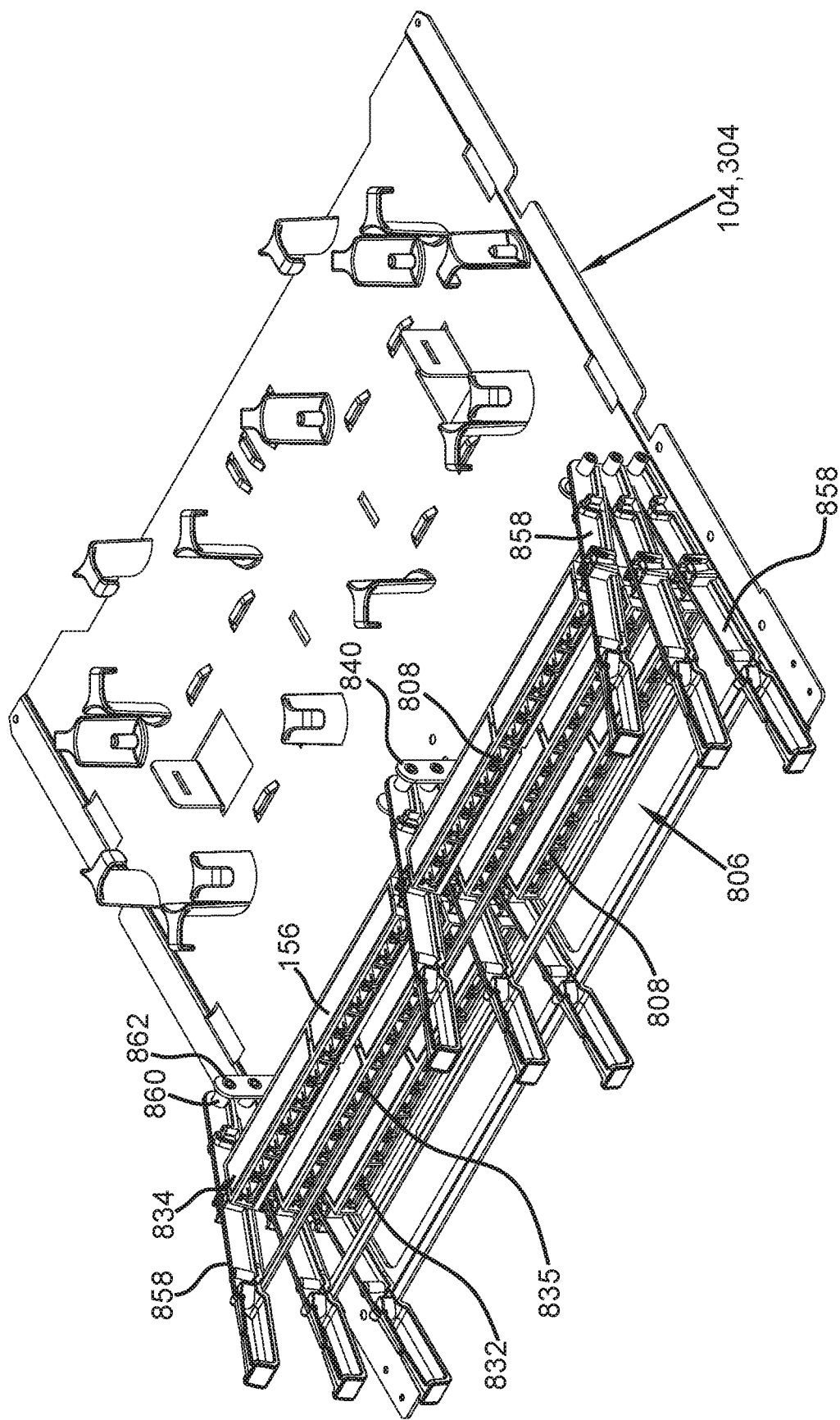
FIG. 39 shows the termination field of FIG. 38 in the access position.
Figure 40:
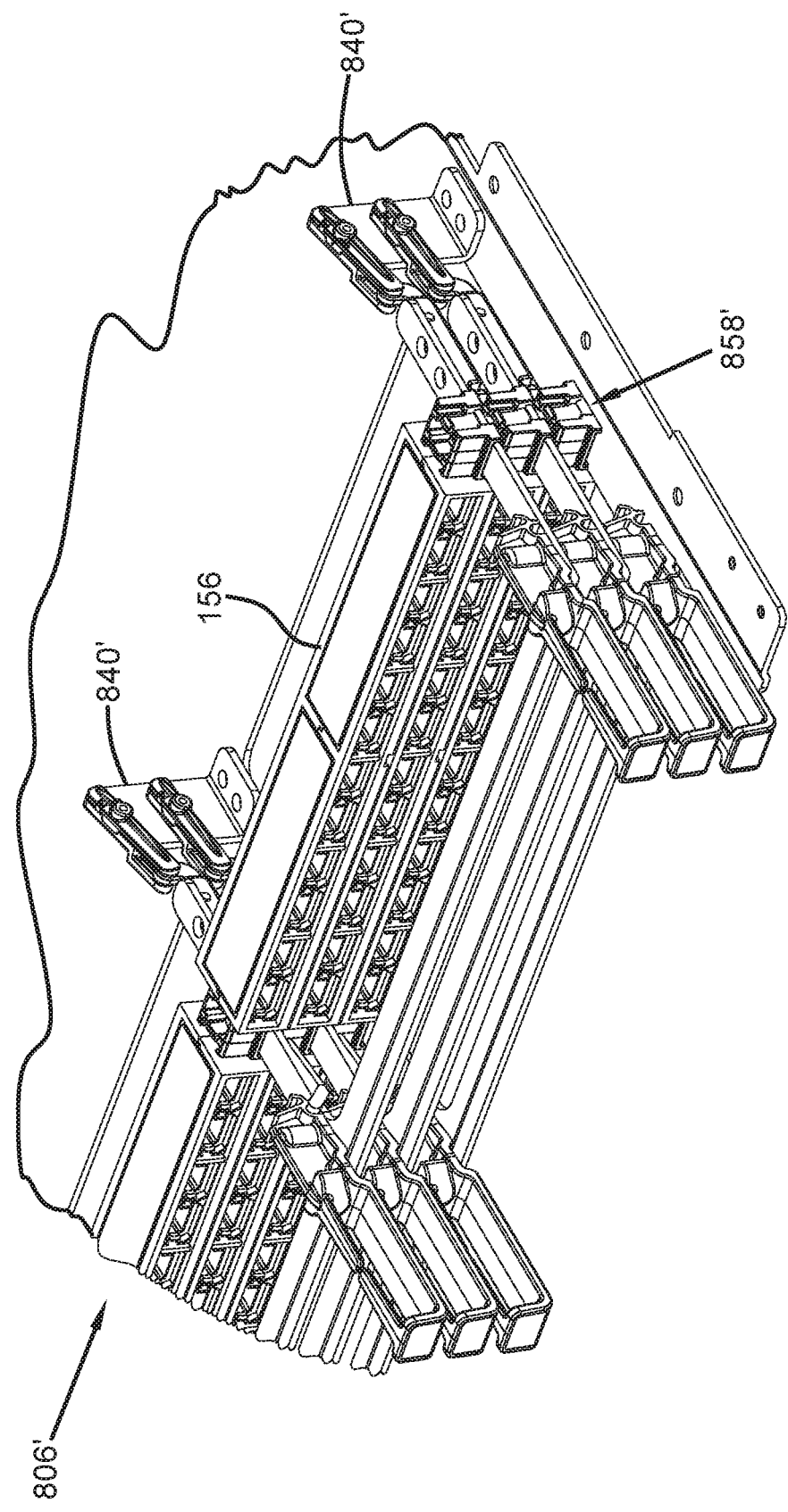
FIG. 40 is a perspective view of part of another example termination field suitable for use on the trays 104, 304 of any of any of the equipment panels discussed above, the termination field being pivotal between a use position and an access position, the termination field being shown in the use position.
Figure 41:
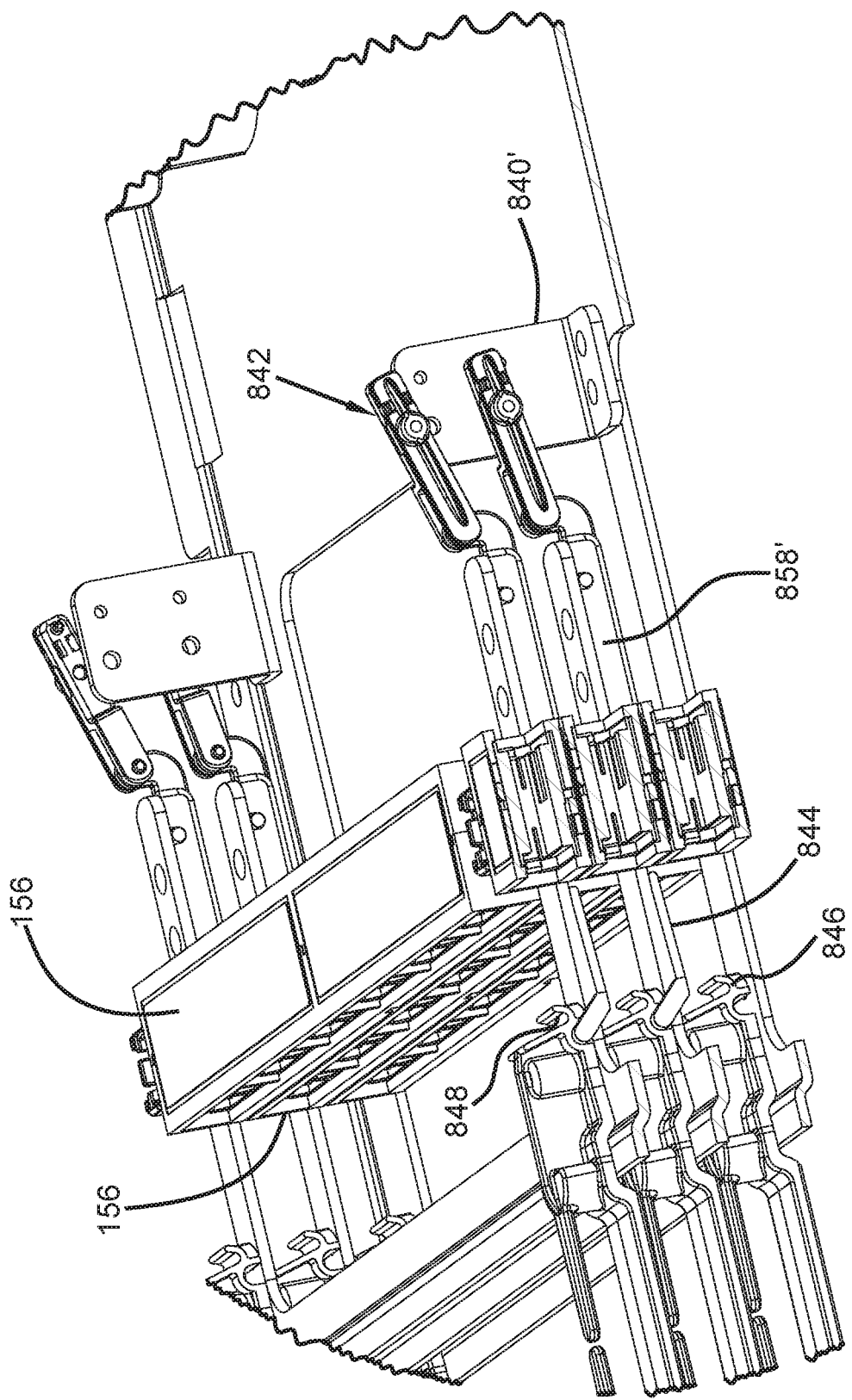
FIG. 41 is a cross-sectional view of the termination field of FIG. 40 showing kickstands of the termination field disposed in stowed positions.
Figure 42:
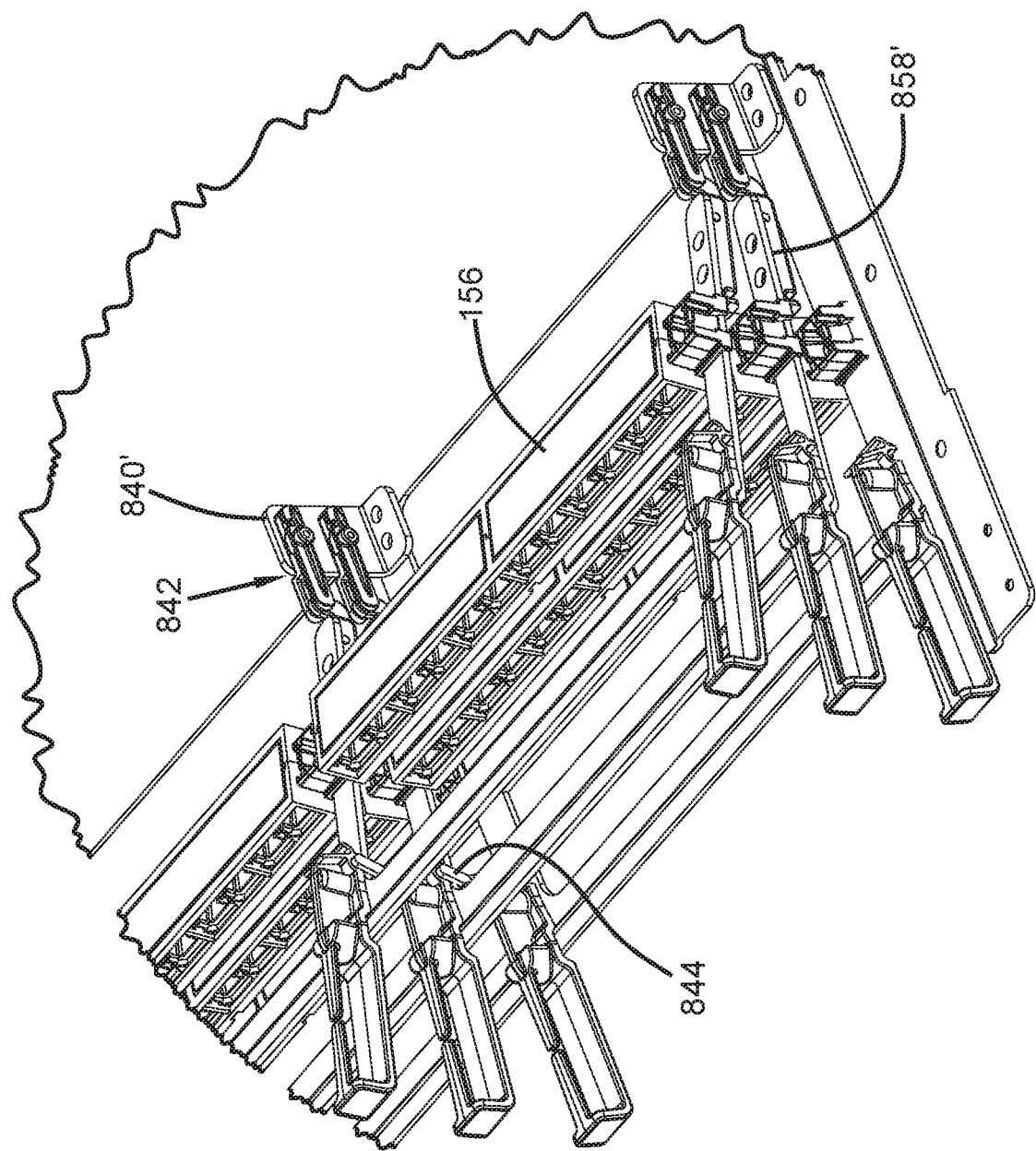
FIG. 42 shows the termination field of FIG. 40 disposed in the access position.
Figure 43:
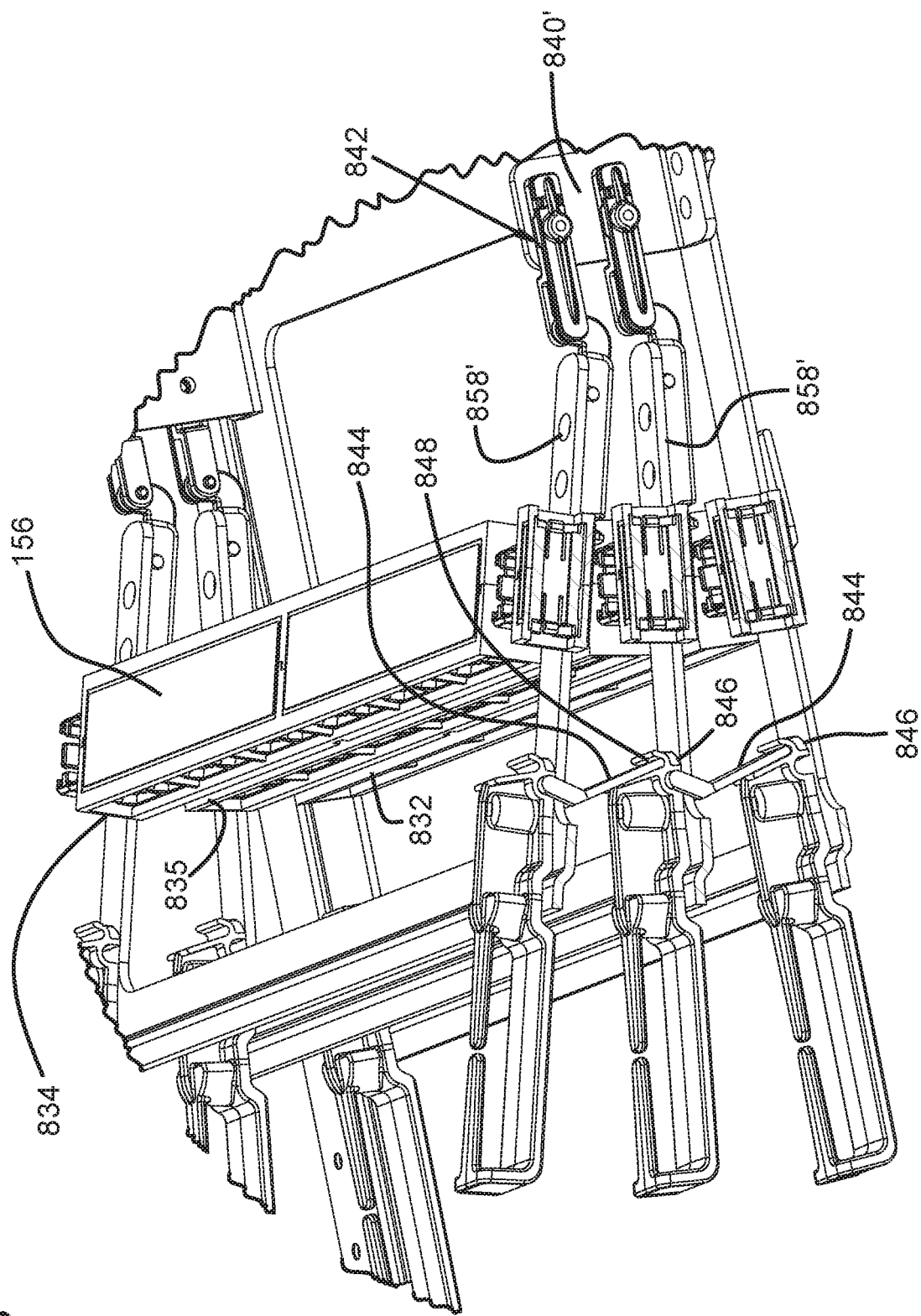
FIG. 43 is a cross-sectional view of the termination field of FIG. 42 showing kickstands of the termination field disposed in locked positions.

In FIGS. 38-39, an example termination region 806 suitable for use with the trays 104, 304 is shown. The termination region 806 has a front 812 and a rear 814. The termination region 806 also includes three layers (e.g., rows) 832, 834, 835 of front ports 808. In an example, the termination region 806 may include three rows 832, 834, 835 of twenty-four multi-fiber ports (e.g., defined by adapters). In other examples, each row 832, 834, 835 may include a greater or lesser number (e.g., six, twelve, sixteen, thirty-two, etc.) of multi-fiber ports.

In certain examples, the termination region 806 has a size of 1 RU. In certain examples, the termination region 806 includes three layers 832, 834, 835 of ports within 1 RU. In some examples, the ports are defined by optical adapters oriented to extend further laterally than up-and-down. In an example, the termination region 806 accommodates 864 fibers within 1 RU. In other examples, the termination region 806 accommodates a greater or lesser number of fibers (e.g., 576 fibers, 1728 fibers, 1440 fibers, etc.) within 1 RU. For example, the termination region 806 could accommodate 1728 fibers if twenty-four fiber multi-fiber plug connectors were received at the ports of the three rows.

In accordance with certain aspects of the disclosure, the rows 832, 834, 835 of front ports are movable relative to each other to provide finger access when needed. For example, each of the rows 832, 834, 835 may be pivotal relative to the tray 104, 304 between the use position (FIG. 38) and the access position (FIG. 39). The top row 834 may be pivoted to the access position without moving the middle and bottom rows 835, 832 from the use position. The middle row 835 may be pivoted to the access position without moving the bottom row 832. However, the top row 834 also must pivot with the middle row 835.

Each row 852, 854, 855 of each the termination region 806 includes an adapter block 156 defining a plurality of the forwardly-facing ports 808 and a like plurality of rearward ports. The adapter blocks 156 can be mounted to the tray 104, 304 using a mounting arrangement disposed towards the front of the tray 104, 304. In certain examples, the mounting arrangement includes a plurality of mounting members 858 that cooperate to retain the adapter blocks 156 at the tray 104, 304. For example, each adapter block 156 may extend between retention sections of two adjacent mounting members 858.

In certain implementations, the mounting arrangement may include multiple layers of mounting members 858. For example, each layer or row 852, 854, 858 of adapter blocks corresponds to one of the layers of mounting members 858. First ends of the mounting members 858 couple to support members 840 to allow second ends of the mounting members 858 to pivot. Each adapter block 156 extends between intermediate locations on two mounting members 858.

In FIGS. 40-43, another example termination region 806' suitable for use with the trays 104, 304 is shown. The termination region 806' is substantially the same as the termination region 806, except that the adapter blocks 156 are coupled to mounting members 858' that couple to support members 840 using a dual-hinge arrangement 842 to move between the use position and the access position.

In certain implementations, the upper and/or middle rows 834, 835 can be secured in the access position. In certain examples, each row 834, 835 may carry a kickstand 844 that is movable between a stowed position (see FIG. 41) and a locked position (see FIG. 43). When the kickstand 844 is disposed is the stowed position, the respective row of ports is free to move between the use position and the access position. When the kickstand 844 is moved to the locked position, the respective row is held in the access position relative to the adjacent lower row.

In certain examples, the kickstand 844 of each row 834, 835 is coupled to one of the mounting members 858'. In the example shown, the kickstand 844 is mounted to the middle mounting member 858' of each row 834, 835. In other examples, the kickstand 844 can be mounted to one of the side mounting members 858'. In still other examples, each row can include multiple kickstands. At least the bottom and middle rows include a cradle 846 aligned with the kickstand 844 of the adjacent upper row. The cradle 846 defines a pocket or channel 848 sized to receive the kickstand 844 when the kickstand 844 is disposed in the locked position. In the stowed position, the kickstand 844 does not engage the cradle 846 or any other part of the other rows 832, 835, 834.

In certain examples, the cradle 846 is carried by the mounting member 858'. In certain examples, a mounting member 858' carries both a kickstand 844 and a cradle 846 for the kickstand 844 of the adjacent upper row. While the kickstand 844 is shown on the mounting member 858', it will be understood that a kickstand 844 also could be carried with the mounting member 858 of the termination region 806.

Figure 44:
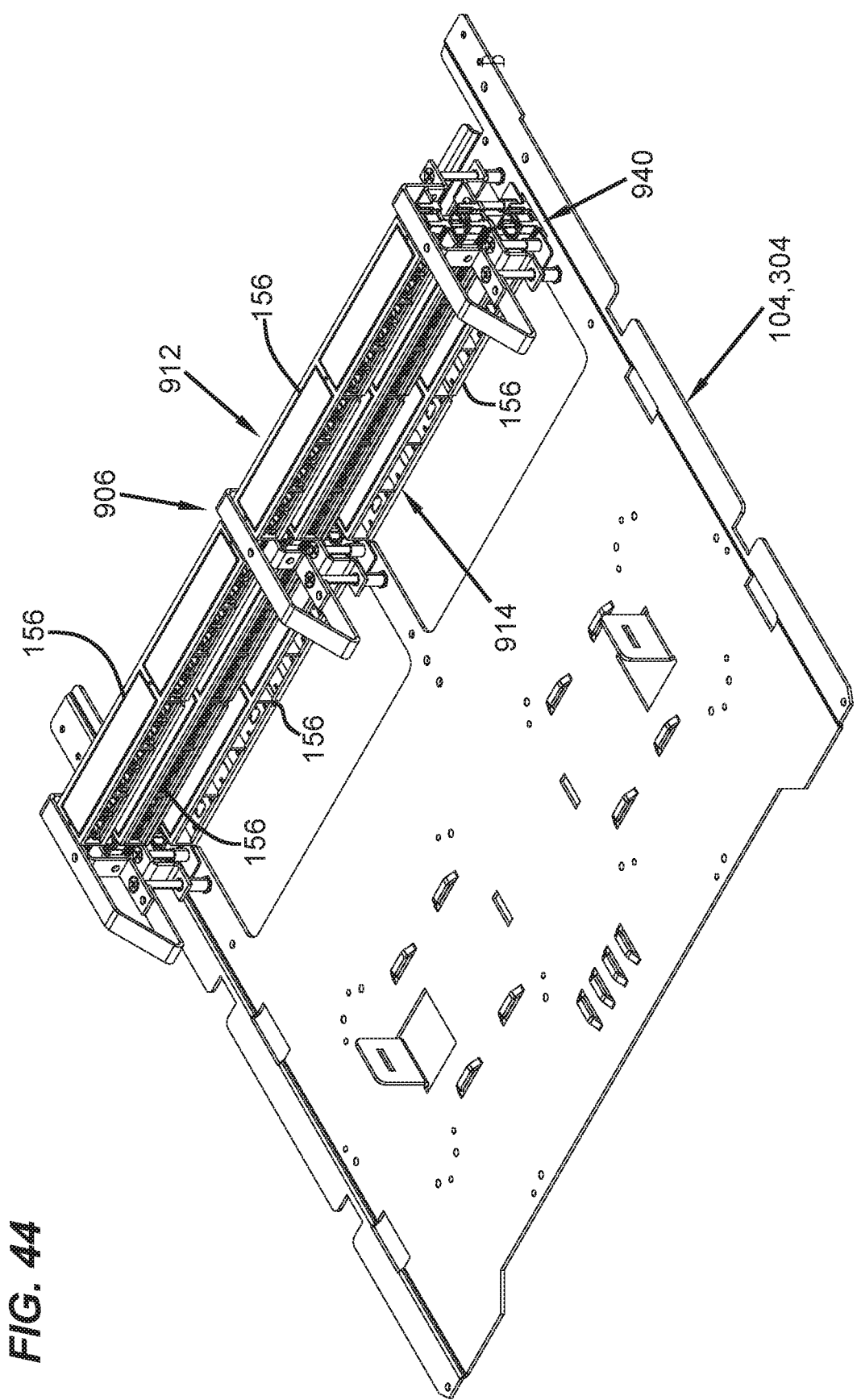
FIG. 44 illustrates another example termination field suitable for use on the trays 104, 304 of any of any of the equipment panels discussed above, the termination field being expandable and retractable between use and access positions, the termination field being shown in the access position.
Figure 45:
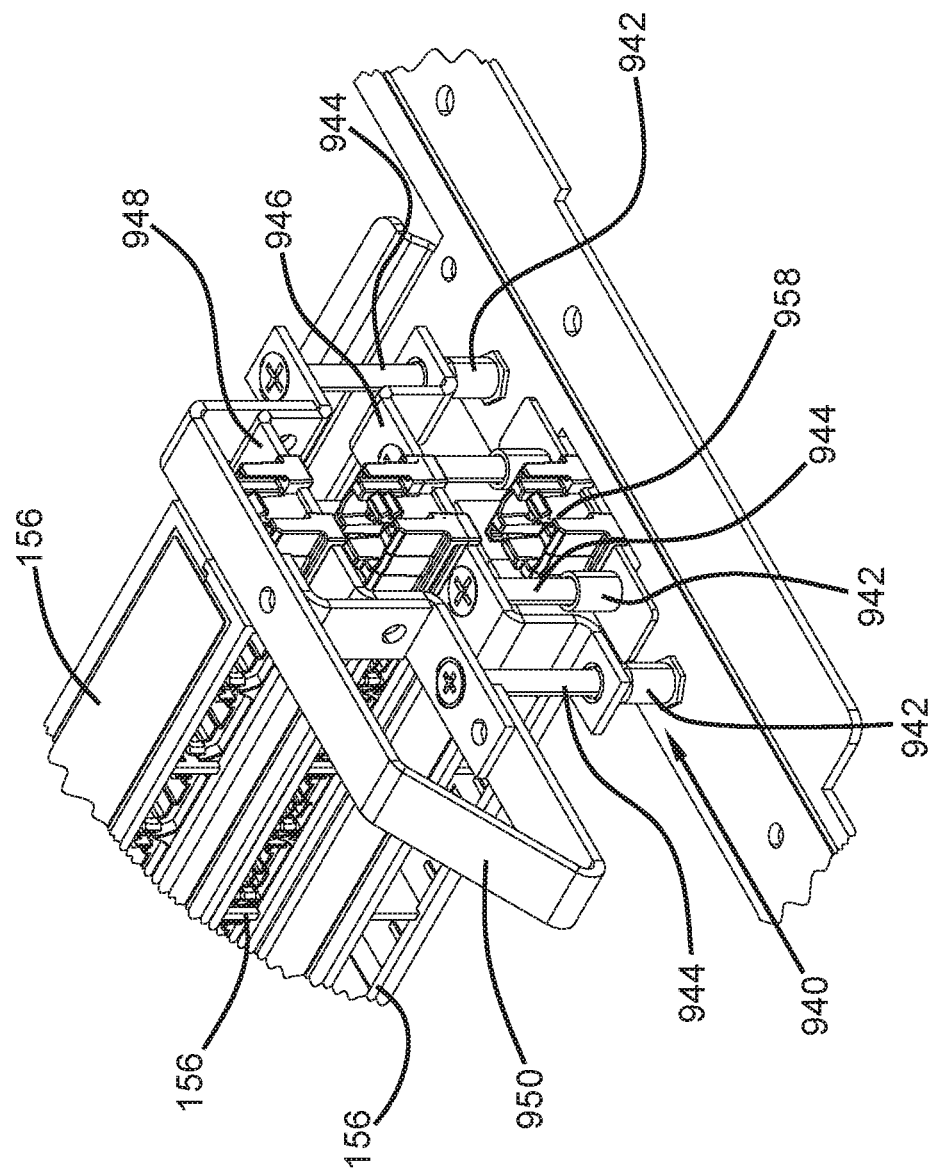
FIG. 45 is an enlarged view of a portion of FIG. 44.
Figure 46:
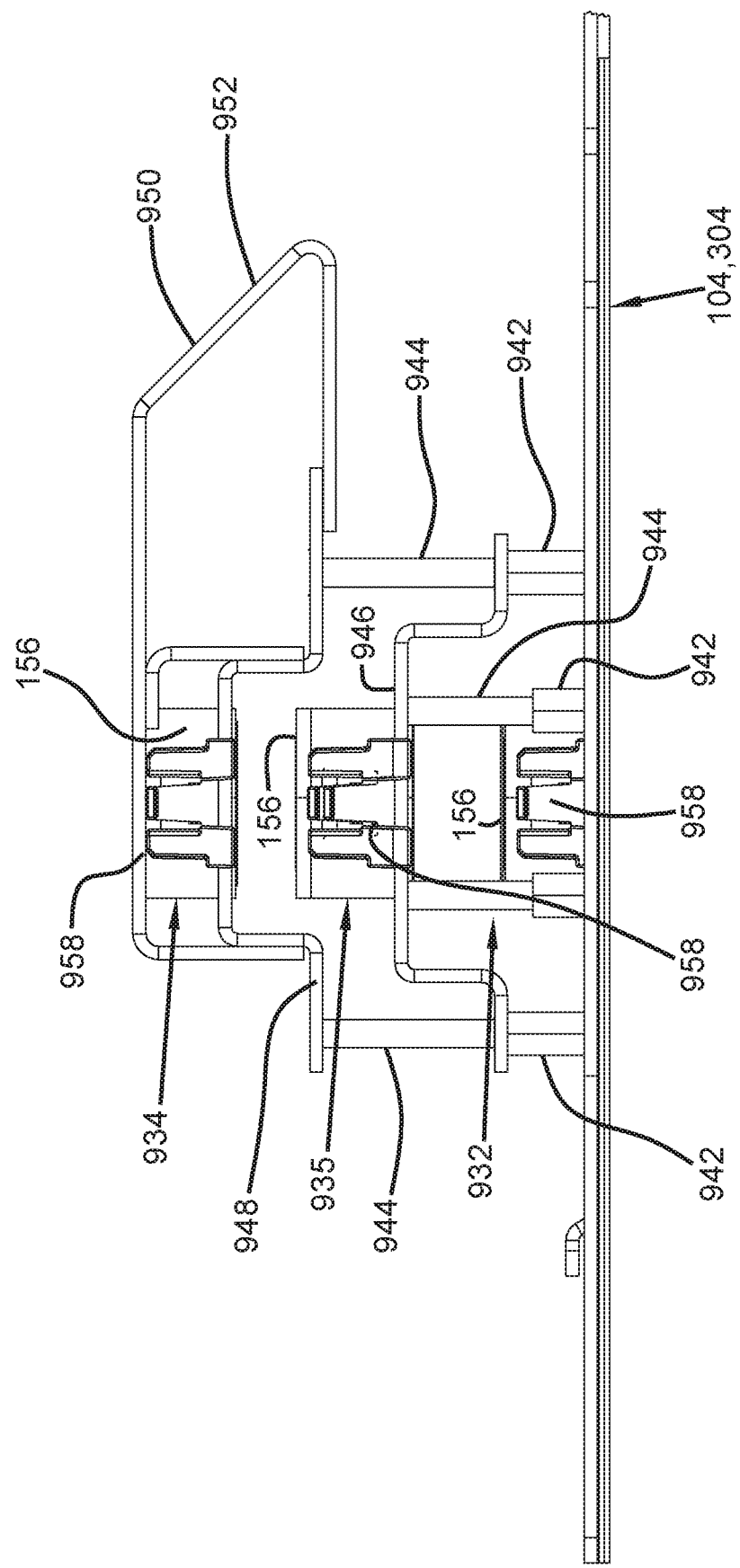
FIG. 46 is a side elevational view of the portion shown in FIG. 45.
Figure 47:
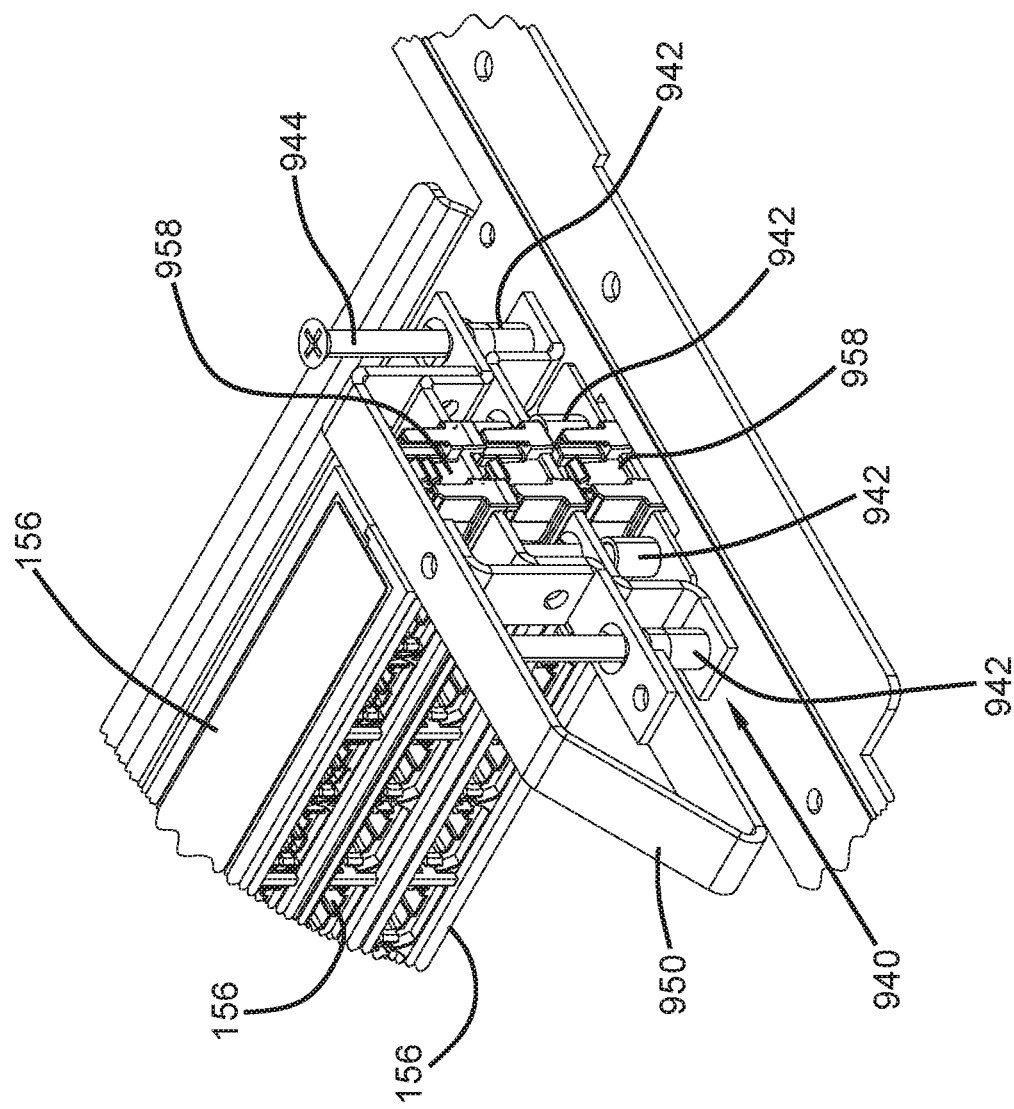
FIG. 47 is an enlarged view of a portion of FIG. 44 with the termination field shown in the use position.
Figure 48:
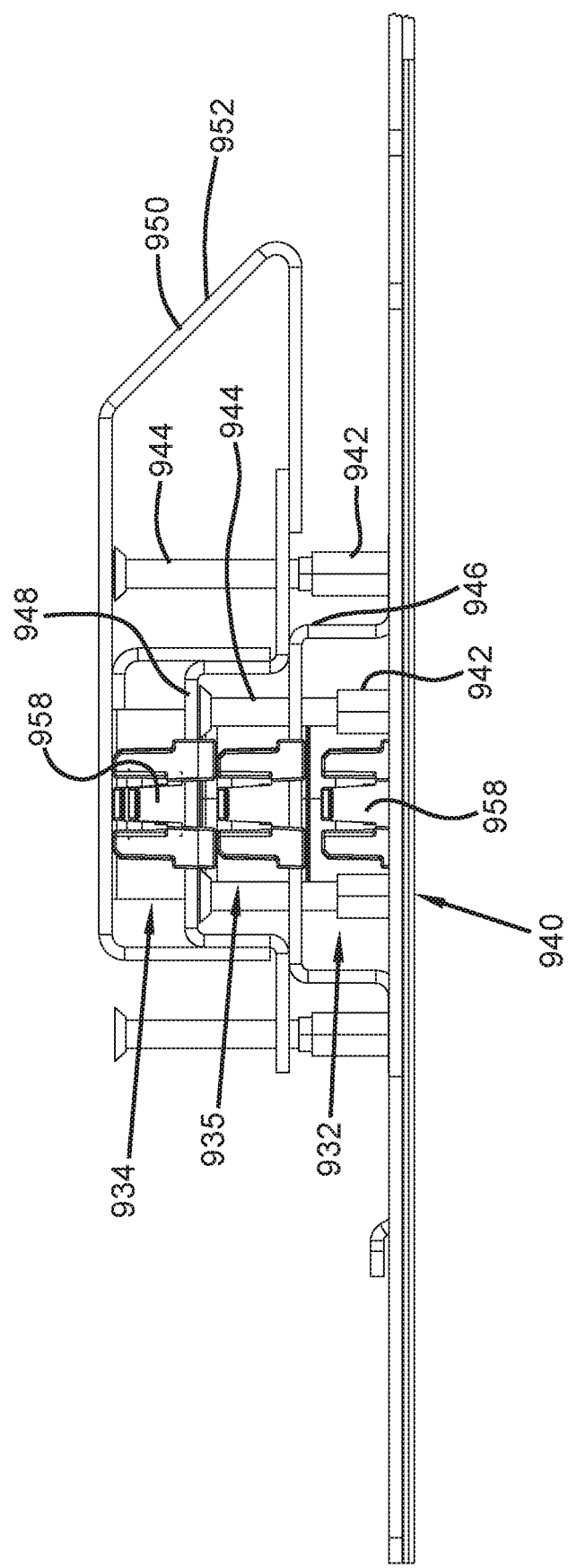
FIG. 48 is a side elevational view of the portion shown in FIG. 47.

FIGS. 44-48 illustrate another example termination field 906 suitable for use on the trays 104, 304 of any of any of the equipment panels 100, 200, 300 discussed above. In certain implementations, the termination field 906 moves between a use position and an access position. As shown in FIGS. 44-46, the rows of ports are spaced vertically from each other when the termination field 906 is disposed in the access position. As shown in FIGS. 47-48, the rows of ports are disposed closer to each other when the termination field 906 is disposed in the use position.

In certain implementations, the ports of the example termination field 906 are defined by rows of adapter blocks 156. For example, one or more adapter blocks 156 of a top row 932 of the termination field 906 can be raised and lowered vertically relative to one or more adapter blocks in a bottom row 934 of the termination field 906. In certain examples, the termination field 906 also includes a middle row 935 of one or more adapter blocks 156 that can be raised and lowered vertically relative to the bottom row 932. The top row 934 can be raised and lowered relative to the middle row 935. In such examples, the upper row 932 is raised relative to the middle row 935 and the middle row 935 is raised relative to the bottom row 934 when the termination field 906 is disposed in the access position as compared to the use position.

In certain implementations, the rows of forward-facing ports can be raised automatically when the tray 104, 304 is at least partially removed from the chassis 102, 202, 302. For example, the port rows can be spring-biased to the raised positions. In certain implementations, the rows are coupled to retraction brackets 950 that cooperate with the chassis 102, 202, 302 to lower the port rows when the tray 104, 304 is inserted back into the chassis 102, 202, 302. For example, the bracket 950 may cam against a forward edge of the chassis 102, 202, 302 to lower the port rows as the tray 104, 304 is slid into the chassis 102, 202, 302.

In certain examples, the tray 104, 304 carries a plurality of spring holders 942 in which springs (e.g., a coil springs) are disposed. Support rods 944 each have a first end disposed within a respective one of the spring holders 942 and a second end coupled to a support bracket 946, 948 that carries one or more of the adapter blocks 156. The spring within the holder 942 biases the support rod 944 upwardly away from the holder 942 raising the support bracket 946, 948 and, hence, the one or more adapter bocks 156 coupled thereto. In the example shown, the top and middle rows 932, 935 of ports are carried by support brackets 946, 948, respectively. A first set of spring holders 942 and support rods 944 are associated with the first support bracket 946 and a second set of spring holders 942 and support rods 944 are associated with the second support bracket 948. Accordingly, the top row 932 of ports moves independently of the middle row 935.

In certain implementations, a retraction bracket 950 is coupled to at least the top-most support bracket 948. The retraction bracket 950 has a cam surface 952 that faces towards the rear of the chassis 102, 202, 302 when the tray 104, 304 is installed at the chassis 102, 202, 302. When the tray 104, 304 is pulled out of the chassis 102, 202, 302 to the extended position, the support rods 944 move under the bias of the springs to raise the support brackets 946, 948. When the tray 104, 304 is moved into the chassis 102, 202, 302 toward the retracted position, the cam surface 952 of the retraction bracket 950 engages a surface (e.g., the front, top edge of the chassis 102, 202, 302) at the open front of the chassis 102, 202, 302.

As the tray 104, 304 continues to be moved towards the retraction position, the cam edge 952 slides over the surface and pushes the top-most support bracket 948 downwardly, thereby pushing the respective support rods 944 into the spring holders 942 to transition the termination field 906 to the use position. In some examples, the retraction bracket 950 also is coupled to the second support bracket 946 to push the second support bracket 946 downwardly towards the use position. In other examples, the top-most bracket 948 engages the adapter block 156 carried by the second support bracket 946 and pushes the adapter block 156 downwardly against the bias of the springs supporting the adapter block 156 of the middle row 935. Accordingly, the retraction bracket 950 moves the top-most bracket 948 (and hence the top row 932) towards the use position and the top-most bracket 948 moves the second support bracket 946 (and hence the middle row 935) towards the use position.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An equipment panel comprising:
  a chassis defining an interior accessible through an open front; and
  a tray disposed within the interior of the chassis, the tray being slidable relative to the chassis along a front-to-rear axis, the tray including a termination region and a splice region, the termination region being located forward of the splice region, the termination region including a lower row of front-facing ports and an upper row of front-facing ports carried with the tray when the tray is slid relative to the chassis, the splice region having a lower layer and an upper layer carried with the tray when the tray is slid relative to the chassis, each of the lower and upper layers of the splice region being configured to hold a plurality of optical splices, wherein a fixed angle ($\theta 1$) between plug insertion axes for adapters held at the upper row and plug insertion axes for adapters held at the lower row is between about 1 degree and about 20 degrees.

2. The equipment panel of claim 1, wherein the upper row of front-facing ports is spaced above the lower row of front-facing ports by a gap that is about the same size as one of the front-facing ports.

3. The equipment panel of claim 1, wherein the lower layer of the splice region includes a first splice cassette; and wherein the upper layer of the splice region includes a second splice cassette mounted over the first splice cassette.

4. The equipment panel of claim 3, wherein the second splice cassette is mounted to a platform disposed above the first splice cassette.

5. The equipment panel of claim 3, wherein the first splice cassette is one of a plurality of splice cassettes disposed at the lower region and wherein the second splice cassette is one of a plurality of splice cassettes disposed at the upper region.

6. The equipment panel of claim 3, wherein the tray has a depth that extends along the front-to-rear axis and a width extending between opposite first and second sides of the tray, and wherein the splice region includes a first splice region located closer to the first side of the tray and a second splice region located closer to the second side of the tray, each of the first and second splice regions having respective lower and upper layers with respective first and second splice cassettes.

7. The equipment panel of claim 1, wherein the lower row defines horizontal fiber insertion axes.

8. The equipment panel of claim 1, wherein the lower row defines fiber insertion axes angled downwardly while the upper row defines fiber insertion axes angled upwardly relative to a horizontal axis.

9. The equipment panel of claim 1, wherein the termination region also includes a middle row of front-facing ports.

10. The equipment panel of claim 1, further comprising routing management structures carried by the tray at a location rearward of the front-facing ports, wherein the routing management structures include a plurality of bend radius limiters defining a routing path around at least a portion of the splice region.

11. The equipment panel of claim 1, further comprising a plurality of optical fibers extending between first ends and second ends, the first ends of the optical fibers being terminated at optical connectors that are optically accessible through respective ones of the forward-facing ports, the second ends of the fibers are unterminated.

12. The equipment panel of claim 11, wherein at least one stub cable is routed into the chassis, the at least one stub cable including a plurality of intermediate fibers extending between first and second ends, the first ends of the intermediate fibers being routed to the splice region and spliced to the second ends of the optical fibers, the second ends of the intermediate fibers extend outwardly from the chassis at a rear of the chassis.

13. The equipment panel of claim 1, wherein the tray is one of a plurality of like trays separately slidable relative to the chassis.

14. The equipment panel of claim 13, wherein each tray has a height of 1 RU within the chassis.

15. The equipment panel of claim 13, wherein the forward-facing ports of each tray receive at least 576 fibers.

16. The equipment panel of claim 1, further comprising a cable anchoring arrangement mounted to the chassis at a rear of the chassis, the cable anchoring arrangement including a base, at least one cable anchor mountable to the base, at least one fanout mountable to the base, a fanout cover mountable over the at least one fanout to aid in retaining the at least one fanout at the base.

17. The equipment panel of claim 16, wherein the at least one fanout includes a plurality of fanouts mounted to the base.

18. The equipment panel of claim 16, wherein the cable anchoring arrangement is mountable to and removable from the chassis as a unit.

\* \* \* \* \*